United States Patent
Yamamoto et al.

(10) Patent No.: US 9,794,149 B2
(45) Date of Patent: Oct. 17, 2017

(54) USER EXPERIENCED QUALITY ESTIMATION APPARATUS, TERMINAL BOTTLENECK DETERMINATION APPARATUS, SIMILAR OPERATION EXTRACTION APPARATUS, METHOD AND PROGRAM

(71) Applicant: NIPPON TELEGRAPH AND TELEPHONE CORPORATION, Chiyoda-ku (JP)

(72) Inventors: Hiroshi Yamamoto, Musashino (JP); Sorami Nakamura, Musashino (JP); Hirotada Honda, Musashino (JP); Daisuke Ikegami, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 364 days.

(21) Appl. No.: 14/389,034

(22) PCT Filed: Mar. 29, 2013

(86) PCT No.: PCT/JP2013/059680
§ 371 (c)(1),
(2) Date: Sep. 29, 2014

(87) PCT Pub. No.: WO2013/147226
PCT Pub. Date: Oct. 3, 2013

(65) Prior Publication Data
US 2015/0074177 A1    Mar. 12, 2015

(30) Foreign Application Priority Data

Mar. 30, 2012   (JP) ................................ 2012-082802
Mar. 30, 2012   (JP) ................................ 2012-082803
Oct. 24, 2012   (JP) ................................ 2012-234727

(51) Int. Cl.
*G06F 15/16*    (2006.01)
*H04L 12/26*    (2006.01)
(Continued)

(52) U.S. Cl.
CPC ...... *H04L 43/0852* (2013.01); *G06F 11/3419* (2013.01); *H04L 67/10* (2013.01); *H04L 67/42* (2013.01); *G06F 2201/81* (2013.01)

(58) Field of Classification Search
CPC ...... G06F 11/34; G06F 11/30; G06F 11/3419; G06F 2201/81; H04L 67/42; H04L 67/10; H04L 43/0852
See application file for complete search history.

(56) References Cited

U.S. PATENT DOCUMENTS 6,792,393 B1   9/2004   Farel et al.
8,505,025 B2   8/2013   Nakamura
(Continued)

FOREIGN PATENT DOCUMENTS

JP    2003 298655    10/2003
JP    2009 104267    5/2009
(Continued)

OTHER PUBLICATIONS

Extended European Search Report issued on Jul. 13, 2016 in Patent Application No. 13769756.1.
(Continued)

*Primary Examiner* — Benjamin M Thieu
(74) *Attorney, Agent, or Firm* — Oblon, McClelland, Maier & Neustadt, L.L.P.

(57) ABSTRACT

A user experienced quality estimation apparatus estimating a user experienced waiting time of an application in an user terminal, includes: a computer configured to: obtain, as estimation target logs, a duration time of each process of data obtaining, script execution and screen rendering per-
(Continued)

formed in an estimation target period in the user terminal, and to store the estimation target logs in a received log storage unit; read out the estimation target logs from the received log storage unit, and output logs, excluding logs having data duration time shorter than a predetermined short time process threshold or longer than a predetermined long time process threshold; calculate, as multiplicity, the number of processes in a timeslot of a constant time length for the output logs; and extract a continuous region from data quantized by the quantization unit.

9 Claims, 57 Drawing Sheets

(51) Int. Cl.
   *G06F 11/34* (2006.01)
   *H04L 29/08* (2006.01)
   *H04L 29/06* (2006.01)

(56) References Cited

U.S. PATENT DOCUMENTS

| | | | |
|---|---|---|---|
| 8,732,323 B2 | 5/2014 | Shimizu et al. | |
| 2007/0198529 A1* | 8/2007 | Ogawa | G06F 11/3419 |
| 2009/0106769 A1* | 4/2009 | Nakamura | G06F 9/44521 |
| | | | 719/311 |
| 2010/0162112 A1 | 6/2010 | Watanabe et al. | |
| 2011/0029817 A1 | 2/2011 | Nakagawa et al. | |
| 2011/0154340 A1 | 6/2011 | Kanemasa | |
| 2011/0276836 A1 | 11/2011 | Kahana et al. | |

FOREIGN PATENT DOCUMENTS

| | | |
|---|---|---|
| JP | 2010 146146 | 7/2010 |
| JP | 2010 146260 | 7/2010 |
| JP | 2011 128969 | 6/2011 |
| JP | 2011 138422 | 7/2011 |
| JP | 2011 142473 | 7/2011 |
| JP | 2011-142474 A | 7/2011 |
| WO | WO 2010/044797 A1 | 4/2010 |

OTHER PUBLICATIONS

Partial Supplementary European Search Report issued Jan. 13, 2016 in Patent Application No. 13769756.1.
"CA Application Performance Management" CA Technologies, Total 3 Pages, (2011) (with partial English translation).
"EDINET Document Viewing Terminal's Requirements" EDINET, Total 5 Pages, (2007) (with partial English translation).
"Windows 7 System Requirements", Microsoft Windows, Total 6 Pages, (2012) (with partial English translation).
"Game Software Final Fantasy XIV Official Benchmark", Square Enix, Total 10 Pages, (2012) (with partial English translation).
"Fluke APA" Visual Network Systems, Total 7 Pages, (2012) (with partial English translation).
Hiroshi Yamamoto, et al., "The Consideration of Web Browsing Application Performance Factor", The Institute of Electronics, Information and Communication Engineers, pp. 1-6, (Jul. 2012) (with English abstract).
"CA APM 9", Systemwalker, Fujitsu, Total 5 Pages, (2012) (with partial English translation).
International Search Report Issued Jun. 25, 2013 in PCT/JP13/059680 Filed Mar. 29, 2013.

* cited by examiner

| START TIME (SECOND) | DURATION TIME (MILLISECOND) | PROCESS TYPE |
|---:|---:|---|
| 8.85 | 5119.81 | Network |
| 8.85 | 3734.74 | Rendering |
| 12.42 | 0.90 | Network |
| 13.97 | 1.66 | Scripting |
| 13.98 | 0.08 | Rendering |
| 13.98 | 5.83 | Scripting |
| 13.98 | 25.37 | Network |
| 13.99 | 63.22 | Rendering |

FIG.8

| PATTERN | TIME SLOT (s) | NEGLECT EQUAL TO OR LESS THAN SHORT TIME THRESHOLD (ms) | NEGLECT EQUAL TO OR GREATER THAN LONG TIME THRESHOLD (ms) | WINDOW LENGTH (s) | SMALLEST VALUE (s) OF ESTIMATION WAITING TIME | TIME GAP (s) | CONTINUITY DETERMINATION THRESHOLD | CONTINUOUS REGION LENGTH THRESHOLD $T_{min}$ (s) | CONTINUOUS REGION LENGTH THRESHOLD $T_{max}$ (s) | ESTIMATION ACCURACY |
|---|---|---|---|---|---|---|---|---|---|---|
| 1 | 0.01 | 5 | 10000 | 0.2 | 0.5 | 0.5 | 1 | 1 | 10 | 0.636305 |
| 2 | 0.01 | 5 | 10000 | 0.2 | 0.5 | 0.5 | 1 | 1 | 20 | 0.71334 |
| 3 | 0.01 | 5 | 10000 | 0.2 | 0.5 | 0.5 | 1 | 1 | 30 | 0.713341 |
| 4 | 0.01 | 5 | 10000 | 0.2 | 0.5 | 0.5 | 1 | 2 | 10 | 0.686544 |
| 5 | 0.01 | 5 | 10000 | 0.2 | 0.5 | 0.5 | 1 | 2 | 20 | 0.771705 |
| 6 | 0.01 | 5 | 10000 | 0.2 | 0.5 | 0.5 | 1 | 2 | 30 | 0.771705 |
| 7 | 0.01 | 5 | 10000 | 0.2 | 0.5 | 0.5 | 1 | 3 | 10 | 0.688493 |
| 8 | 0.01 | 5 | 10000 | 0.2 | 0.5 | 0.5 | 1 | 3 | 20 | 0.774349 |
| 9 | 0.01 | 5 | 10000 | 0.2 | 0.5 | 0.5 | 1 | 3 | 30 | 0.774349 |
| 18 | 0.01 | 5 | 10000 | 0.2 | 0.5 | 0.5 | 2 | 3 | 30 | 0.829469 |
| 19 | 0.01 | 5 | 10000 | 0.2 | 0.5 | 0.5 | 3 | 1 | 10 | 0.68107 |
| 20 | 0.01 | 5 | 10000 | 0.2 | 0.5 | 0.5 | 3 | 1 | 20 | 0.755894 |
| 21 | 0.01 | 5 | 10000 | 0.2 | 0.5 | 0.5 | 3 | 1 | 30 | 0.755895 |
| 22 | 0.01 | 5 | 10000 | 0.2 | 0.5 | 0.5 | 3 | 2 | 10 | 0.744048 |
| 23 | 0.01 | 5 | 10000 | 0.2 | 0.5 | 0.5 | 3 | 2 | 20 | 0.822696 |
| 24 | 0.01 | 5 | 10000 | 0.2 | 0.5 | 0.5 | 3 | 2 | 30 | 0.822696 |
| 25 | 0.01 | 5 | 10000 | 0.2 | 0.5 | 0.5 | 3 | 3 | 10 | 0.751037 |
| 26 | 0.01 | 5 | 10000 | 0.2 | 0.5 | 0.5 | 3 | 3 | 20 | 0.831719 |
| 27 | 0.01 | 5 | 10000 | 0.2 | 0.5 | 0.5 | 3 | 3 | 30 | 0.831719 |
| 28 | 0.01 | 5 | 10000 | 0.2 | 0.5 | 1 | 1 | 1 | 10 | 0.61326 |
| 29 | 0.01 | 5 | 10000 | 0.2 | 0.5 | 1 | 1 | 1 | 20 | 0.693196 |
| 30 | 0.01 | 5 | 10000 | 0.2 | 0.5 | 1 | 1 | 1 | 30 | 0.693197 |
| 38 | 0.01 | 5 | 10000 | 0.2 | 0.5 | 1 | 2 | 1 | 20 | 0.734031 |
| 39 | 0.01 | 5 | 10000 | 0.2 | 0.5 | 1 | 2 | 1 | 30 | 0.734032 |
| 40 | 0.01 | 5 | 10000 | 0.2 | 0.5 | 1 | 2 | 2 | 10 | 0.723883 |

SELECTION → Pattern 26

PERFORM QUALITY ESTIMATION BY COMBINING VARIOUS THRESHOLDS AND PARAMETERS TO SELECT COMBINATION BY WHICH CORRELATION WITH USER EXPERIENCED IS THE HIGHEST

FIG.23

| START TIME (SECOND) | DURATION TIME (MILLISECOND) | PROCESS TYPE |
|---|---|---|
| 8.85 | 5119.81 | Network |
| 8.85 | 3734.74 | Rendering |
| 12.42 | 0.90 | Network |
| 13.97 | 1.66 | Scripting |
| 13.98 | 0.08 | Rendering |
| 13.98 | 5.83 | Scripting |
| 13.98 | 25.37 | Network |
| 13.99 | 63.22 | Rendering |

FIG.26

| PATTERN | TIME SLOT (s) | NEGLECT EQUAL TO OR LESS THAN SHORT TIME THRESHOLD (ms) | NEGLECT EQUAL TO OR GREATER THAN LONG TIME THRESHOLD (ms) | WINDOW LENGTH (s) | SMALLEST VALUE (s) OF ESTIMATION WAITING TIME | TIME GAP (s) | CONTINUITY DETERMINATION THRESHOLD | CONTINUOUS REGION LENGTH THRESHOLD Tmin (s) | CONTINUOUS REGION LENGTH THRESHOLD Tmax (s) | ESTIMATION ACCURACY |
|---|---|---|---|---|---|---|---|---|---|---|
| 1 | 0.01 | 5 | 10000 | 0.2 | 0.5 | 0.5 | 1 | 1 | 10 | 0.636305 |
| 2 | 0.01 | 5 | 10000 | 0.2 | 0.5 | 0.5 | 1 | 1 | 20 | 0.71334 |
| 3 | 0.01 | 5 | 10000 | 0.2 | 0.5 | 0.5 | 1 | 1 | 30 | 0.713341 |
| 4 | 0.01 | 5 | 10000 | 0.2 | 0.5 | 0.5 | 1 | 2 | 10 | 0.686544 |
| 5 | 0.01 | 5 | 10000 | 0.2 | 0.5 | 0.5 | 1 | 2 | 20 | 0.771705 |
| 6 | 0.01 | 5 | 10000 | 0.2 | 0.5 | 0.5 | 1 | 2 | 30 | 0.771705 |
| 7 | 0.01 | 5 | 10000 | 0.2 | 0.5 | 0.5 | 1 | 3 | 10 | 0.688493 |
| 8 | 0.01 | 5 | 10000 | 0.2 | 0.5 | 0.5 | 1 | 3 | 20 | 0.774349 |
| 9 | 0.01 | 5 | 10000 | 0.2 | 0.5 | 0.5 | 1 | 3 | 30 | 0.774349 |
| 18 | 0.01 | 5 | 10000 | 0.2 | 0.5 | 0.5 | 2 | 3 | 30 | 0.829469 |
| 19 | 0.01 | 5 | 10000 | 0.2 | 0.5 | 0.5 | 3 | 1 | 10 | 0.68107 |
| 20 | 0.01 | 5 | 10000 | 0.2 | 0.5 | 0.5 | 3 | 1 | 20 | 0.755894 |
| 21 | 0.01 | 5 | 10000 | 0.2 | 0.5 | 0.5 | 3 | 1 | 30 | 0.755895 |
| 22 | 0.01 | 5 | 10000 | 0.2 | 0.5 | 0.5 | 3 | 2 | 10 | 0.744048 |
| 23 | 0.01 | 5 | 10000 | 0.2 | 0.5 | 0.5 | 3 | 2 | 20 | 0.822696 |
| 24 | 0.01 | 5 | 10000 | 0.2 | 0.5 | 0.5 | 3 | 2 | 30 | 0.822696 |
| 25 | 0.01 | 5 | 10000 | 0.2 | 0.5 | 0.5 | 3 | 3 | 10 | 0.751037 |
| 26 | 0.01 | 5 | 10000 | 0.2 | 0.5 | 0.5 | 3 | 3 | 20 | 0.831719 |
| 27 | 0.01 | 5 | 10000 | 0.2 | 0.5 | 0.5 | 3 | 3 | 30 | 0.831719 |
| 28 | 0.01 | 5 | 10000 | 0.2 | 0.5 | 1 | 1 | 1 | 10 | 0.61326 |
| 29 | 0.01 | 5 | 10000 | 0.2 | 0.5 | 1 | 1 | 1 | 20 | 0.693196 |
| 30 | 0.01 | 5 | 10000 | 0.2 | 0.5 | 1 | 1 | 1 | 30 | 0.693197 |
| 38 | 0.01 | 5 | 10000 | 0.2 | 0.5 | 1 | 2 | 1 | 20 | 0.734031 |
| 39 | 0.01 | 5 | 10000 | 0.2 | 0.5 | 1 | 2 | 1 | 30 | 0.734032 |
| 40 | 0.01 | 5 | 10000 | 0.2 | 0.5 | 1 | 2 | 2 | 10 | 0.723883 |

SELECTION → Pattern 26

PERFORM QUALITY ESTIMATION BY COMBINING VARIOUS THRESHOLDS AND PARAMETERS TO SELECT COMBINATION BY WHICH CORRELATION WITH USER EXPERIENCED IS THE HIGHEST (DETERMINATION EXAMPLE 1)
　BOTTLENECK DETERMINATION THRESHOLD 5
　EVALUATION VALUE 7
　EVALUATION RESULT ⇒ TERMINAL BOTTLENECK (DETERMINATION EXAMPLE 2)
　THRESHOLD BY WHICH TERMINAL BOTTLENECK
　IS STRONGLY SUSPECTED 10
　THRESHOLD BY WHICH TERMINAL BOTTLENECK IS SUSPECTED 5
　EVALUATION VALUE 12
　EVALUATION RESULT ⇒ TERMINAL BOTTLENECK
　　　　　　　　　　　　IS STRONGLY SUSPECTED

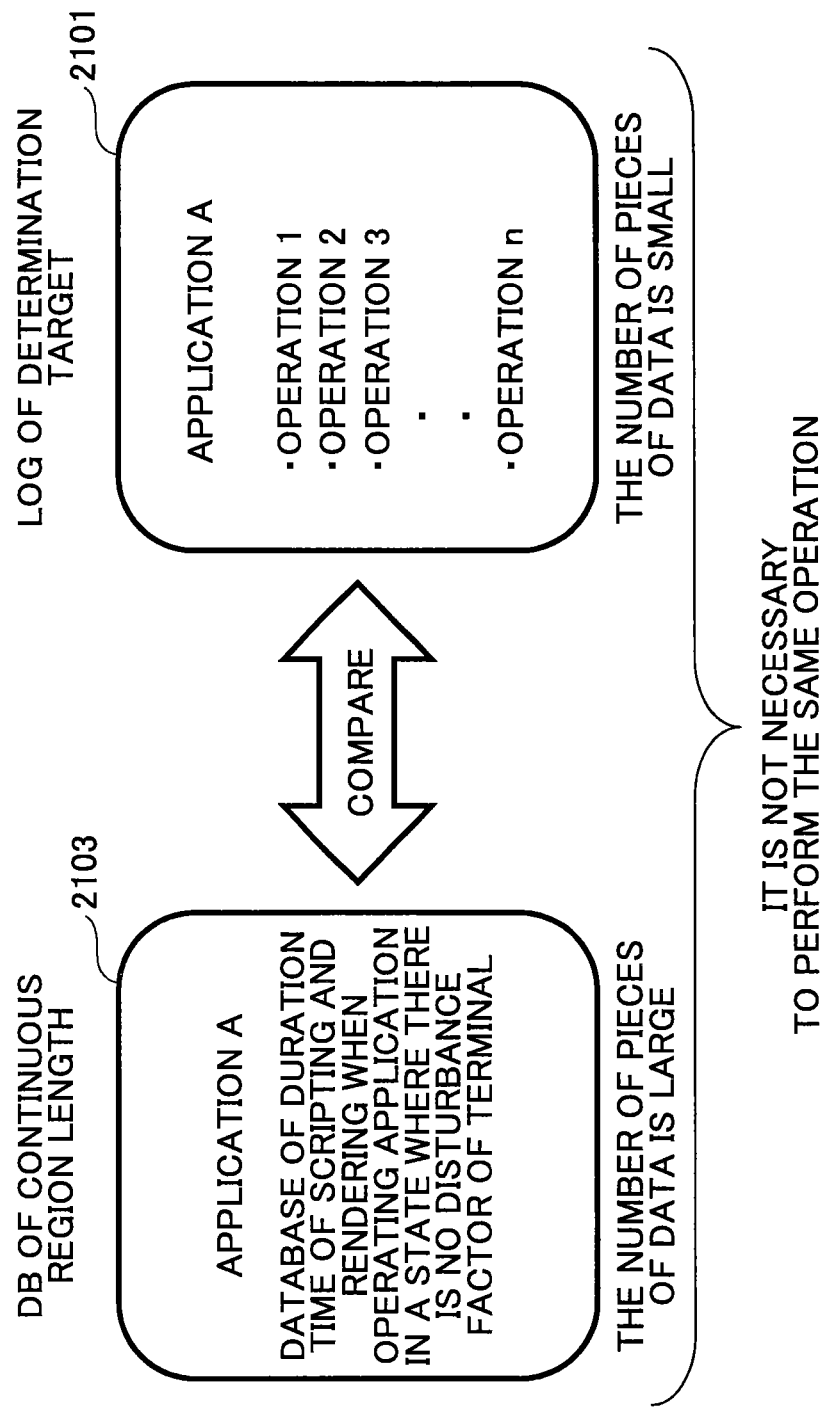

EMPIRICAL CUMULATIVE DISTRIBUTION
OF SCRIPTING CONTINUOUS REGION LENGTH

EMPIRICAL CUMULATIVE DISTRIBUTION
OF RENDERING CONTINUOUS REGION LENGTH

FIG.40

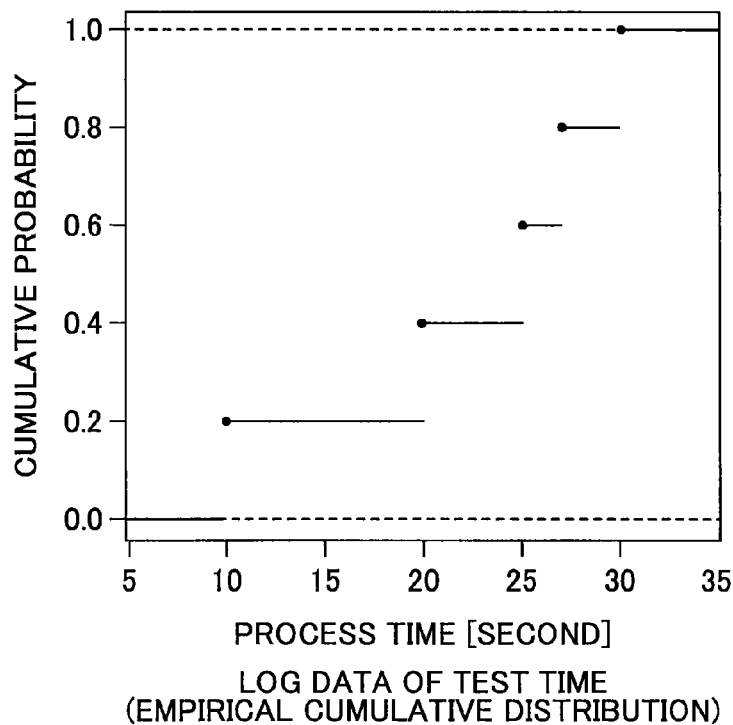

LOG DATA OF TEST TIME
(EMPIRICAL CUMULATIVE DISTRIBUTION)

FIG.41

```
(DETERMINATION EXAMPLE 1)
   BOTTLENECK DETERMINATION THRESHOLD  -5
   EVALUATION VALUE  2
   EVALUATION RESULT ⇒ NOT TERMINAL BOTTLENECK (DETERMINATION EXAMPLE 2)
   THRESHOLD BY WHICH TERMINAL BOTTLENECK IS STRONGLY
   SUSPECTED  -10
   THRESHOLD BY WHICH TERMINAL BOTTLENECK IS SUSPECTED  -5
   EVALUATION VALUE -12
   EVALUATION RESULT ⇒ TERMINAL BOTTLENECK
                       IS STRONGLY SUSPECTED
```

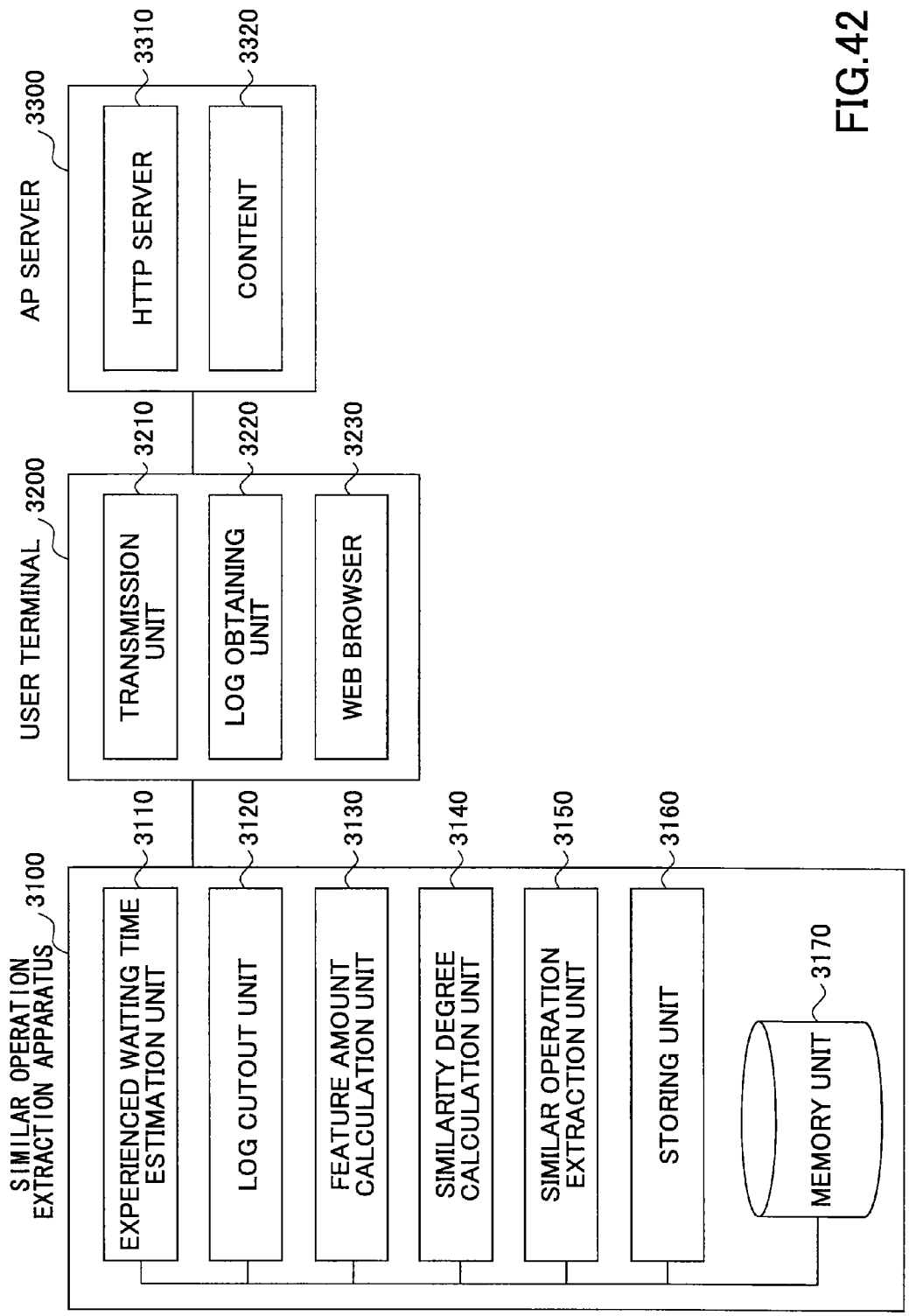

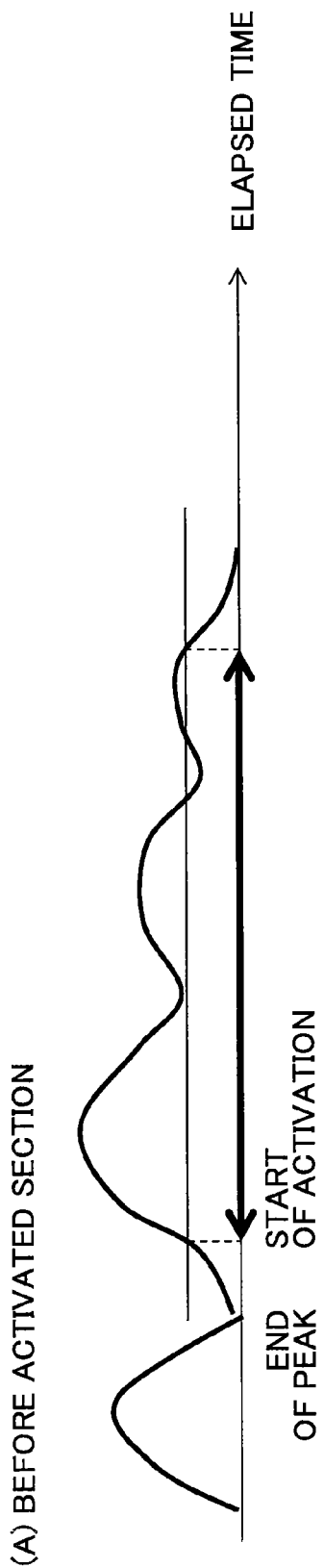

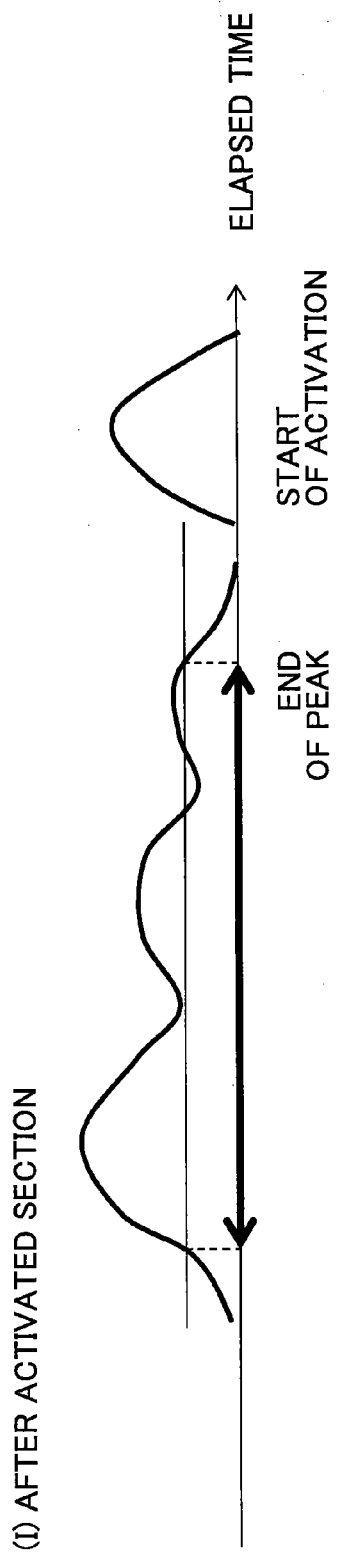

FIG.49

| Start Time | Duration(ms) | Kind of Process |
|---|---|---|
| 11.76 | 45.84 | JavaScript |
| 11.81 | 2.41 | Rendering |
| 11.81 | 7.29 | Rendering |
| 11.82 | 9.43 | Rendering |
| 11.83 | 3.08 | Rendering |
| ⋮ | ⋮ | |
| 19.38 | 1.37 | Rendering |
| 19.38 | 0.73 | Rendering |
| 19.39 | 4.42 | Rendering |
| 19.89 | 3.2 | Rendering |
| 20.05 | 14.37 | JavaScript |

FIG.50

| time(s) | receive(kbps) | transmit(kbps) |
|---|---|---|
| 0.0 | 1.22 | 0.00 |
| 1.0 | 0.00 | 0.00 |
| 2.0 | 0.00 | 0.00 |
| 3.0 | 0.00 | 0.00 |
| 4.0 | 3.34 | 4.38 |
| ⋮ | | |
| 16.0 | 343.19 | 49.33 |
| 17.0 | 0.41 | 0.55 |
| 18.0 | 0.00 | 0.00 |
| 19.0 | 0.88 | 1.19 |
| 20.0 | 0.88 | 1.19 |

FIG.51

| | START TIME (SECOND) | END TIME (SECOND) |
|---|---|---|
| 1 | 13.7 | 15.8 |

FIG.52

| Start Time | Duration(ms) | Kind of Process |
|---|---|---|
| 13.80 | 18.43 | JavaScript |
| 13.83 | 2.07 | Rendering |
| 13.98 | 18.37 | JavaScript |
| 14.00 | 3.88 | Rendering |
| 14.13 | 4.03 | Rendering |
| ⋮ | ⋮ | |
| 15.65 | 0.06 | Rendering |
| 15.66 | 2.41 | Rendering |
| 15.66 | 29.11 | Rendering |
| 15.69 | 0.34 | JavaScript |
| 15.71 | 114.62 | JavaScript |

FIG.53

| time(s) | receive(kbps) | transmit(kbps) |
|---|---|---|
| 14.0 | 507.97 | 66.00 |
| 15.0 | 304.45 | 134.53 |

| No. | RECEIVED DATA AMOUNT Rthr | NUMBER OF PEAKS OF Network PROCESS Rnw_n | NUMBER OF PEAKS OF Rendering PROCESS Rren_n | PEAK HEIGHT ① OF Network PROCESS Rnw_h | PEAK HEIGHT ② OF Network PROCESS R'nw_h | PEAK HEIGHT ③ OF Network PROCESS Rnw_h_10 | PEAK WIDTH OF Network PROCESS Rnw_w | PEAK POSITION OF Scripting PROCESS Rscr_p |
|---|---|---|---|---|---|---|---|---|
| 1 | 91.13 | 2 | 0 | (5,14) | (14) | (15) | (4,12) | BEFORE SECTION, LAST PART OF SECTION |
| 2 | 113.23 | 1 | 1 | (15) | (15) | (17) | (6) | LAST PART OF SECTION |
| 3 | 40.10 | 1 | 0 | (4) | (4) | (6) | (4) | LAST PART OF SECTION |
| 4 | 84.23 | 2 | 0 | (3,6) | (6) | (7) | (2,10) | WHOLE SECTION |
| 5 | 19.68 | 1 | 0 | (4) | (4) | (4) | (8) | MIDDLE PART OF SECTION |
| 6 | 12.01 | 1 | 0 | (5) | (5) | (5) | (16) | MIDDLE PART OF SECTION |
| 7 | 8.84 | 1 | 0 | (3) | (3) | (3) | (3) | FIRST PART OF SECTION, AFTER SECTION |
| 8 | 122.44 | 1 | 0 | (6) | (2,3,6) | (8) | (15) | MIDDLE PART OF SECTION |
| 9 | 1.61 | 0 | 0 | – | (2) | – | – | WHOLE SECTION |
| ... | | | | | | | | |
| 275 | 81.48 | 0 | 0 | – | – | – | – | MIDDLE PART OF SECTION, AFTER SECTION |

FIG.57

| No. | SIMI-LARITY DEGREE | RECEIVED DATA AMOUNT Rthr | NUMBER OF PEAKS OF Network PROCESS Rnw_n | NUMBER OF PEAKS OF Rendering PROCESS Rren_n | PEAK HEIGHT ① OF Network PROCESS Rnw_h | PEAK HEIGHT ② OF Network PROCESS R'nw_h | PEAK HEIGHT ③ OF Network PROCESS Rnw_h_10 | PEAK WIDTH OF Network PROCESS Rnw_w | PEAK POSITION OF Scripting PROCESS Rscr_p |
|---|---|---|---|---|---|---|---|---|---|
| 1 | 90 | 91.13 | 2 | 0 | (5,14) | (14) | (15) | (4,12) | BEFORE SECTION, LAST PART OF SECTION |
| 148 | 90 | 97.44 | 2 | 0 | (5,15) | (15) | (16) | (3,11) | BEFORE SECTION, MIDDLE PART OF SECTION |
| 264 | 90 | 99.03 | 2 | 0 | (5,14) | (14) | (14) | (5,21) | MIDDLE PART OF SECTION |
| 164 | 80 | 54.29 | 2 | 0 | (5,14) | (14) | (14) | (4,15) | MIDDLE PART OF SECTION |
| 56 | 80 | 88.46 | 2 | 0 | (5,14) | (14) | (16) | (7,21) | BEFORE SECTION, LAST PART OF SECTION |
| 210 | 63 | 113.47 | 1 | 0 | (14) | (14) | (16) | (11) | LAST PART OF SECTION |
| 18 | 60 | 86.98 | 1 | 0 | (14) | (16) | (15) | (26) | BEFORE SECTION, LAST PART OF SECTION |
| 176 | 60 | 84.64 | 1 | 1 | (16) | (16) | (16) | (11) | MIDDLE PART OF SECTION |
| 11 | 60 | 107.04 | 1 | 1 | (13) | (13) | (16) | (15) | MIDDLE PART OF SECTION |
| ... | | | | | | | | | |
| 275 | 0 | 81.48 | 0 | 0 | - | - | - | - | MIDDLE PART OF SECTION, AFTER SECTION |

FIG.58

| CATEGORY | CONDITION |
|---|---|
| OPERATION | 23 TYPES |
| NETWORK | NO LOAD (EMULATOR OFF) |
| | WITH LOAD (ROUNDTRIP DELAY 300ms) |
| TERMINAL | NO LOAD (NO BACKGROUND APPLICATION) |
| | WITH LOAD (MUSIC REPRODUCTION IN BACKGROUND) |
| NUMBER OF TIMES OF MEASUREMENT | 3 TIMES FOR EACH CONDITION |

FIG.59

| THRESHOLD | CORRECT RATIO (%) | BREAKDOWN | |
|---|---|---|---|
| | | True Positive(%) | True Negative(%) |
| 50 | 81.1 | 90.6 | 80.7 |
| 70 | 82.6 | 89.5 | 82.4 |
| 90 | 86.7 | 82.5 | 86.9 |
| 110 | 94.3 | 71.6 | 95.2 |
| 130 | 96.9 | 33.7 | 99.6 |
| 150 | 96.5 | 19.4 | 99.7 |

※ True Positive: CORRECTLY SPECIFIED AS SIMILAR OPERATION
※ True Negative: CORRECTLY SPECIFIED AS NOT SIMILAR OPERATION

USER EXPERIENCED QUALITY ESTIMATION APPARATUS, TERMINAL BOTTLENECK DETERMINATION APPARATUS, SIMILAR OPERATION EXTRACTION APPARATUS, METHOD AND PROGRAM

TECHNICAL FIELD

A present invention of a first aspect relates to a user experienced quality estimation apparatus and the method. More particularly, the present invention relates to a user experienced quality estimation apparatus and the method for estimating quality of an application which a service user experienced based on an experienced waiting time of the user.

Also, a present invention of a second aspect relates to a terminal bottleneck determination apparatus and the method. More particularly, the present invention relates to a terminal bottleneck determination apparatus and the method for determining quality deterioration cause when using an application.

Further, a present invention of a third aspect relates to a similar operation extraction apparatus and the method in a quality deterioration determination technique when executing an application. More particularly, the present invention relates to a similar operation extraction apparatus and the method for extracting operations similar to operations by a user entered as inputs when executing an application.

BACKGROUND ART

With respect to the first aspect, there are following methods as methods for obtaining an experienced waiting time of a user for an application. Here, the experienced waiting time of a user means a time period after click operation on a screen by the user until an execution result is displayed on the screen.

(A) A method for obtaining an index close to the user experienced waiting time such as a response time of an HTTP message exchanged between the terminal and the server, and presenting the index (refer to non-patent document 1, for example).

(B) A method for estimating the user experienced waiting time based on a period during which packets are continuously transmitted and received between the terminal and the server (refer to patent document 1, for example).

As to the second aspect, there is a following method as a conventional method for determining terminal bottleneck which indicates whether quality deterioration is due to the terminal in a case where quality deterioration that is represented by increase of experienced waiting time of the user when using a service of an application. The "experienced waiting time" here also means a time after click operation on the screen by the user until the execution result is displayed on the screen.

(A) A method for determining whether there is a bottleneck by ascertaining resources such as CPU load factor of the terminal:

For example, there is a method for checking whether a CPU usage ratio or a free memory amount exceeds a predefined threshold by using a tool such as "performance monitor" and the like provided with Windows (registered trademark) OS, for example (refer to patent document 2, for example).

(B) A method for checking terminal specification:

There is a method for determining whether the terminal is adapted to the service based on terminal specification information such as CPU type, mounted memory amount and the like (refer to non-patent documents 2 and 3, for example).

(C) Prior checking method by bench mark:

There is a method for executing bench mark software that operates similarly to the service to determine whether the software is adapted to the service based on the score (refer to non-patent document 4, for example).

Next, a background technique on the third aspect is described.

In recent years, applications used via a network such as a Web application are widely spread. Such an applications are characterized in that software or data managed in the server side can be used by accessing the server via a Web browser or dedicated client software without installing application software in the user terminal.

However, user experienced quality is vulnerable to change due to delay of the server or the network, so there is a problem that it is difficult to assure certain experienced quality. So, it is necessary to always monitor experienced quality of the user, and to properly cope with quality deterioration. For example, there is a method for always monitoring a response time between the client and the server, and determining that quality deterioration occurs when the response time becomes longer compared with normal state (refer to non-patent document 5, for example).

Also, recently, applications including dynamic content have increased. As to such applications, since the process amount in the user terminal increases, process performance of the user terminal as well as the server and the network becomes a large factor for changing the user experienced quality. Therefore, in the non-patent document 6, necessity of quality monitoring to which the user terminal factor is added is described, that is, necessity for monitoring the experienced waiting time is described.

RELATED ART DOCUMENT

[patent document 1] JP2011-142473

[patent document 2] JP2003-298655

[Non-patent document 1] CA Application Performance Management. http://www.ca.com/jp/products/detail/CA-Application-Performance-Management/overview.aspx

[Non-patent document 2] FSA, EDINET, Terminal Requirements, http://www.fsa.go.jp/singi/edinet/20070427/09.pdf

[Non-patent document 3] Windows7, Terminal Requirements, http://windows.microsoft.com/ja-JP/windows7/products/system-requirements

[Non-patent document 4] Game software final fantasy benchmark, http://www.finalfantasyxiv.com/media/benchmark/jp/

[Non-patent document 5] Fluke APA http://www.toyo.co.jp/flukenetworks/apa.html

[Non-patent document 6] Hiroshi Yamamoto, Sorami Nakamura, Hirotada Honda, Daisuke Ikegami, Akira Takahashi, THE CONSIDERATION OF WEB BROWSING APPLICATION PERFORMANCE FACTOR, IEICE, 2012-7

[Non-patent document 7] CA APM http://systemwalker.fujitsu.com/jp/caapm/

SUMMARY OF THE INVENTION

Problem to be Solved by the Invention

Problem on the First Aspect

There are following problems in the conventional technique on the first aspect.

(1) Effect of terminal processing time cannot be considered:

FIG. 1 simplifies processing when a user operation is performed. In this example, a time period (t4−t0) from the start of the operation of the user to the time of completion of screen display includes "transmission of a request from the terminal"->"response from the server"->"screen generation processing at the terminal". In the conventional technique, since the time period (t3−t0) from request transmission to response reception is detected, the terminal processing time (t4−t3) becomes an error.

Also, in dynamic content, there is a tendency that the terminal processing time becomes long, so that the error of the conventional technique becomes large.

(2) Coping with processing that does not accompany communication:

In the conventional technique, as shown in FIG. 2, in an application including dynamic content as a component, although a request occurs to a server at the time of operation by the user, there are many cases where the request is not transmitted to the server since the process is closed within the browser or dedicated client software, so it cannot be detected that the operation by the user is performed in the conventional technique.

(3) Extraction of signal pair that correlates with user experience:

In the application that includes the dynamic content as a component, as shown in FIG. 3, a signal caused by a user operation and a signal caused by a browser or dedicated client software and the like other than the user operation coexist. It is necessary to check a signal pattern corresponding to operations of each application for specifying the signal caused by the user operation. Since the number of applications and the number of operations in each application are very large, it is very difficult to check signal patterns for each operation.

As mentioned above, in the conventional technique, there are problems that effect of processing time in the terminal side cannot be considered, it is not possible to detect, from the outside, the user operation that is closed in the browser or the dedicated client software and that do not accompany with communication with the server, and it is difficult to classify, from the outside, whether the communication is due to the operation by the user that causes an effect on the user experienced quality. These problems hamper estimation of the user experienced quality of an application with high accuracy.

Problem on the Second Aspect

There are following two problems in the conventional technique on the second aspect.

(1) There is a problem that the conventional techniques (A) and (B) on the second aspect have low correlation with the application. Although the resource such as the CPU usage ratio is one scale representing a load state of the terminal, correlation between this index and the application processing speed is low except for a state where the terminal load is extremely high. For example, when the CPU usage ratio of proper time intervals is always 100%, the terminal bottleneck is suspected. But, when it is 80% or 60% or the like, it is difficult to determine the cause. Although the CPU usage ratio is 100%, there is a possibility that the application processing speed has no problem in relation to process priority.

Similarly, as to terminal specifications, it is difficult to assess the correlation between the terminal specification that is the very rough classification and the processing speed of various application types and operation types.

(2) In the conventional techniques of (B) and (C), there is a problem that a terminal state cannot be reflected when quality deterioration occurs. In a terminal for which a user operates, only the target application is not necessarily operating. For example, in a case where check by antivirus software is running at the same time, there is a possibility that service quality deterioration due to terminal bottleneck may occur even though the process specification or benchmark score satisfies defined values.

Problem on the Third Aspect

There is a following problem in the conventional technique of the third aspect.

The user experienced waiting times are different between operation contents performed by the user when the application is running. The reason is that, process amount and process complexity change due to operation types performed by the user when executing the application, which leads to difference of processing time, and eventually to difference of the user experienced waiting time. Therefore, in a method in which it is determined quality deterioration occurs when the experienced waiting time becomes longer than usual, when an operation different from the usual operation, especially, complicated operation having large process amount of application is performed, the processing time becomes long so that the user experienced waiting time becomes longer than usual. Thus, there is a case in which it is erroneously determined that quality deterioration occurs even though there is no quality deterioration in any of the server, network, and the user terminal. Therefore, in order to properly determine deterioration of experienced quality, it is necessary to compare with experienced waiting time when a similar operation was performed in the past.

For example, the non-patent document 7 (CA APM http://systemwalker.fujitsu.com/jp/caapm/) proposes a method for monitoring a server processing time in units of methods of the application, so that processing time can be compared with the processing time when the same method was executed in the past. However, as mentioned before, since the experienced waiting time of the user is affected by the processing time at the network and the user terminal, it is not enough only to monitor the server processing time. Also, since the method content is monitored, the operation content performed by the user is specified, so this method is not preferable from the viewpoint of user personal information protection.

The present invention is contrived in view of the above-mentioned problems on the first to third aspects.

A first object of the present invention is to provide a technique that enables a third party to estimate an experienced waiting time of a user of an application as user experienced quality based on a process types (Network: data obtaining, Scripting: script execution, Rendering: screen rendering) that are obtained from the application such as the Web application and are abstracted, and on required time data.

A second object of the present invention is to provide a technique that enables a third party to determine whether quality deterioration of the user experienced quality is due to the terminal based on the process types (Network, Scripting, Rendering) that are obtained from the application such as the Web application and that are abstracted, and on time data required for the processes.

A third object of the present invention is to provide a technique that makes it possible to determine an operation performed in the past similar to an operation performed when the user executes the application without monitoring method content in order to improve quality deterioration determination accuracy when executing the application.

Means for Solving the Problem

According to an embodiment of the present invention, for achieving the first object, there is provided a user experienced quality estimation apparatus for estimating a user experienced waiting time of an application in an user terminal, including:

a data reception unit configured to obtain, as estimation target logs, a duration time of each process of data obtaining, script execution and screen rendering performed in an estimation target period in the user terminal, and to store the estimation target logs in a received log storage unit;

a log exclusion unit configured to read out the estimation target logs from the received log storage unit, and output logs from which logs having data duration time shorter than a predetermined short time process threshold or longer than a predetermined long time process threshold are excluded;

a quantization unit configured to calculate, as multiplicity, the number of processes in a timeslot of a constant time length for the logs output from the log exclusion unit; and a continuous region extraction unit configured to extract a continuous region from data quantized by the quantization unit, wherein the continuous region extraction unit includes:
a first continuous region extraction unit configured to extract a continuous region without distinguishing between processes of the data obtaining, the script execution and the screen rendering, or
a second continuous region extraction unit configured to extract a continuous region by distinguishing between processes of the data obtaining, the script execution and the screen rendering.

According to an embodiment of the present invention, for achieving the second object, there is provided a quality deterioration cause determination apparatus for determining whether a quality deterioration cause is in a user terminal when a service of an application provided by an application server is used, including:

a data reception unit configured to obtain, as determination target logs, a duration time of each process of data obtaining, script execution and screen rendering that are performed in an estimation target period in the user terminal; and a bottleneck determination unit configured to compare the determination target logs with reference logs obtained by performing operations similar to operations for the application in the user terminal or with data of empirical cumulative distribution data of continuous region lengths of processes of the script execution or the screen rendering so as to obtain evaluation values, and to determine whether there is the quality deterioration cause in the user terminal based on comparison result between a total value of the evaluation values and a preset threshold.

According to an embodiment of the present invention, for achieving the third object, there is provided a similar operation extraction apparatus for extracting operations similar to input operations that are provided as inputs when executing an application, including:

a feature amount calculation unit configured to calculate a feature amount based on logs corresponding to a user experienced waiting time cut out from either one of an application log and a network log or from a combination of both; and a similarity degree calculation unit configured to calculate a degree of similarity between the calculated feature amount and a feature amount stored in a storage unit in the past based on the calculated feature amount, the stored feature amount and a predetermined similarity degree function.

Effect of the Present Invention

According to an embodiment of the present invention corresponding to the first object, experienced waiting time estimation is performed by utilizing log data that is time series information of start/end time of data obtaining (Network), script execution (Scripting) and screen rendering (Rendering) of an application such as a Web browser on a terminal, so that it becomes possible to estimate the user experienced waiting time, including the terminal process time, until an execution result for user operation of the application is displayed on the screen. Also, in an application including dynamic content as a component in which a ratio of terminal processing time is high, accuracy of estimation of the user experienced quality (user experienced waiting time) can be improved according to the present invention.

Also, since abstracted process types (Network, Scripting, Rendering) are used as inputs and information specific to the application is not used, it becomes possible to always estimate the user experienced waiting time in consideration of effects of terminal side processing time by an apparatus other than the user terminal (user experienced quality estimation apparatus) for various applications, so that it becomes possible to realize always monitoring of user experienced quality based on the user experienced waiting time by a third party.

According to an embodiment of the present invention corresponding to the second object, am operation for specifying causes to which quality deterioration caused by the terminal is added is constructed. In the present invention, by enabling an external party (third party) that can specify terminal cause to estimate (monitor) experienced quality of a user, it becomes possible to construct separating operation. Thus, it is possible to perform bottleneck determination by reflecting execution effect of actual application and terminal state at the time of failure, and it becomes possible to improve accuracy of bottleneck determination compared to the conventional technique.

According to an embodiment of the present invention corresponding to the third object, it becomes possible to obtain user experienced waiting time for similar past operation by determining and extracting an operation executed in the past that is similar to an operation performed by the user when executing the application. Then, by comparing the user experienced waiting time at the time of execution of the application that is the quality deterioration determination target with user experienced waiting time for the extracted past similar operation, it becomes possible to detect only increase of experienced waiting time caused by End-to-End quality deterioration without receiving effects of operation content, so that accuracy of quality deterioration determination improves.

BRIEF DESCRIPTION OF THE DRAWINGS

FIG. 6 shows an example of data stored in a received log storage unit in the embodiment 1-1 of the present invention;

FIG. 8 shows sample data of various threshold evaluation in the embodiment 1-1 of the present invention;

FIG. 23 shows a data example that is input in the bottleneck determination unit in the embodiment 2-1 of the present invention;

FIG. 26 shows sample data of various threshold evaluation in the embodiment 2-1 of the present invention;

FIG. 32 is a diagram for explaining non-reference determination in the embodiment 2-2 of the present invention;

FIG. 40 shows an evaluation method (3) by the Anderson-Darling Test according to the embodiment 2-2 of the present invention;

FIG. 41 shows an example of bottleneck determination in the embodiment 2-2 of the present invention;

FIG. 42 shows a system configuration example in a third embodiment of the present invention;

FIG. 47A is a diagram showing classification of peak position in the third embodiment of the present invention;

FIG. 47B is a diagram showing classification of peak position in the third embodiment of the present invention;

FIG. 49 shows an example of application log obtained from a user terminal of an example in the third embodiment;

FIG. 50 shows an example of network log obtained from a user terminal of an example in the third embodiment;

FIG. 51 shows an example of estimated experienced waiting time of an example in the third embodiment;

FIG. 52 shows an example of cutout application log of an example in the third embodiment;

FIG. 53 shows an example of cutout network log of an example in the third embodiment;

FIG. 56 shows a data example of stored feature amount, and estimated experienced waiting time of an example in the third embodiment;

FIG. 57 shows a calculation result of degree of similarity of an example in the third embodiment;

FIG. 58 shows evaluation targets in the third embodiment; and

FIG. 59 shows evaluation results in the third embodiment.

EMBODIMENTS FOR CARRYING OUT THE INVENTION

In the following, first to third embodiments of the present invention are described with reference to figures. In the present embodiments, examples are described in which the application executed in the terminal is a Web browser. But, the present invention is not limited to these examples, and can be applied to various applications.

First Embodiment

First, the first embodiment is described. The first embodiment is an embodiment corresponding to the first object.

In the present embodiment, process types (Network, Scripting, Rendering) abstracted from the Web browser of the user terminal and required time data are obtained in a time series manner, and based on the data, the experienced waiting time of the user is estimated as a user experienced quality for a time period after an operation (after screen click, for example) by the user on the browser application until an execution result is displayed on the screen by receiving a response of the browser application.

Figure 1:
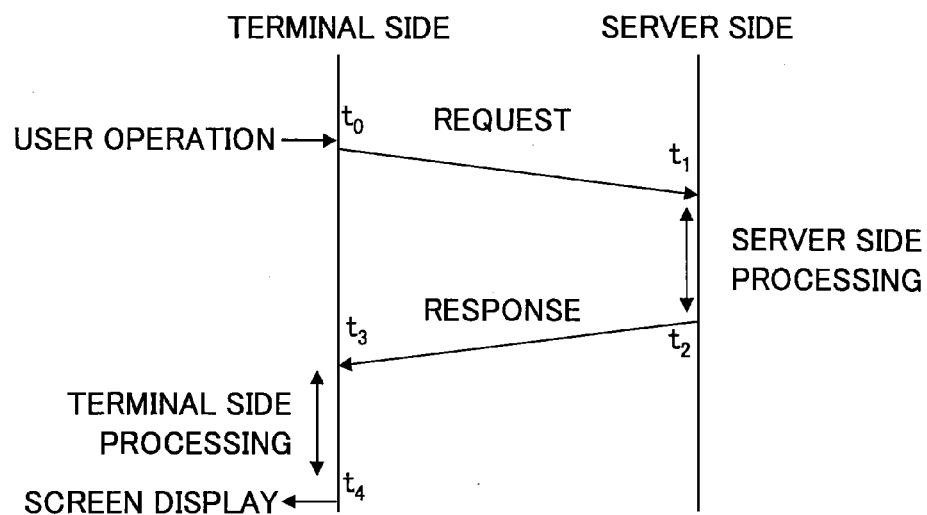
FIG. 1 shows a model that simplifies from operation to display.
Figure 2:
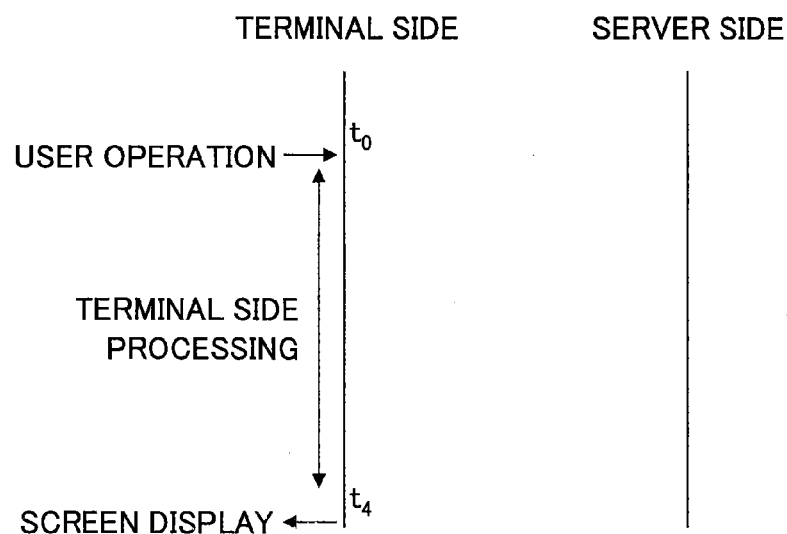
FIG. 2 shows an example of a process without communication.
Figure 3:
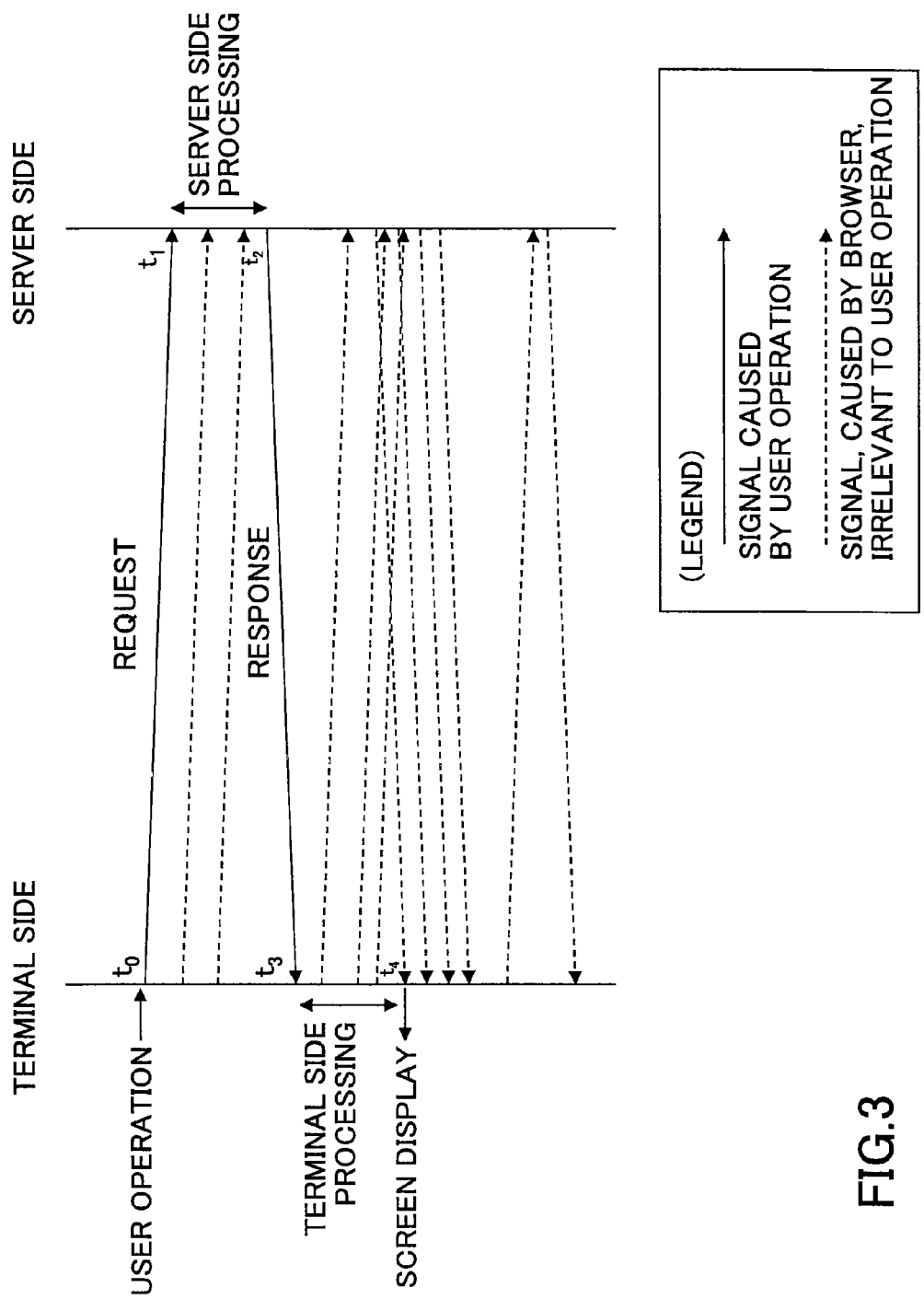
FIG. 3 shows an example of asynchronous communication.
Figure 4:
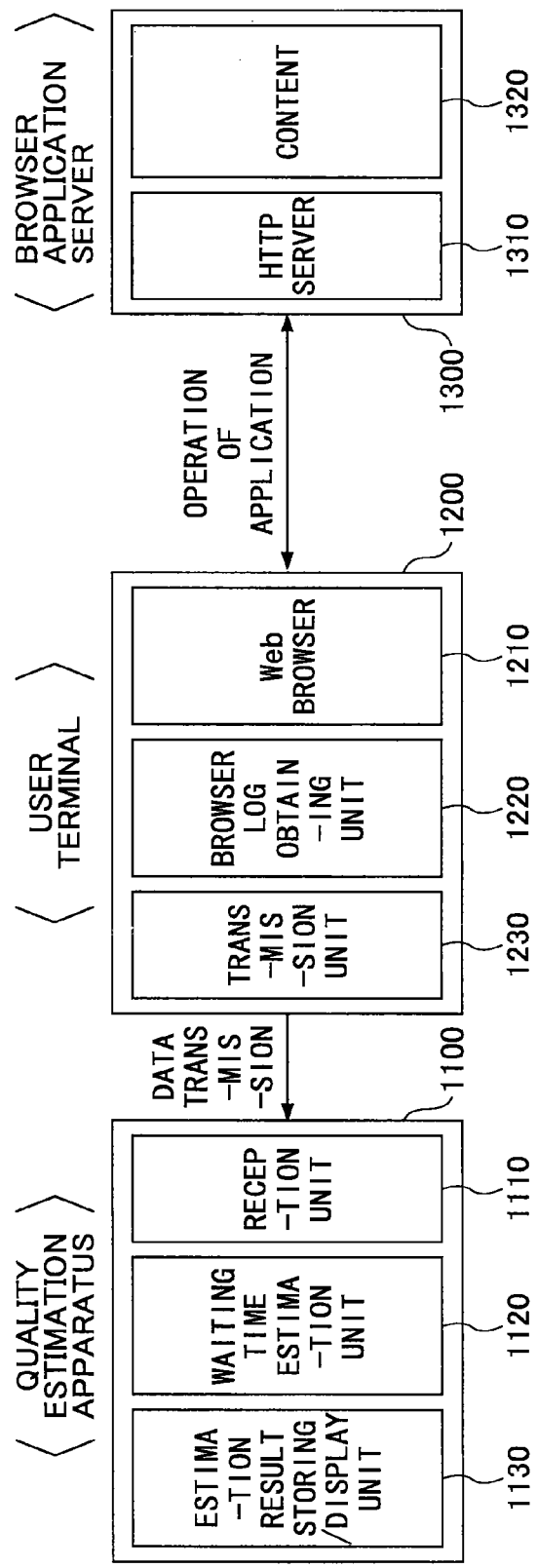
FIG. 4 shows an example of a system configuration in a first embodiment of the present invention.

FIG. 4 shows an example of a system configuration of the present embodiment.

As shown in the figure, the system includes a quality estimation apparatus 1100, a user terminal 1200, a browser application server 1300.

The user terminal 1200 includes a Web browser 12100, a browser log obtaining unit 1220, and a transmission unit 1230, and executes content 1310 (application) of the application server 1300 on the Web browser 1210. The browser log obtaining unit 1220 obtains a process information log of the browser, and the transmission unit 1230 sends data to the quality estimation apparatus 1100.

The quality estimation apparatus 1100 includes a reception unit 1110, a waiting time estimation unit 1120, an estimation result storing/display unit 1130. The quality estimation apparatus 1100 receives the log transmitted by the user terminal 1200 by the reception unit 1110, performs experienced waiting time estimation by the waiting time estimation unit 1120, and stores/displays the result by the estimation result storing/display unit 1130.

The browser application server 1300 includes an HTTP server 1310, and the content 1320 is stored in storage means. In the example of the following embodiment, the browser application is assumed to be a business application including dynamic content and the like. The "browser application" may be referred to as "Web application."

Embodiment 1-1

Figure 5:
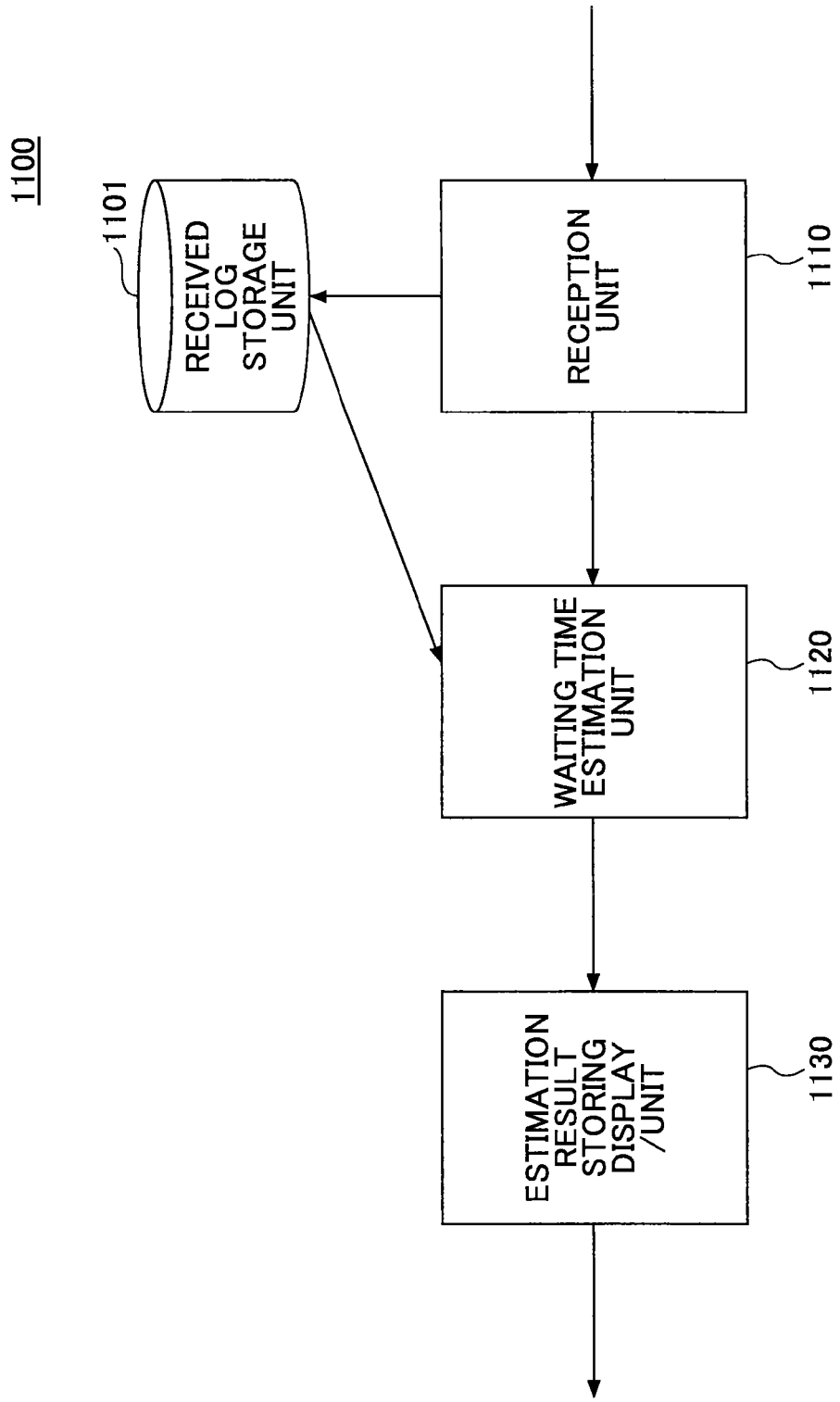
FIG. 5 shows an example of a configuration of a quality estimation apparatus in an embodiment 1-1 of the present invention.

The first embodiment includes an embodiment 1-1 and an embodiment 1-2. First, an embodiment 1-1 is described. FIG. 5 shows an example of a configuration of a quality estimation apparatus in the embodiment 1-1 of the present invention.

The quality estimation apparatus 1100 shown in the figure receives logs by the reception unit 1110 from the user terminal 1200, and stores the logs in the received log storage unit 1101. The data stored in the received log storage unit 1101 is targeted for every process of data obtaining (Network), script execution (Scripting), screen rendering (Rendering) performed by the Web browser 1210 in an estimation target period, and following times are obtained.

Network time: start and end time of data obtaining session

Scripting time: execution time of a script such as Javascript (registered trademark)

Rendering time: start-end time of screen rendering time.

FIG. 6 shows an example of data stored in the received log storage unit 1101.

In the following, operation of the quality estimation apparatus 1100 is shown.

Figure 7:
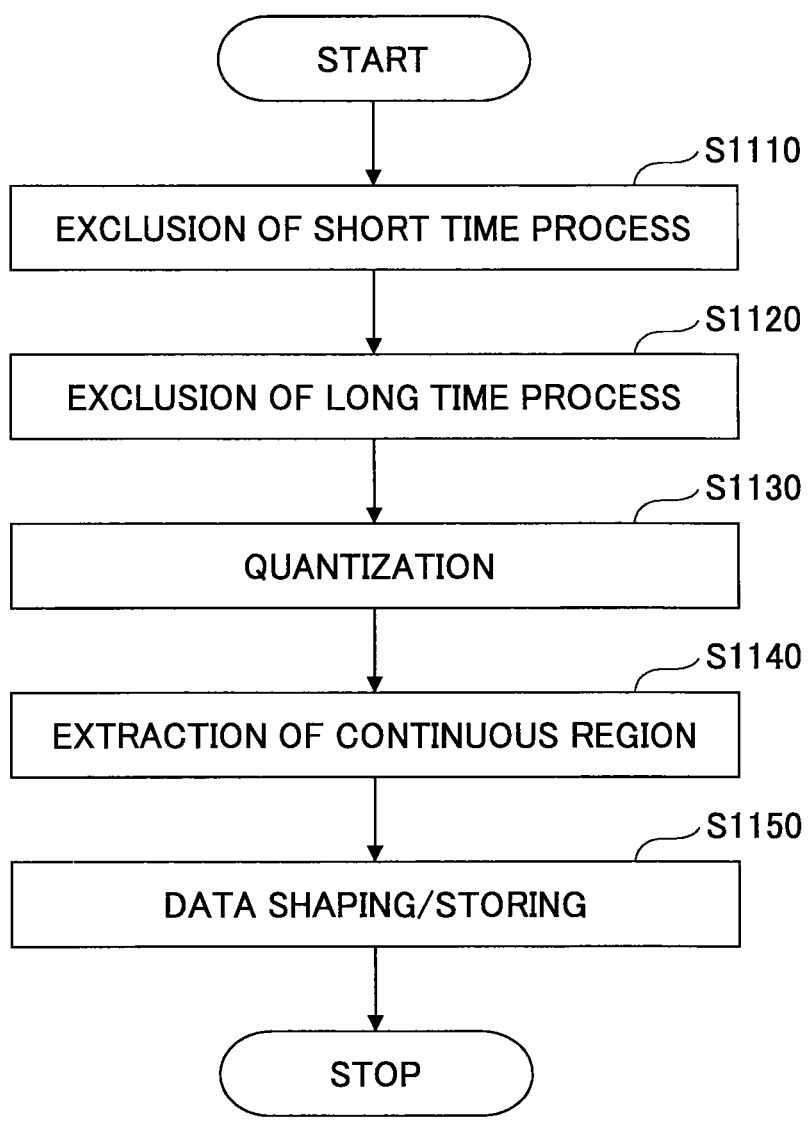
FIG. 7 shows a flowchart of operation of the quality estimation apparatus in the embodiment 1-1 of the present invention.

FIG. 7 is a flowchart of operation of the quality estimation apparatus in the embodiment 1-1 of the present invention.

Step 1110) The waiting time estimation unit 1120 of the quality estimation apparatus 1100 reads log data from the received log storage unit 1101. Since processes of very short duration time in each of Network, Scripting and Rendering have low correlation with the user experienced waiting time, processes shorter than a predetermined threshold L are excluded from the read log data.

The threshold L can be set for each process of Network, Scripting and Rendering for each application of an estimation target. As to thresholds, for example, sample data of evaluation of various types of thresholds shown in FIG. 8 are input, and, based on relationship between quality estimation results obtained by changing duration and actual experienced quality results of the user, combination of values of duration times that are closest to the user experienced quality are selected as the thresholds. For example, values such as 5, 10, 20, 30 . . . ms are input, and a value by which the result of quality estimation is closest to the user experienced waiting time is selected. More particularly, about one million combinations including parameters described later are set, and quality estimation of one million patterns are tried, so that a combination of values closest to the user experienced waiting time is used.

For example, a following threshold is set as a threshold L for the short time process for the application A. The threshold L is determined beforehand and is stored in a memory (not shown in the figure) of the waiting time estimation unit 1120.

Network threshold 10 ms

Scripting threshold 5 ms

Rendering threshold 3 ms

At this time, for performing experienced waiting time estimation of the application A, logs of a process time that is equal to or less than each of the above-mentioned thresholds are excluded for Network, Scripting, and Rendering.

Step 1120) Next, in log data from which log data that is equal to or less than the threshold L is excluded, processes in which duration time of Network, Scripting and Rendering is very long have low correlation with experienced waiting time of the user. Thus, processes of time length longer than a preset threshold H are excluded. A threshold H for each process of Network, Scripting and Rendering can be set for each application of an estimation target. The threshold can be set by a similar method as step 1110.

For example, following thresholds are set as thresholds H for the long time process for the application A. The threshold H is determined beforehand and is stored in a memory (not shown in the figure) of the waiting time estimation unit 1120.

Network threshold 10000 ms

Scripting threshold 30000 ms

Rendering threshold 100000 ms

Step 1130) Next, data for which processes of steps 1110 and 1120 have been performed is quantized at specific time intervals. In the quantization, timeslots each having a specific time length are provided, and the number of processes in each timeslot is calculated as multiplicity for each of Network, Scripting and Rendering. The length of the timeslot can be set according to applications.

Figure 9:
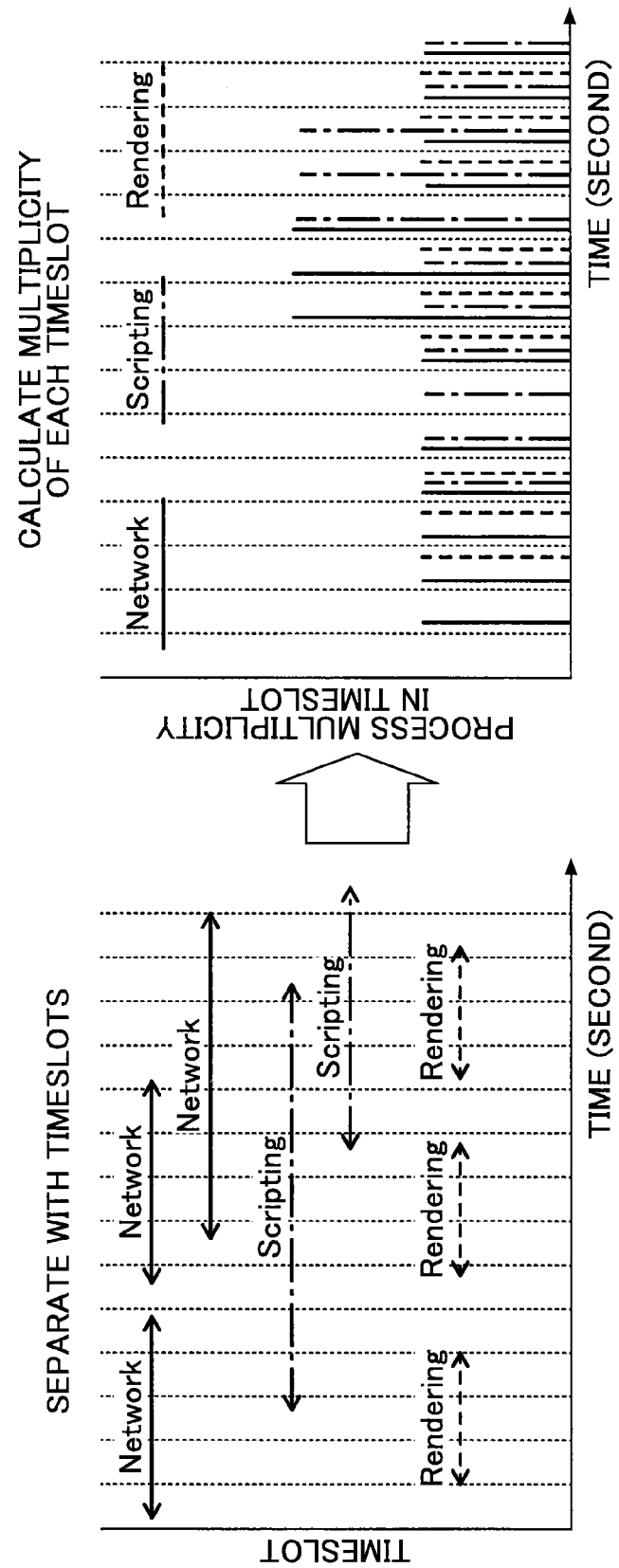
FIG. 9 shows an example of quantization in the embodiment 1-1 of the present invention.

FIG. 9 shows an example of quantization. In the figure, a timeslot of 0.1 second is set for an application B. For the logs of the application B, after processes of steps 1110 and 1120, the timeslot is provided every 0.1 second, and the number of processes in each slot is counted, so that multiplicity is calculated for each timeslot.

Step 1140) A continuous region is extracted from data quantized in step 1130. In an extraction method of the continuous region, in the present embodiment, evaluation is performed without distinction of Network, Scripting and Rendering. A method for performing evaluation with distinction of Network, Scripting and Rendering is described in embodiment 1-2 later.

There are following two methods as the method of evaluation without distinguishing between Network, Scripting and Rendering.

(1) A method of evaluation using only the time during which a sliding window continues (A-1):

(2) A method of evaluation using the time during which a sliding window continues and multiplicity (A-2):

First, the method of (1) is described.

Figure 10:
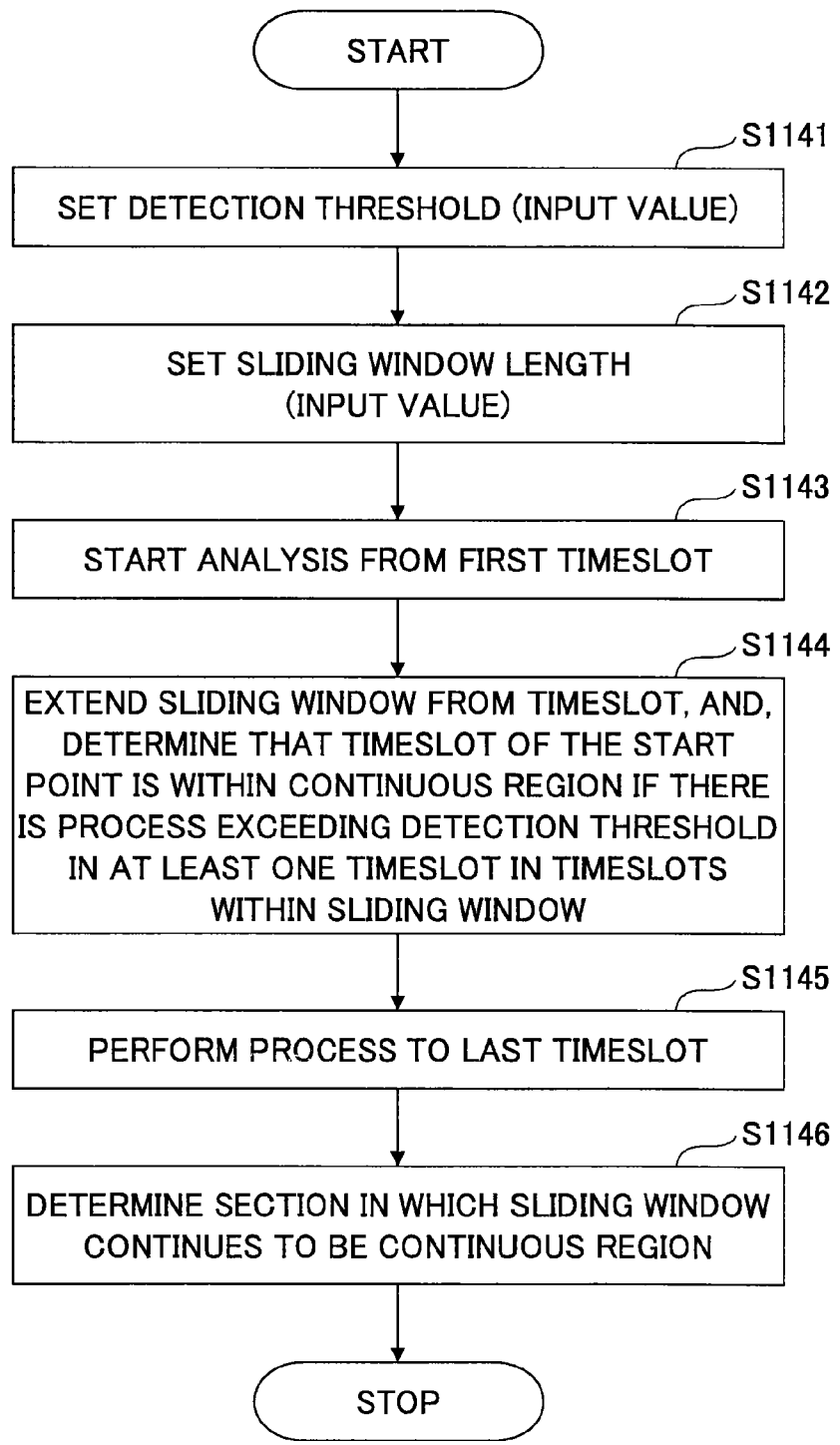
FIG. 10 shows a flowchart (1) of a continuous region extraction process in the embodiment 1-1 of the present invention.

FIG. 10 is a flowchart (1) of a continuous region extraction process in an embodiment 1-1 of the present invention.

Step 1141) An input detection threshold is set in a memory (not shown in the figure).

Step 1142) An input sliding window length is set in a memory (not shown in the figure).

Step 1143) Analysis starts from the first timeslot.

Step 1144) A sliding window is extended from the first timeslot, and, if there is a process exceeding the detection threshold in at least one timeslot of the timeslots in the sliding window (Example: if any one of Network, Scripting and Rendering exceeds the detection threshold), it is determined that the timeslot of the start point is within a continuous region. This determination process is performed by shifting the timeslot one by one in the direction of elapse of time.

Step 1145) The process is performed to the last timeslot.

Step 1146) A section in which the sliding windows including a timeslot that is determined to be within the continuous region continue is determined to be a continuous region.

Figure 11:
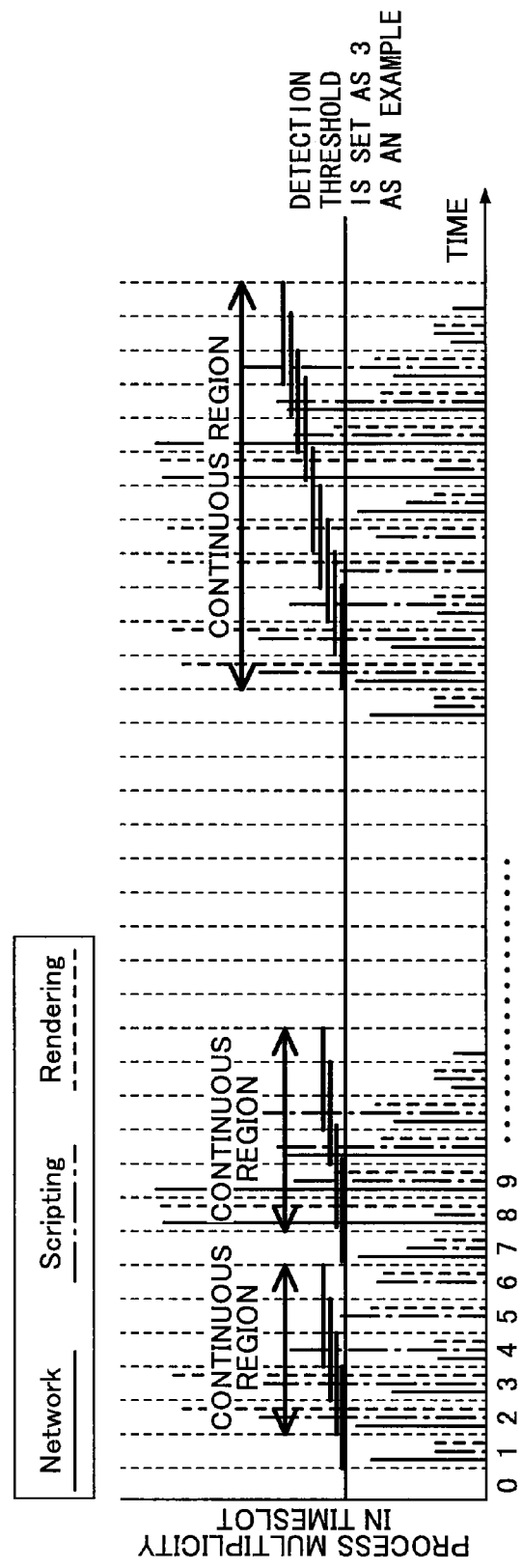
FIG. 11 shows an example (1) of continuous region extraction in the embodiment 1-1 of the present invention.

FIG. 11 shows an example of a determination method in step 1146. For example, in a case where the sliding window length is 3 and the detection threshold is 3, if there is at least one timeslot, that includes a process exceeding the detection threshold, within three slots from the first timeslot in a time elapse direction, the timeslots are determined within a continuous region.

Next, the above-mentioned "(2) A method of evaluation using time during which a sliding window continues and multiplicity" is described.

Figure 12:
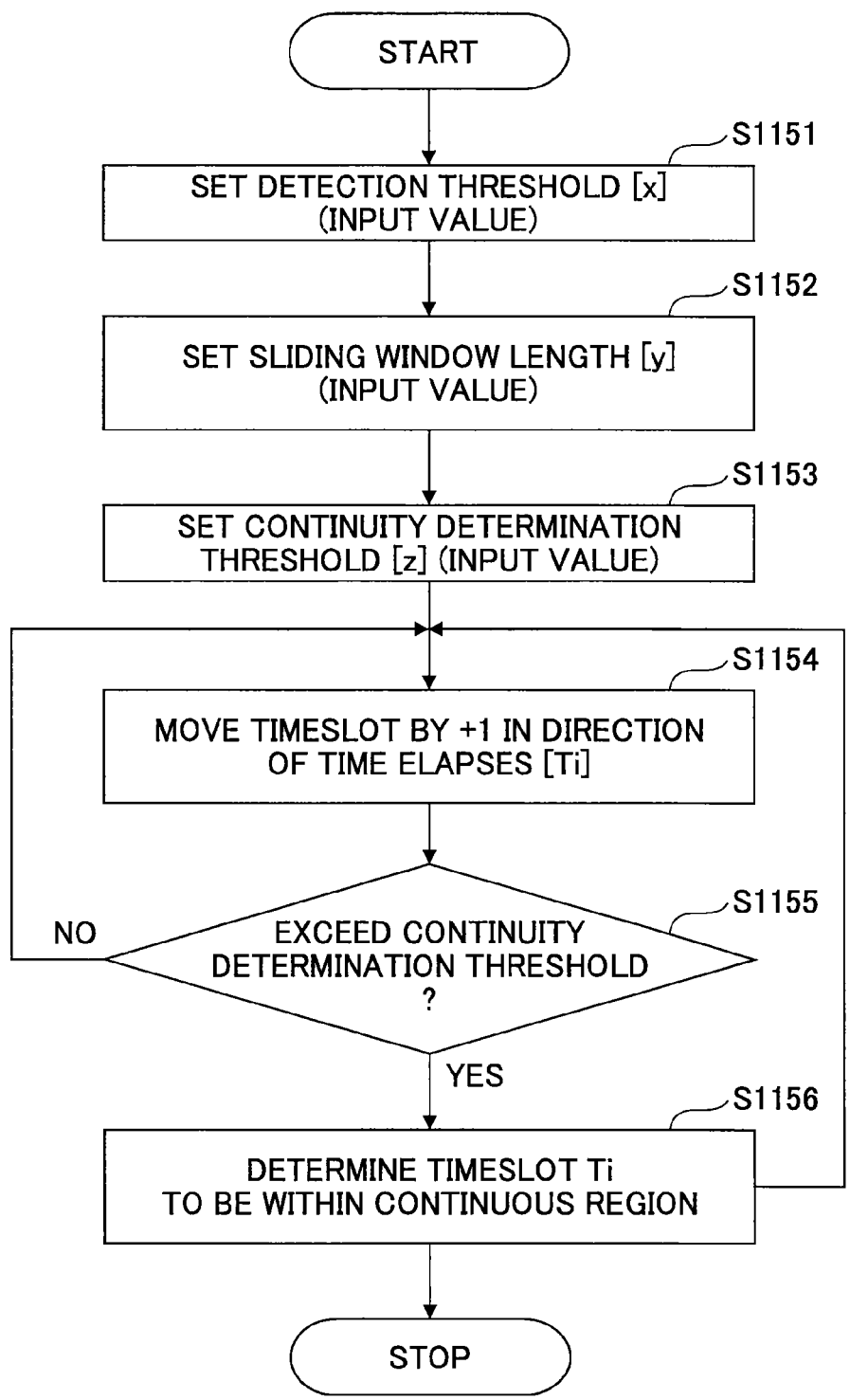
FIG. 12 shows a flowchart (2) of a continuous region extraction process in the embodiment 1-1 of the present invention.

FIG. 12 is a flowchart (2) of the continuous region extraction process in the embodiment 1-1 of the present invention.

Step 1151) An input detection threshold x is set in a memory (not shown in the figure).

Step 1152) An input sliding window length y is set in a memory (not shown in the figure).

Step 1153) An input continuity determination threshold z is set in a memory (not shown in the figure).

Step 1154) The timeslot Ti is incremented by +1 in a direction of elapse of time.

Step 1155) A sliding window is extended from the timeslot Ti as a start point, and if an existence ratio (ts/y) of the number (ts) of timeslots exceeding the detection threshold x exceeds the continuity determination threshold z, the process goes to step 1156, and if the ratio does not exceed, the process returns to step 1154.

Figure 13:
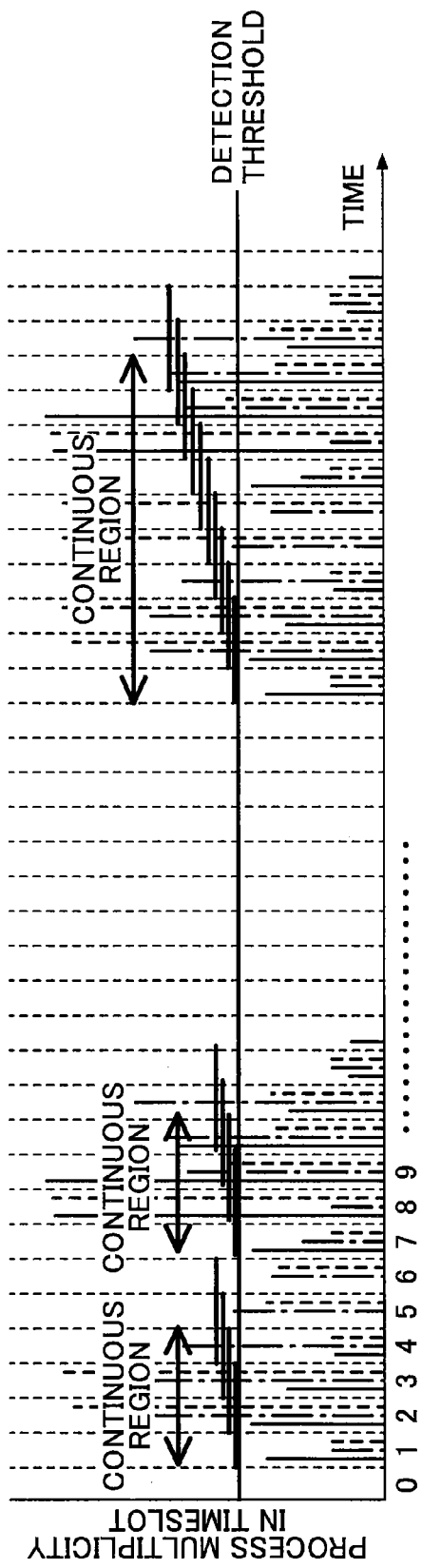
FIG. 13 shows an example (2) of continuous region extraction in the embodiment 1-1 of the present invention.

For example, in an example of FIG. 13, in a case where the sliding window length is 3, and the continuity determination threshold is 0.5, if there are two or more timeslots (the number of timeslots is an integer) in which the detection threshold (3) is exceeded within three lots in a time elapse direction from the start timeslot, the timeslot is determined to be within a continuous region. If the number of timeslots in which the detection threshold is exceeded is equal to or less than 1, the timeslot is not determined to be within the continuous region.

Step 1156) In a section of sliding windows, each of which starts from a timeslot Ti, in which the continuous determination threshold is exceeded, a region where the start points Ti continue is determined to be a continuous region.

Here, the flow of FIG. 7 is described.

Figure 14:
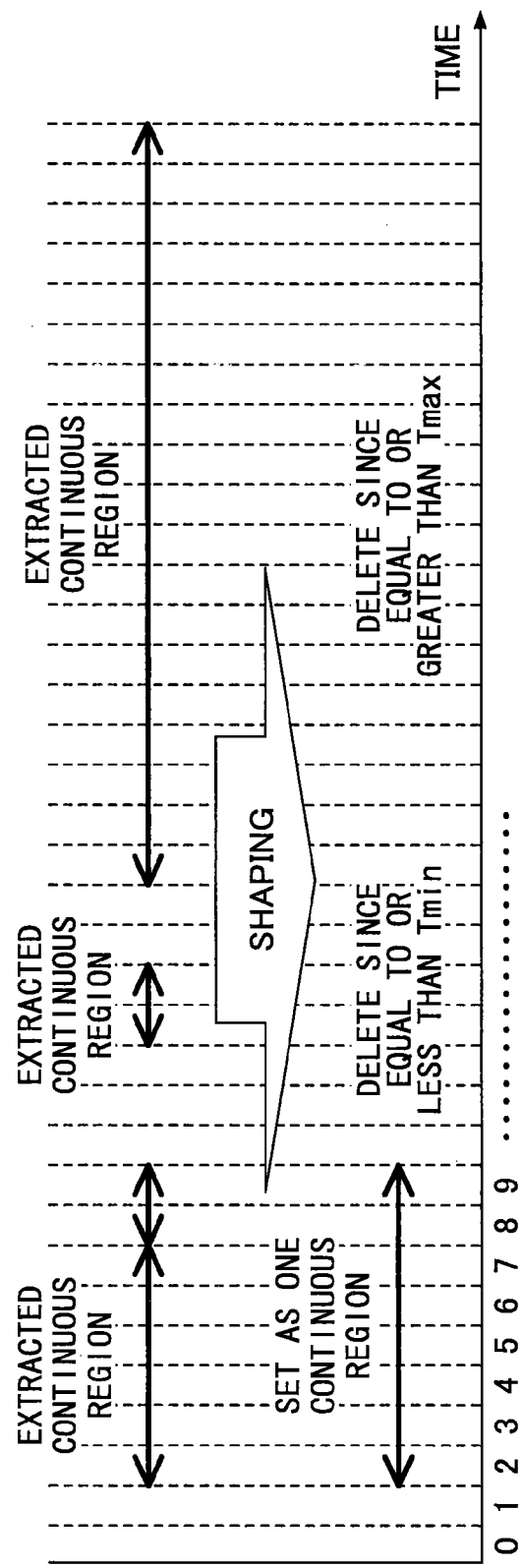
FIG. 14 shows an example of shaping of a continuous region in the embodiment 1-1 of the present invention.

Step 1150) A shaping process is performed on the continuous regions extracted in the above-mentioned step 1140 according to the following rule. FIG. 14 shows an example of shaping.

(1) In a case where the last slot of an extracted continuous region is continuous with a first slot of a next continuous region, the continuous regions are set to be one continuous region.

(2) If the length of the continuous region after the process of (1) is equal to or less than a threshold Tmin, the continuous region is deleted.

(3) If the length of the continuous region after the process of (1) is equal to or greater than a threshold Tmax, the continuous region is deleted.

The threshold Tmin is set for the purpose of excluding a waiting time (0.5-2 seconds) that a user cannot experience. Tmax is set for the purpose of excluding a state (freeze) in which a response of the system is stopped.

After performing the shaping process, the continuous regions are stored in a storage unit as an estimated waiting time, or displayed on a display unit. As to the continuous region, as many continuous regions (estimated waiting time) as the number of user operations are output. More specifically, if an application is operated 10 times, 10 continuous regions appear.

Embodiment 1-2

In the embodiment 1-2, three methods are described for performing evaluation by distinguishing Network, Scripting and Rendering in step 1140 of FIG. 7 in the embodiment 1-1.

Since the configuration of the quality estimation apparatus and processes other than step 1140 are the same as those in the embodiment 1-1, the description is not provided.

In step 1140 of the embodiment 1-2, in a method of evaluation by distinguishing between Network, Scripting and Rendering, it becomes possible to change the detection threshold and the like in each process of Network, Scripting and Rendering, so that improvement of accuracy of user experienced waiting time extraction can be expected. But, the number of parameters that are required to set becomes more than that in "(2) A method of evaluation using time during which a sliding window continues and multiplicity (A-2)".

A first method (B-1) of the present embodiment is described.

Figure 15:
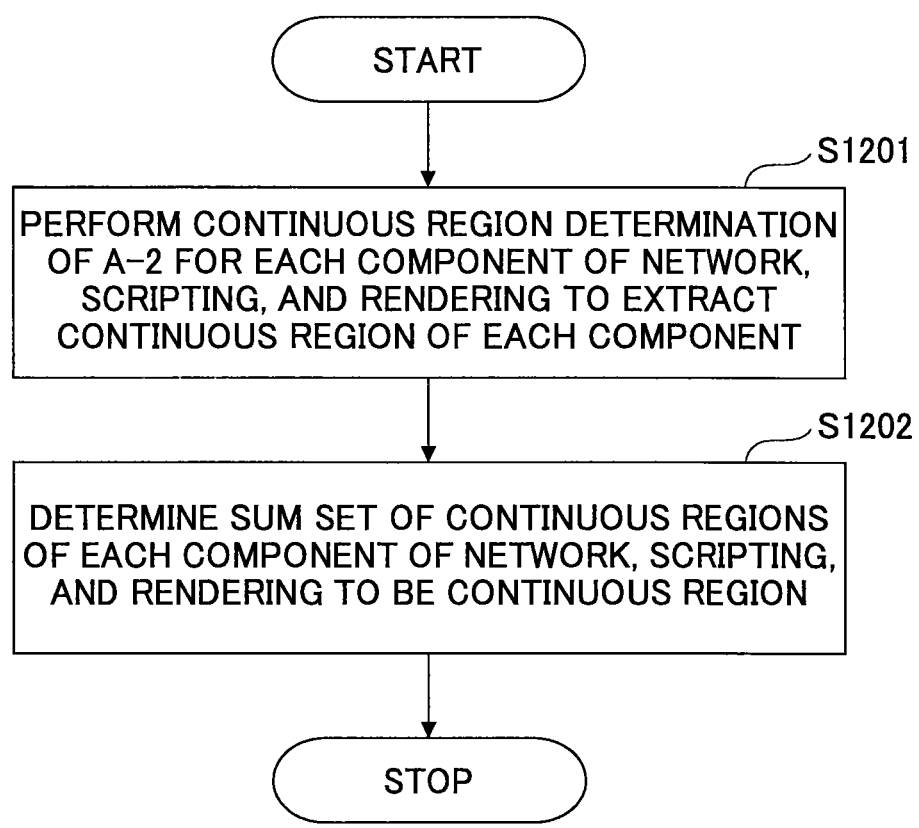
FIG. 15 shows a flowchart (1) of a continuous region extraction process in the embodiment 1-2 of the present invention.

FIG. 15 is a flowchart (1) of a continuous region extraction process in the embodiment 1-2 of the present invention.

Step 1201) The continuous region determination is performed by A-2 of the embodiment 1-1 for each component of Network, Scripting and Rendering, so as to extract continuous regions of each component. In order to perform the process similar to A-2, three parameters of the sliding window length, the detection threshold and the continuity determination threshold are necessary, and different values can be set for each component of Network, Scripting and Rendering.

Figure 16:
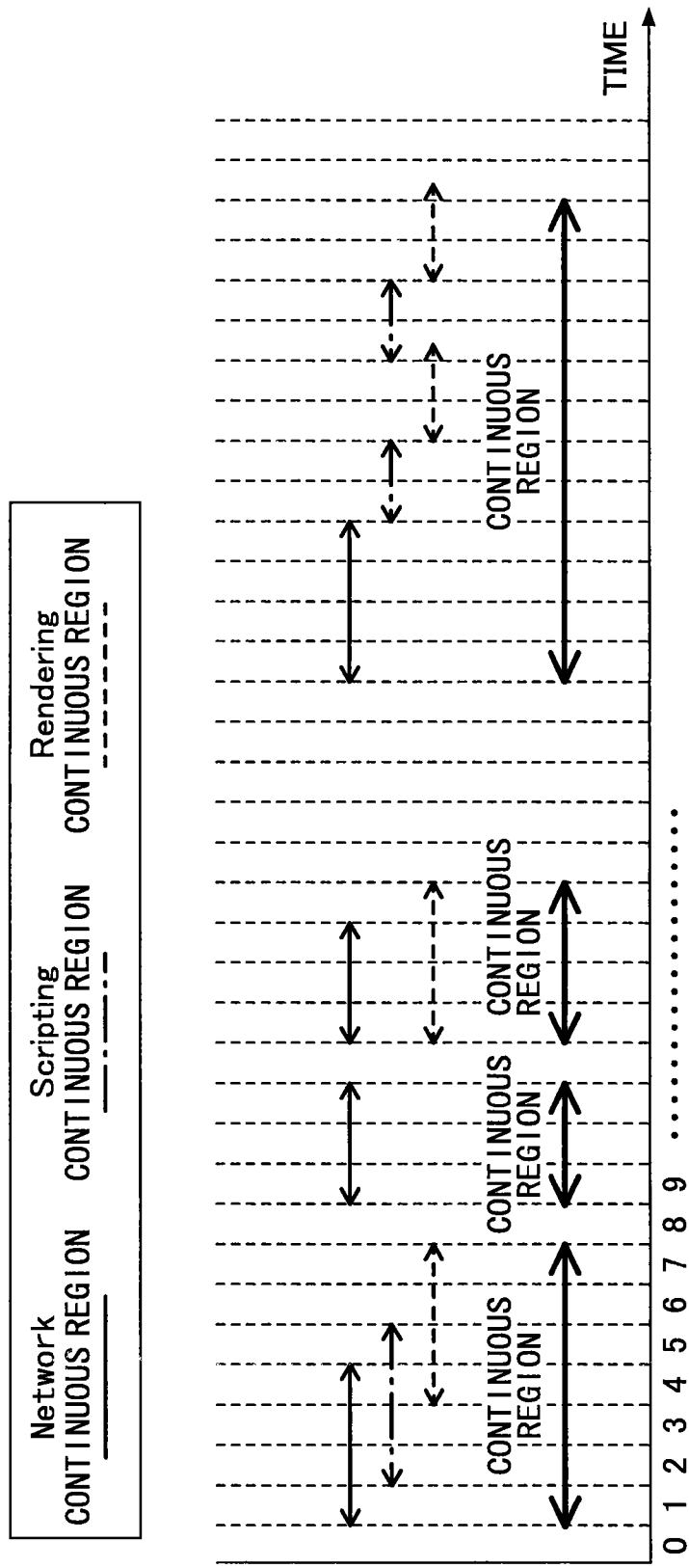
FIG. 16 shows an example of a sum set process after determining continuous regions for each component in the embodiment 1-2 of the present invention.
Figure 17:
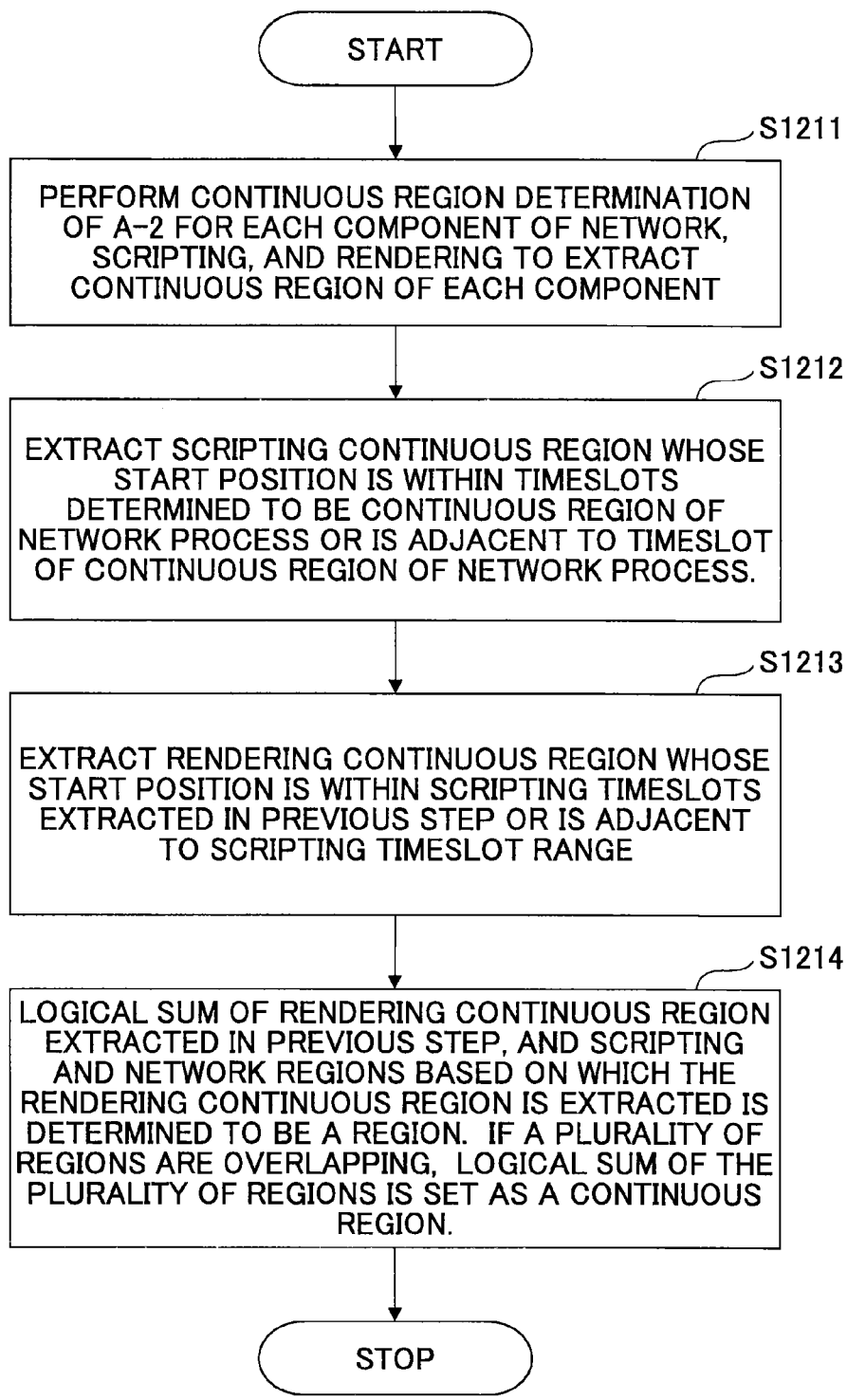
FIG. 17 shows a flowchart (2) of a continuous region extraction process in the embodiment 1-2 of the present invention.
Figure 18:
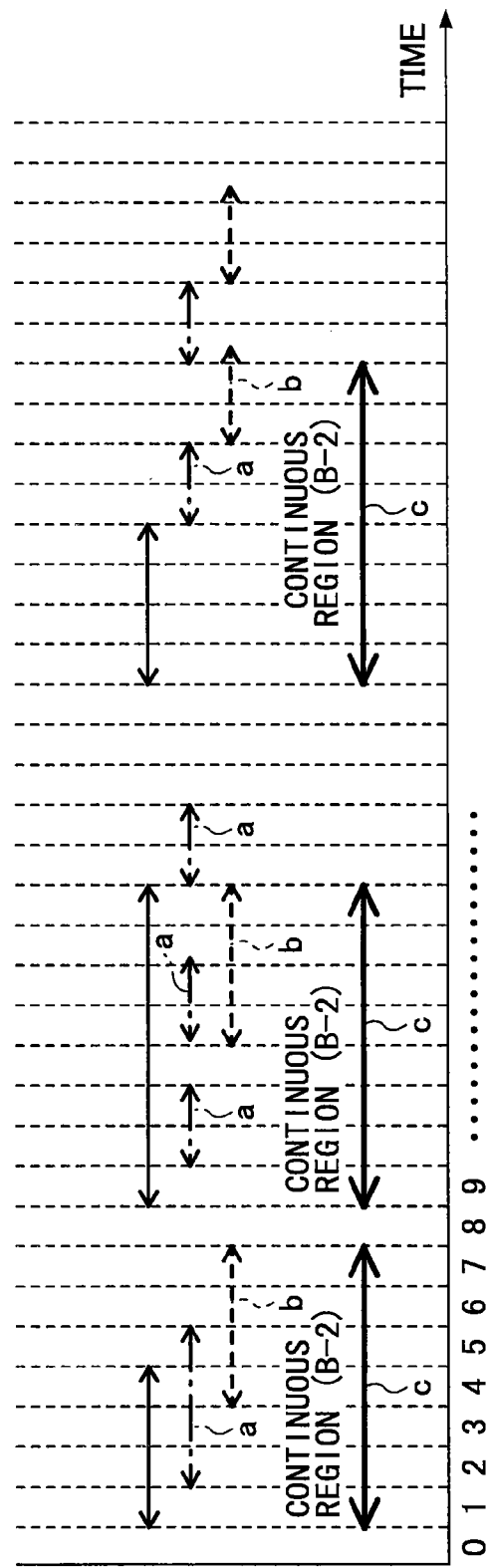
FIG. 18 shows an example of extraction of continuous region formed by a flow of Network⇒ Scripting⇒ Rendering in the embodiment 1-2 of the present invention.

Step 1202) As shown in FIG. 16, for each component of Network, Scripting and Rendering, a sum set of continuous regions is determined to be a continuous region. Next, a second process (B-2) is described, in which, by focusing on the fact that the process according to the operation of the user is performed in an order of Network⇒ Scripting⇒ Rendering, a combination of this sequence is extracted after the process of steps 1110-1130 so as to extract a section correlated to the user experienced waiting time. FIG. 17 is a flowchart (2) of the continuous region extraction process in the embodiment 1-2 of the present invention. In FIG. 18, a region extracted by the process of the flowchart is described as (B-2).

Step 1211) The continuous region determination is performed by A-2 of the embodiment 1-1 for each component of Network, Scripting and Rendering, so as to extract continuous regions of each component. Like step 1201 of FIG. 15, three parameters of the sliding window length, the detection threshold and the continuity determination threshold are necessary, and different values can be set for each component of Network, Scripting and Rendering.

Step 1212) This step extracts each Scripting continuous region ("a" of FIG. 18) whose start position is within timeslots determined to be the continuous region of the Network process or is adjacent to a timeslot range determined to be the continuous region of the Network process.

Step 1213) This step extracts each Rendering continuous region ("b" of FIG. 18) whose start position is within Scripting timeslots extracted in step 1212 or is adjacent to the Scripting timeslot range.

Step 1214) A logical sum of the Rendering continuous region extracted in step 1213, and Scripting and Network regions based on which the Rendering continuous region is extracted is determined to be a region ("c" of FIG. 18). If a plurality of regions are overlapping, a logical sum of the plurality of regions is set as a continuous region.

Next, a third method (B-3) is described for, in addition to the second method, extracting a process performed only in an order of Network⇒ Rendering, and a process performed only in an order of Scripting⇒ Rendering.

Figure 19:
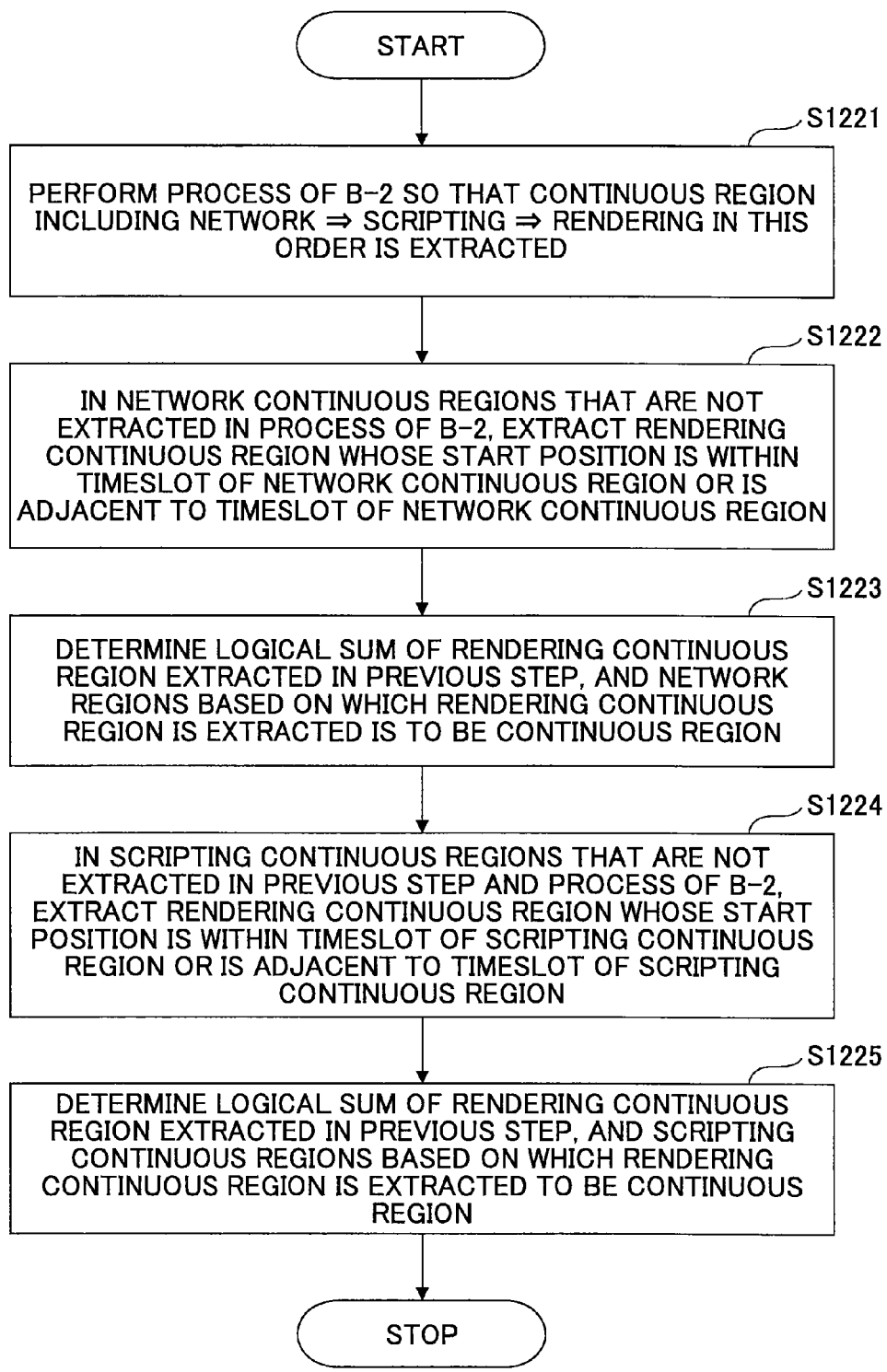
FIG. 19 shows a flowchart (3) of a continuous region extraction process in the embodiment 1-2 of the present invention.
Figure 20:
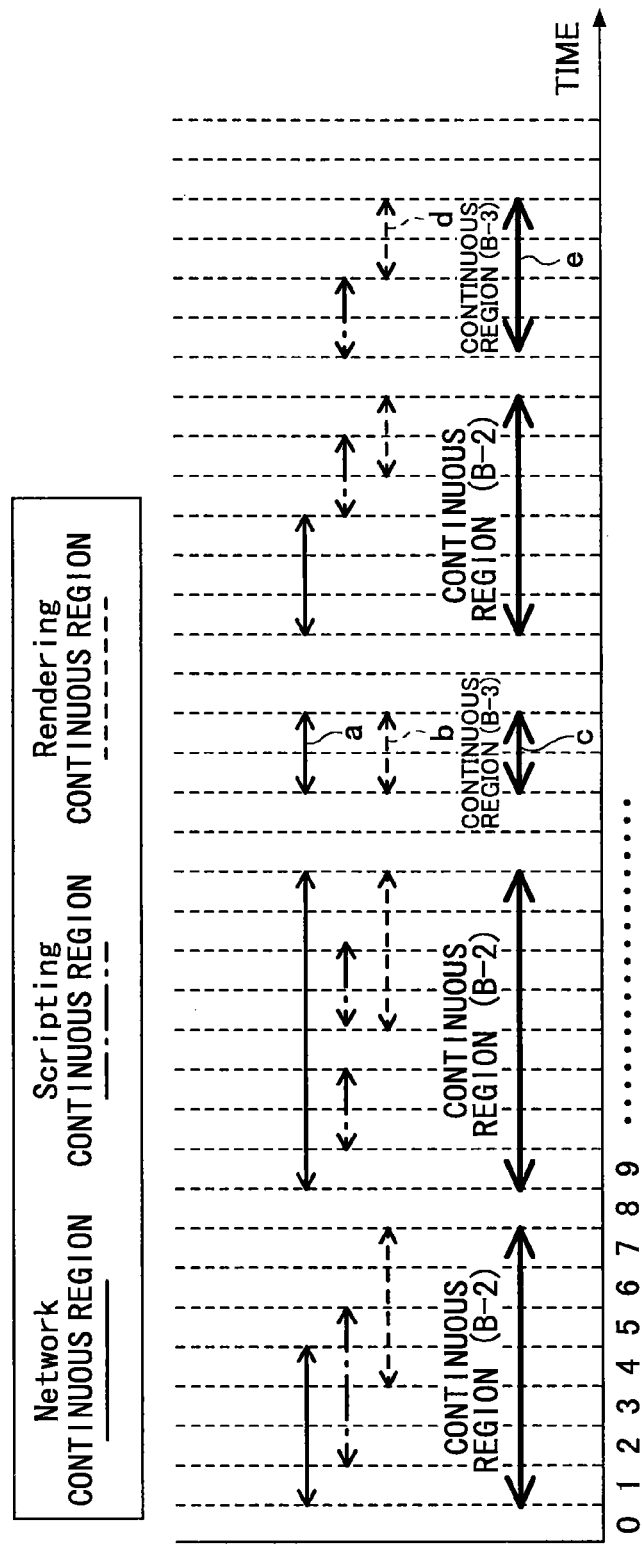
FIG. 20 shows an example of extraction of continuous region formed by a flow of Network⇒ Rendering, Scripting ⇒ Rendering in the embodiment 1-2 of the present invention.

FIG. 19 shows a flowchart (3) of a continuous region extraction process in an embodiment of the present invention. In FIG. 20, each region extracted by the process of FIG. 17 is indicated by (B-2), and each region extracted by the process of the flowchart is indicated by (B-3).

Step 1221) The process of B-2 shown in FIG. 17 is performed so that a continuous region including Network, Scripting and Rendering in this order is extracted.

Step 1222) In Network continuous regions ("a" of FIG. 20) that are not extracted in step 1221, each rendering continuous region (b of FIG. 20) whose start position is within the timeslot of the network continuous region or is adjacent to a last time slot of the Network continuous region is extracted.

Step 1223) A logical sum of the Rendering continuous region extracted in step 1222, and Network regions based on which the Rendering continuous region is extracted is determined to be a continuous region ("c" of FIG. 20).

Step 1224) In Scripting continuous regions that are not extracted in step 1223 and the process of B-2, each rendering continuous region ("d" of FIG. 20) that starts adjacent to a timeslot of an end point of the Scripting continuous region is extracted.

Step 1225) A logical sum of the Rendering continuous region extracted in step 1224, and Scripting continuous regions based on which the Rendering continuous region is extracted is determined to be a continuous region ("e" of FIG. 20).

According to the user experienced quality estimation apparatus shown in the embodiments 1-1 and 1-2, always estimation of the user experienced waiting time can be realized for various applications, and it becomes possible to always monitor the user experienced quality by the user experienced quality estimation apparatus.

It is possible to construct operation of each component of the user experienced quality estimation apparatus shown in FIG. 5 as a program, and it is possible to install the program in a computer used as a user experienced quality estimation apparatus or to distribute the program via a network.

More specifically, the user experienced quality estimation apparatus shown in FIG. 5 can be realized by causing a computer to execute a program coded with process content described in the present embodiment. More specifically, the function of each part of the user experienced quality estimation apparatus can be realized by executing a program corresponding to processes executed by each unit by using hardware resources such as a CPU, a memory and a hard disk embedded in a computer which forms the user experienced quality estimation apparatus. The program can be saved or distributed by recording the program in a computer readable recording medium, (portable memory and the like). Also, the program, can be provided via a network by the Internet, e-mail and the like.

In the present embodiment, for example, there is provided a user experienced quality estimation program for causing a computer to function as a user experienced quality estimation apparatus for estimating a user experienced waiting time of an application in an user terminal, the program causing the computer to function as:

a data reception unit configured to obtain, as estimation target logs, a duration time of each process of data obtaining, script execution and screen rendering performed in an estimation target period in the user terminal, and to store the estimation target logs in a received log storage unit;

a log exclusion unit configured to read out the estimation target logs from the received log storage unit, and output logs from which logs having data duration time shorter than a predetermined short time process threshold or longer than a predetermined long time process threshold are excluded;

a quantization unit configured to calculate, as multiplicity, the number of processes in a timeslot of a constant time length for the logs output from the log exclusion unit; and a continuous region extraction unit configured to extract a continuous region from data quantized by the quantization unit, wherein the continuous region extraction unit includes:

a first continuous region extraction unit configured to extract a continuous region without distinguishing between processes of the data obtaining, the script execution and the screen rendering, or a second continuous region extraction unit configured to extract a continuous region by distinguishing between processes of the data obtaining, the script execution and the screen rendering.

Second Embodiment

Next, a second embodiment is described. The second embodiment is an embodiment corresponding to the second object.

Figure 21:
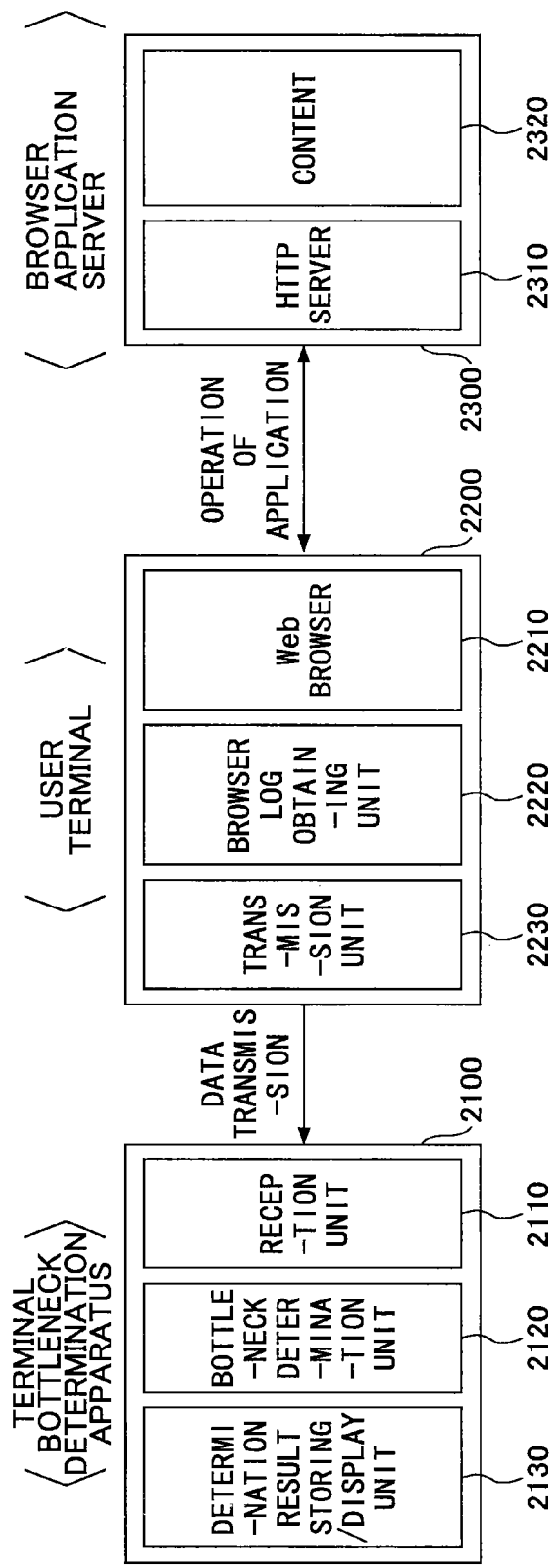
FIG. 21 shows an example of a system configuration of a second embodiment of the present invention.

FIG. 21 shows an example of a system configuration of the present embodiment.

The system shown in the figure includes a terminal bottleneck determination apparatus 2100, a user terminal 2200, and a browser application server 2300.

The user terminal 2200 includes a Web browser 2210, a browser log obtaining unit 2220, and a transmission unit 2230, and executes content 2310 (application) of the application server 2300 on the Web browser 2210. The browser log obtaining unit 2220 obtains process information logs of the browser, and the transmission unit 2230 performs data transmission to the terminal bottleneck determination apparatus 2100.

The terminal bottleneck determination apparatus 2100 includes a reception unit 2110, a bottleneck determination unit 2120, a determination result storing/display unit 2130, and receives logs transmitted from the user terminal 2200 by the reception unit 2110, performs determination of terminal bottleneck by the bottleneck determination unit 2120, and stores/displays the result by the determination result storing/display unit 2130.

The browser application server 2300 includes an HTTP server 2310, and content 2320 is stored in a storage unit. The content 2320 includes content including dynamic content and the like.

The user terminal 2200 obtains process types (Network, Scripting, Rendering) which are abstracted from the Web browser and required time data, and transmits the data to the terminal bottleneck determination apparatus 2100.

The terminal bottleneck determination apparatus 2100 performs terminal bottleneck determination from the data. For performing terminal bottleneck determination, there are two types, which are a reference determination method for performing bottleneck determination by supplying input data that is a comparison target each time, and a non-reference determination method for storing the data that is a comparison target, and comparing the stored result.

In the following, an example of the reference log determination method is described as an embodiment 2-1 and an example of the non-reference determination method is described as an embodiment 2-2.

Embodiment 2-1

Figure 22:
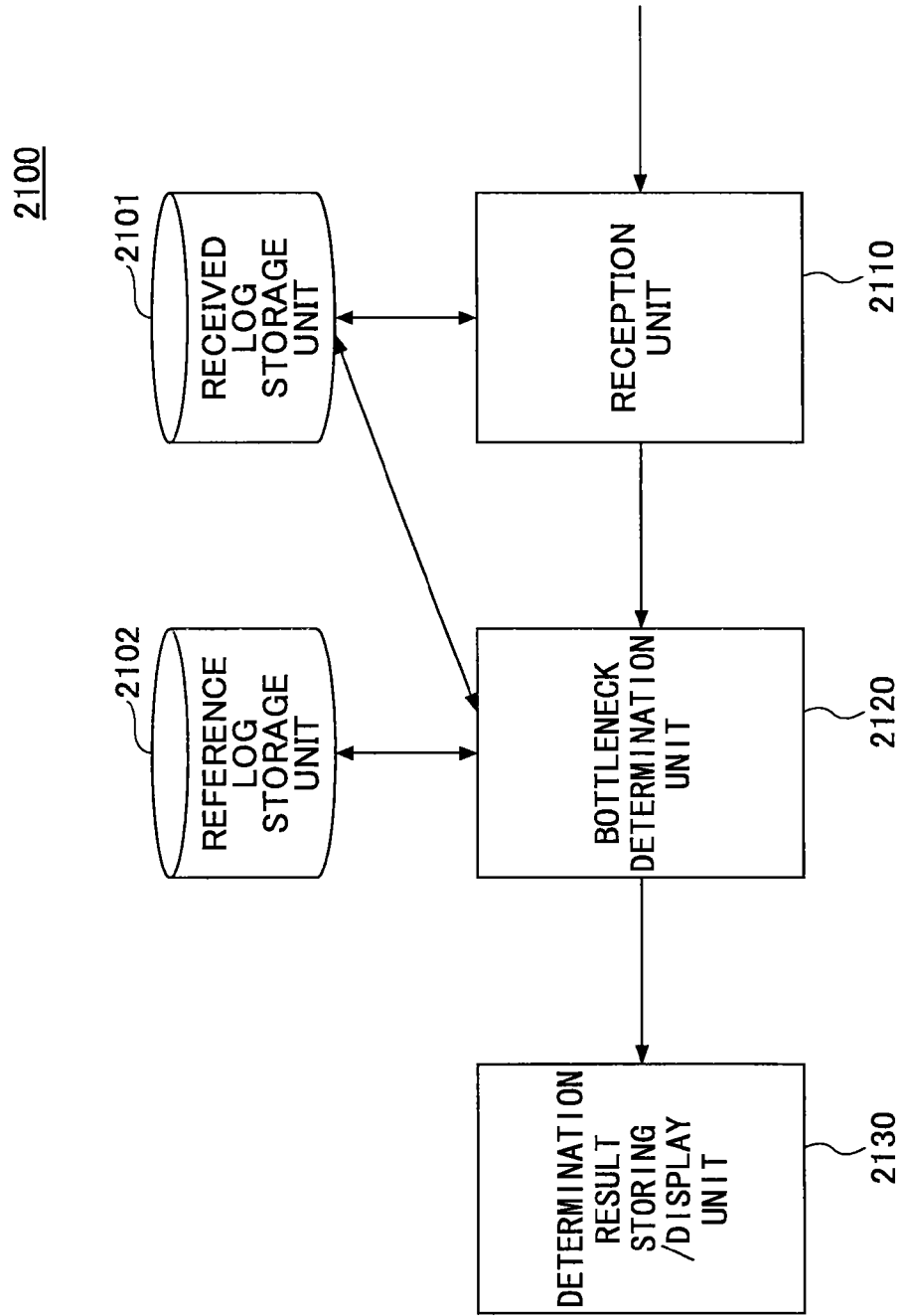
FIG. 22 shows a configuration example of a terminal bottleneck determination apparatus in an embodiment 2-1 of the present invention.

FIG. 22 shows a configuration example of the terminal bottleneck determination apparatus in the embodiment of the present invention. The terminal bottleneck determination apparatus 2100 shown in the figure includes a received log storage unit 2101, a reference log storage unit 2102, a reception unit 2110, a bottleneck determination unit 2120, and a determination result storing/display unit 2130.

The received log storage unit 2101 temporarily stores the following information that is obtained by the browser log obtaining unit 2220 of the user terminal 2200 and that is received by the reception unit 2110

Network time: data obtaining session start/end time

Scripting time: execution time of script such as Javascript (registered trademark)

Rendering time: start and end time of screen rendering time

FIG. 23 shows a data example that is stored. The data shown in the figure is an example of a browser log from operation start 0 second to 15 second, and the browser log is formed by a start time (second), duration time (millisecond) and process type. Here, the duration time indicates a session duration time for the network, and indicates a rendering time for Rendering. In a normal process, a large amount of logs in which these processes continue for several milliseconds-several tens of milliseconds are output. For example, when a browser is operated for about three minutes, 10 thousands of lines of the logs are output.

Figure 24:
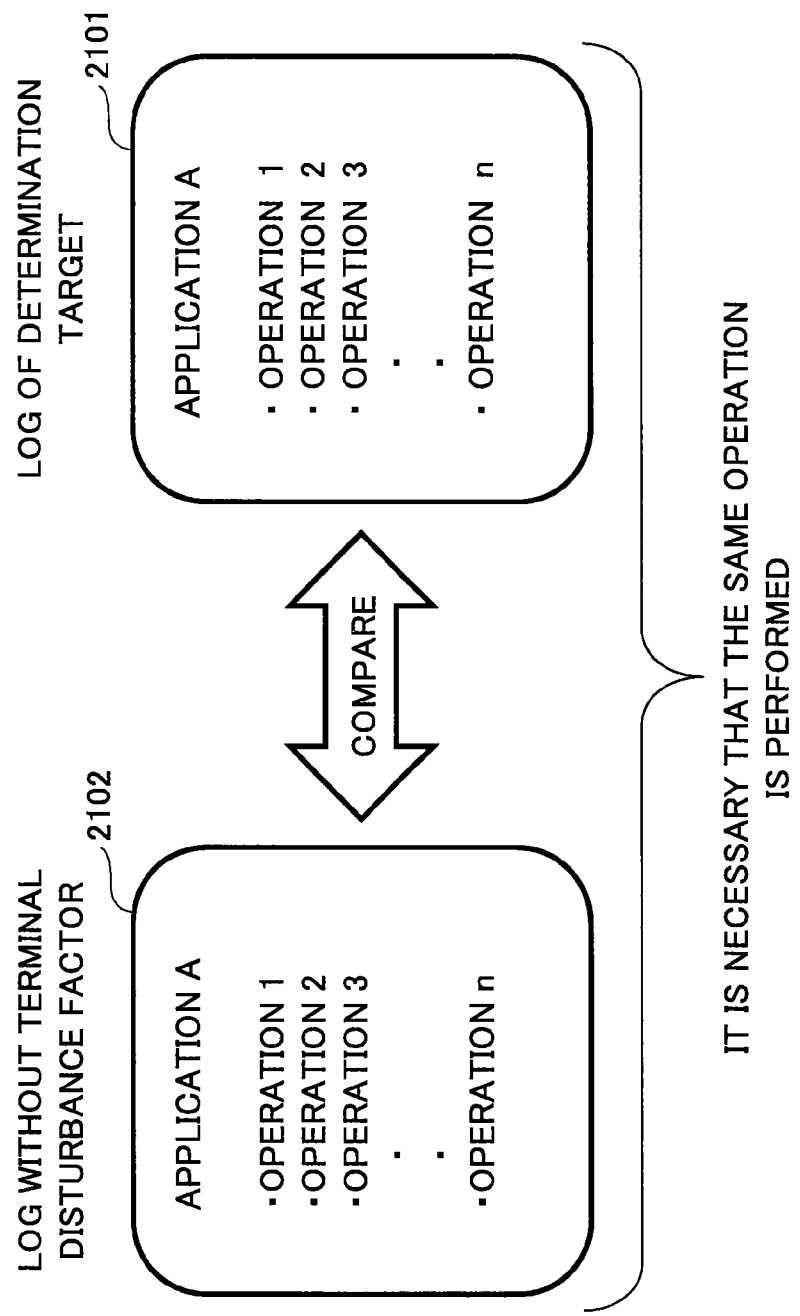
FIG. 24 is a diagram for explaining reference determination in the embodiment 2-1 of the present invention.

The reference log storage unit 2102 temporarily stores logs (reference log) of a state in which there is no disturbance factor in the user terminal. As shown in FIG. 24, in reference log determination, since it is assumed that the reference log and the received log (determination target log) are for the same process, logs corresponding to the same operation as the received logs become necessary. When there is no log corresponding to the same operation, an operator executes the same operation so that the log is stored, and the log is compared with the determination target log. In an actual application use environment, it is not realistic to prepare logs of the same operation beforehand. Thus, when receiving a report such as complaint, the operator performs the same operation as that performed by the customer to prepare the reference log as a log that can be compared, or, there is a method to define standard operation scenarios, and request the customer to provide logs in which the standard operation is performed.

In the following, a reference determination process by the bottleneck determination unit 2120 is described.

Figure 25:
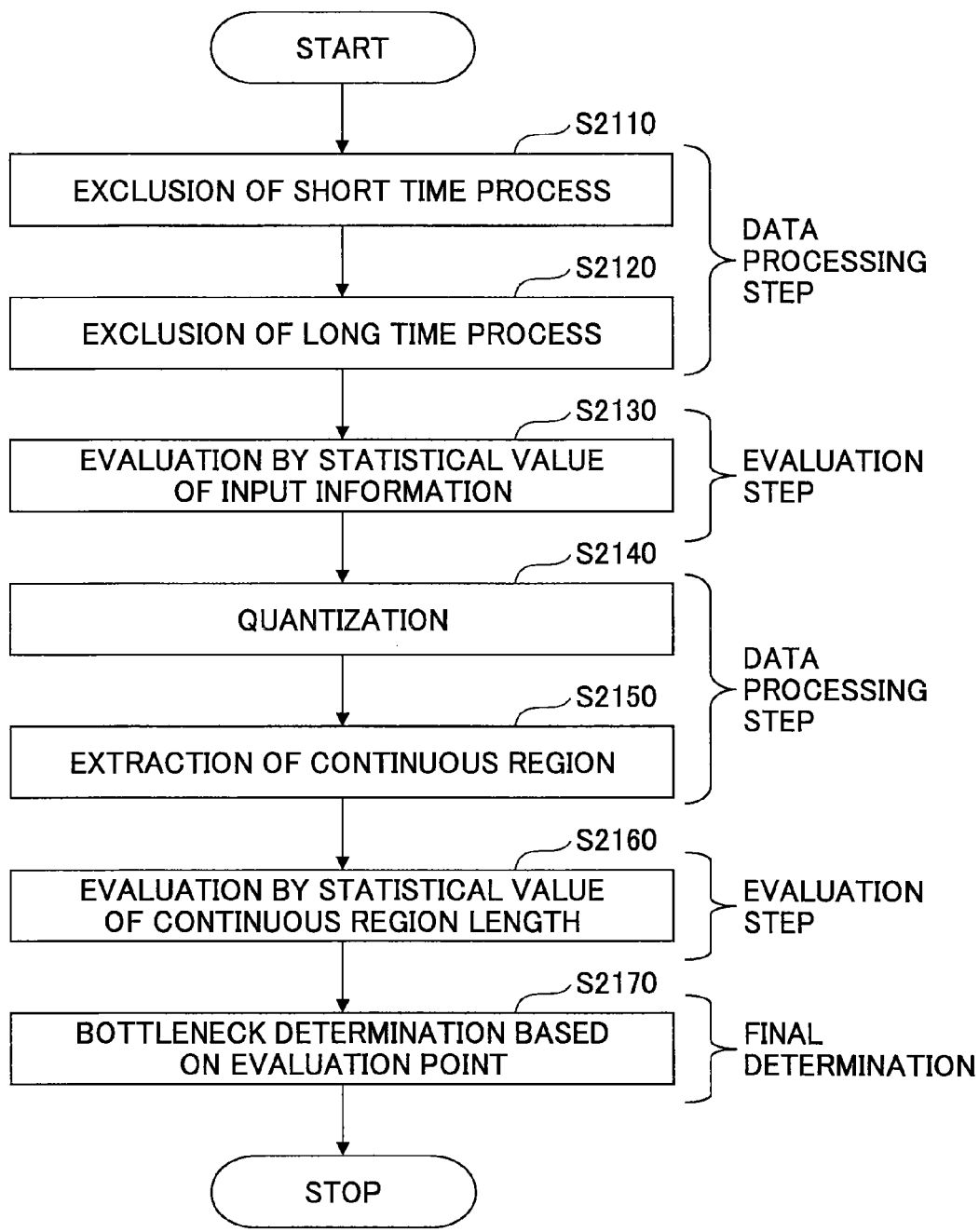
FIG. 25 is a flowchart of a reference determination process in the embodiment 2-1 of the present invention.

FIG. 25 is a flowchart of reference determination in the embodiment 2-1 of the present invention.

It is assumed that the reception unit 2110 receives the determination target logs and stores the logs in the received log storage unit 2101, and the reference logs are collected by any of the above-mentioned methods, so that the reference logs are stored in the reference log storage unit 2102.

Step 2110) The bottleneck determination unit 2120 reads log data from the received log storage unit 2101 and the reference log storage unit 2102 respectively. Since processes of very short duration in each of Network, Scripting and Rendering have low correlation with the user experienced waiting time, processes shorter than a predetermined threshold are excluded from the logs in this step. The threshold is empirically calculated from sample data shown in FIG. 26, for example. As to the threshold, some values are input, and a value by which the result of quality estimation is closest to the user experienced waiting time is selected. The threshold can be set for each process of Network, Scripting and Rendering for each application of an estimation target. For example, examples of short time process thresholds for the application A are shown below.

Network threshold: 10 ms
Scripting threshold: 5 ms
Rendering threshold: 3 ms

When performing experienced waiting time estimation for the application A, for Network, Scripting, Rendering, logs of a process time equal to or less than the threshold are excluded in this step.

Step 2120) Next, processes in which duration time of Network, Scripting and Rendering is very long are excluded. Since processes in which duration time of Network, Scripting and Rendering is very long have low correlation with experienced waiting time of the user, it becomes long time longer than the threshold. The threshold for each process of Network, Scripting and Rendering can be set for each application of an estimation target.

For example, following thresholds are set as thresholds.
Network threshold: 10000 ms
Scripting threshold: 30000 ms
Rendering threshold: 100000 ms For Network, Scripting, Rendering, logs of a process time equal to or greater than the threshold are excluded in this step.

Step 2130) Next, for both of the reference logs and the determination target logs from which short time processes and longtime processes (steps 2110, 2120) are excluded, evaluation by statistical values is performed. In this evaluation process, following evaluation is performed since, when the user terminal 220 is the bottleneck, the process duration time of Scripting and Rendering tends to become long.

a) Evaluation by Scripting process duration time:

For each Scripting process corresponding to the reference log and the determination target log, any of following statistical values for duration time is compared, and if a value for the determination target log is longer, a point is added as an evaluation of the determination target log by the Scripting process duration time. The adding point value can be individually set for each statistical value. For example, settings can be made as follows.

99% value if longer by equal to or greater than X %, 1 is added, if longer by equal to or greater than Y % (Y>X), 2 is added.
90% value if longer by equal to or less than X %, 0 is added.
Average value if shorter by equal to or greater than Z %, −1 is added, if shorter by equal to or greater than W % (W>Z), −2 is added.

Although representative statistical values are presented here, other statistical values may be used.

b) Evaluation by Rendering process duration time:

For each Rendering process corresponding to the reference log and the determination target log, a statistical value similar to the Scripting process for the duration time is compared, and if a value for the determination target log is longer, a point is added as an evaluation of the determination target log by the Rendering process duration time. The adding point value can be individually set for each statistical value. Also, not limited to this example, any statistical value can be set like the case of a).

The total sum of the added values obtained in the step are used for bottleneck determination based on the evaluation point in step 2170.

Figure 27:
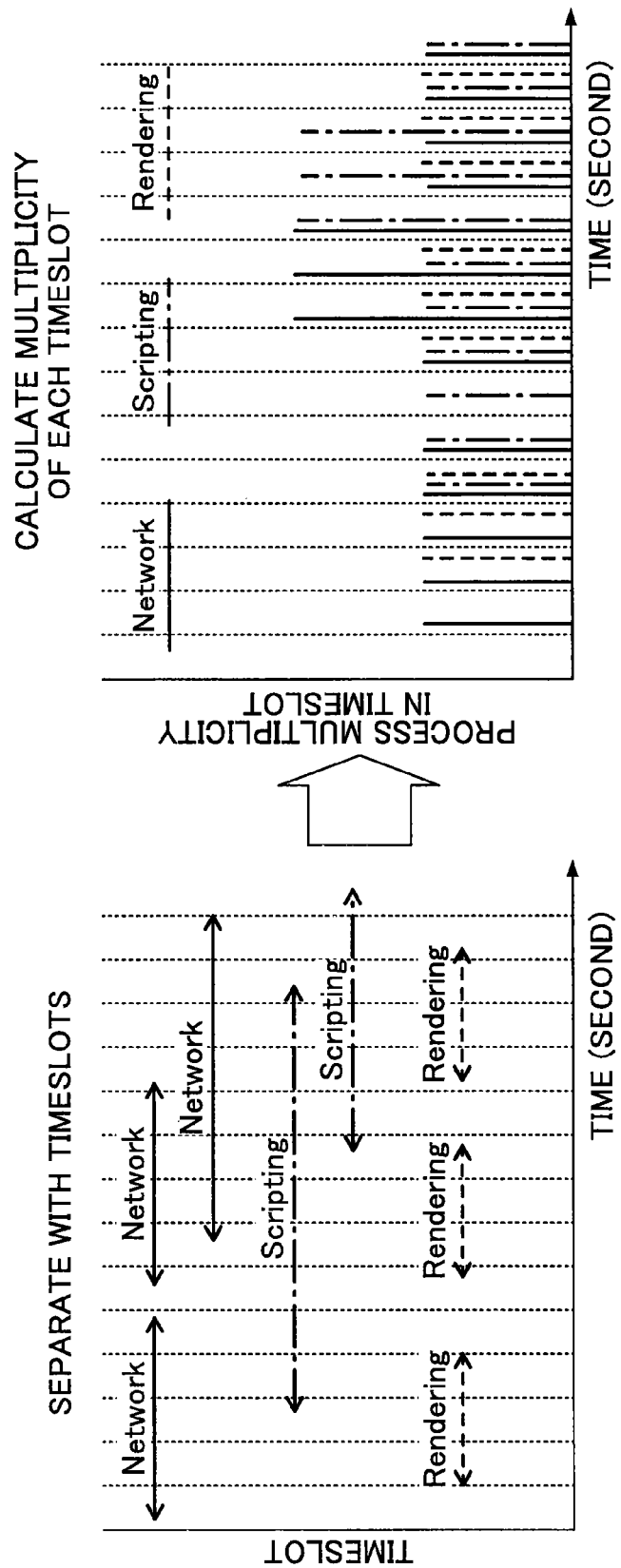
FIG. 27 shows an example of quantization in the embodiment 2-1 of the present invention.

Step 2140) Next, quantization is performed for both of the reference log and the determination target log. For data from which short time processes are excluded in step 2110 and longtime processes are excluded in step 2120, quantization is performed at specific time intervals. In a method of quantization, timeslots each having a specific time length are provided, and the number of processes in each timeslot is calculated as multiplicity for each of Network, Scripting and Rendering. FIG. 27 shows an example of quantization. In the figure, a timeslot of 0.1 second is set for an application B. For the logs of the application B, the timeslot is provided every 0.1 second, and the number of processes in each slot is counted, so that multiplicity is calculated for each timeslot.

Step 2150) For both of the reference log and the determination target log, continuous region extraction of each of Scripting and Rendering is performed. In the following, an example of the continuous region extraction process is shown.

Figure 28:
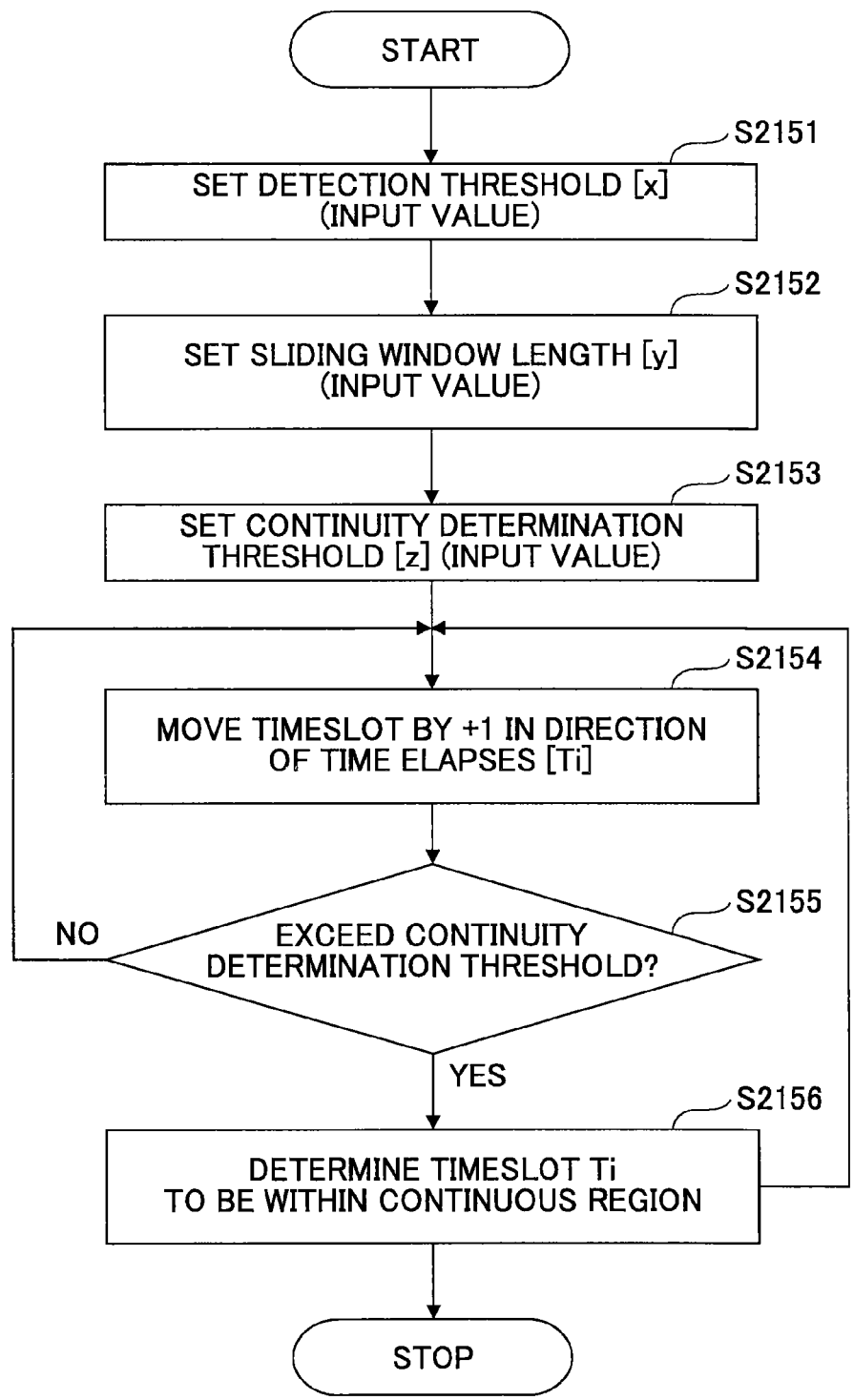
FIG. 28 shows a flowchart of a continuous region extraction process in the embodiment 2-1 of the present invention.

FIG. 28 is a flowchart of the continuous region extraction process in the embodiment 2-1 of the present invention.

Step 2151) An input detection threshold x is set in a memory (not shown in the figure).

Step 2152) An input sliding window length y is set in a memory (not shown in the figure).

Step 2153) An input continuity determination threshold z is set in a memory (not shown in the figure).

Step 2154) The timeslot Ti is incremented by +1 in a direction of elapse of time.

Step 2155) A sliding window is extended from the timeslot Ti as a start point, and if an existence ratio (ts/y) of the number (ts) of timeslots exceeding the detection threshold x exceeds the continuity determination threshold z, the process goes to step 2156, and if the ratio does not exceed, the process returns to step 2154.

Step 2156) The timeslot is determined to be within a continuous region.

Figure 29:
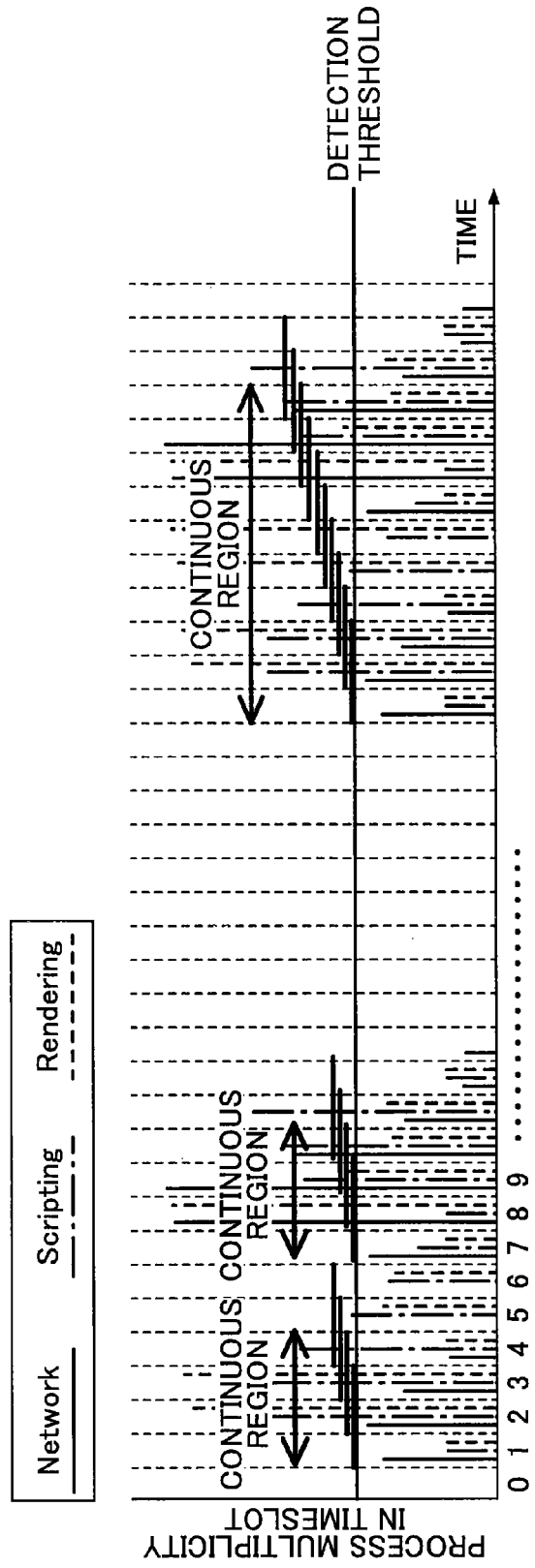
FIG. 29 is a diagram showing a continuous region determination method in the embodiment 2-1 of the present invention.

The determination method in step 2155 is shown in FIG. 29. Determination is made by the existence ratio of timeslots exceeding the detection threshold when extending the sliding window from the timeslot. For example, in a case where the sliding window length is 3, and the continuity determination threshold is 0.5, if there are two or more timeslots exceeding the detection threshold within three slots in a time elapse direction from the timeslot, the timeslot is determined to be within a continuous region. If the number of timeslots is equal to or less than 1, the timeslot is not determined to be within the continuous region.

Step 2160) Next, for both of the reference logs and the determination target logs, evaluation by statistical values of continuous region length of Scripting and Rendering is performed. In this evaluation process, following evaluation is performed since, when the user terminal 2200 is the bottleneck, the process duration time of Scripting and Rendering tends to become long.

a) Evaluation by Scripting Process Continuous Region Length:

For each Scripting process corresponding to the reference log and the determination target log, following statistical values for duration time are compared, and if a value for the determination target log is longer, a point is added as an evaluation of the determination target log by the Scripting process duration time. The adding point value can be individually set for each statistical value. For example, settings can be made as follows.

Maximum value if longer by equal to or greater than X %, 1 is added, if longer by equal to or greater than Y % (Y>X), 2 is added.

90% value if longer by equal to or less than X %, 0 is added.

Average value if shorter by equal to or greater than Z %, −1 is added, if shorter by equal to or greater than W % (W>Z), −2 is added.

Although representative statistical values are presented here, other statistical values may be used. Also, X in the above-mentioned example may be set as various values.

b) Evaluation by Rendering Process Continuous Region Length:

For each Rendering process continuous region corresponding to the reference log and the determination target log, a statistical value similar to the Scripting process is compared, and if a value for the determination target log is longer, a point is added as an evaluation of the determination target log by the Rendering process duration time. The adding point value can be individually set for each statistical value.

The total sum of the added values are used for bottleneck determination in step 2170.

Step 2170) Finally, bottleneck determination of the user terminal 2200 is performed based on the evaluation result until steps 2130 and 2160.

The evaluation value by the statistical value of input information for the determination target log in step 2130 and the evaluation value by the statistical value of the continuous region length in step 2160 are added, and it is determined whether the added value is equal to or greater than a preset threshold. If the added value is equal to or greater than the threshold value, it is determined that there is terminal bottleneck. Weighting for the evaluation of the statistical value of input information in step 2130 and the statistical value of the continuous region length of step 2160 can be adjusted by values added in step 2130 and step 2160.

Figures 30, 31:
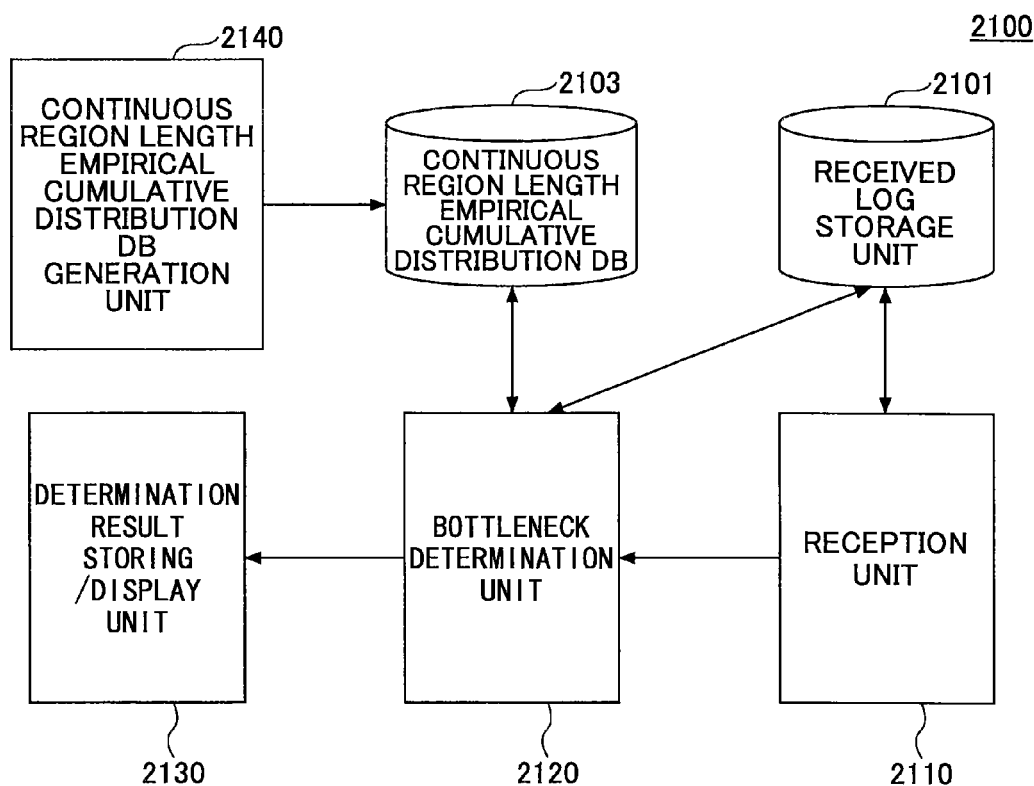
FIG. 30 shows an example of bottleneck determination in the embodiment 2-1 of the present invention.
FIG. 31 shows a configuration example of the terminal bottleneck determination apparatus in an embodiment 2-2 of the present invention.

Also, the larger the evaluation point, the higher the probability of terminal bottleneck becomes. Thus, by using two thresholds, it is possible to perform two stage determination that, for example, the possibility of terminal bottleneck is very high, terminal bottleneck is suspected, and the like. FIG. 30 shows such a determination example.

In a determination example 1 of FIG. 30, one bottleneck determination threshold "5" is set, and, if the total sum of the evaluation values of step 2130 and step 2160 is "7", since 5<7 holds true, the evaluation result is "terminal bottleneck". In a determination example 2 of the figure, when a threshold "10" by which terminal bottleneck is strongly suspected and a threshold "5" by which terminal bottleneck is suspected are set, if the evaluation value is "12", since 10<12 holds true, the evaluation result is "terminal bottleneck is strongly suspected", and the result is output from the determination result storing/display unit 2130. The evaluation result is output to storage medium such as a hard disk or a display unit such as a display.

Embodiment 2-2

In the present embodiment, an example of a case is described in which bottleneck determination is performed by non-reference determination.

In the embodiment 2-1, the reference determination is described in which the same operation needs to be performed for the log of determination target and the log without terminal disturbance factor (reference log). In the present embodiment, non-reference determination is described in which it is not necessary that the same operation is performed in the determination target log and the log with no the terminal disturbance factor.

FIG. 31 shows a configuration example of the terminal bottleneck determination apparatus in the embodiment 2-2 of the present invention.

The terminal bottleneck determination apparatus shown in the figure is different from the terminal bottleneck determination apparatus shown in FIG. 22 in that the continuous region length empirical cumulative distribution DB 2103 is used instead of the reference log DB 2102 shown in FIG. 22. The continuous region length empirical cumulative distribution DB 2103 is created by the continuous region length empirical cumulative distribution DB generation unit 2140 beforehand, so that the continuous region length empirical cumulative distribution DB 2103 stores duration time of Scripting and Rendering when the application is operated without disturbance factor for the terminal. The continuous region length empirical cumulative distribution DB generation unit 2140 extracts continuous lengths of Scripting and Rendering processes from logs (operation logs in a state without terminal disturbance factor) in application operation performed in a state where logs of Scripting and Rendering can be obtained, obtains empirical cumulative distribution of them, and registers them in the continuous region length empirical cumulative distribution DB 2103. As to the application operation, the user does not repeat completely the same operations, but repeats various operations that would be used normally.

In the present embodiment, as shown in FIG. 32, it is determined whether determination target data is terminal bottleneck by comparing empirical cumulative distribution data of Scripting continuous region length and the Rendering continuous region length obtained when the application is operated in a state where there is no disturbance factor in the terminal stored in the continuous region length empirical cumulative distribution DB 2103 with Scripting and Rendering continuous region lengths of the determination target logs stored in the received log storage unit 2101. Like the embodiment 2-1, the received log storage unit 2101 stores log data of operation by the user in the user terminal 200 as the determination target log.

In the present embodiment, focusing on the characteristics that the Scripting continuous region length and the Rendering continuous region length for each application show a definite distribution, it is evaluated whether the log of the determination target is positioned above the distribution or below the distribution so as to perform determination of terminal bottleneck.

First, the continuous region length empirical cumulative distribution DB 2103 is described.

Figure 33A:
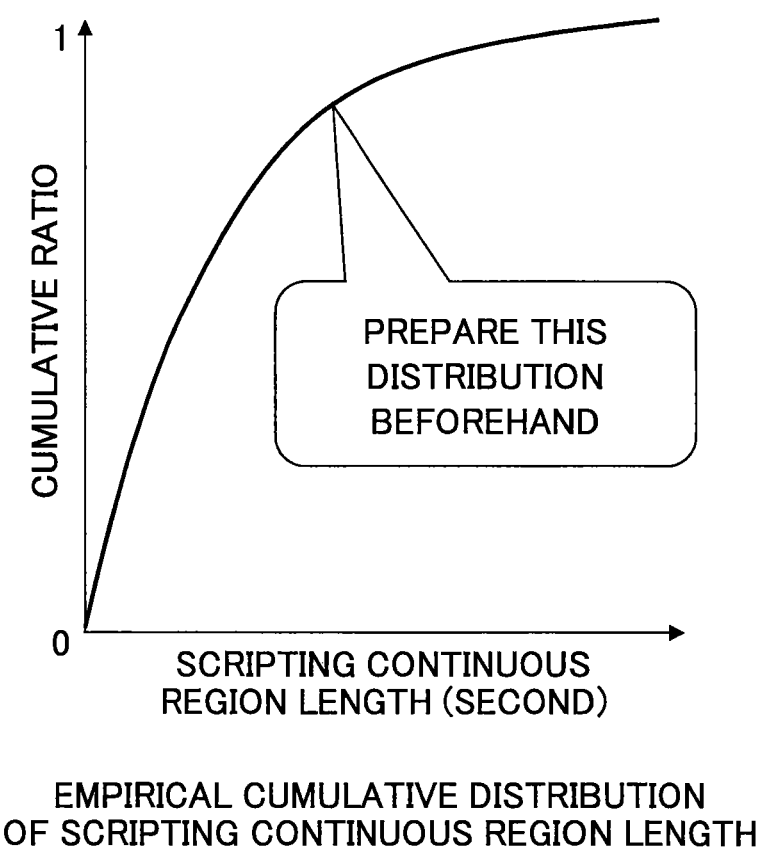
FIG. 33A shows empirical cumulative distribution of Scripting continuous region length in the embodiment 2-2 of the present invention.
Figure 33B:
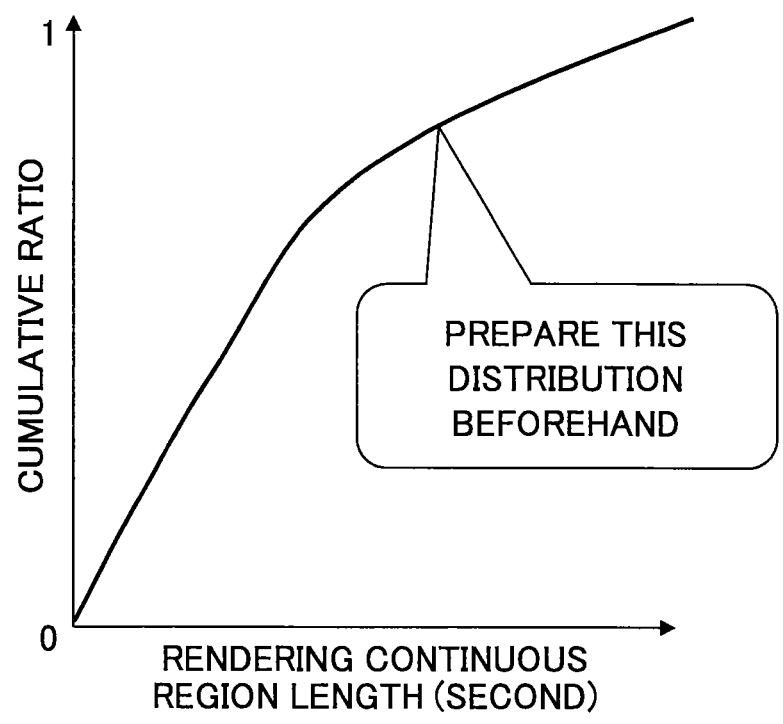
FIG. 33B shows empirical cumulative distribution of Scripting continuous region length in the embodiment 2-2 of the present invention.

Information of the continuous region length empirical cumulative distribution DB 2103 is prepared beforehand by the continuous region length empirical cumulative distribution DB generation unit 2140 before performing terminal bottleneck determination. The data stored in the DB 2103 is the empirical cumulative distribution of the Scripting continuous region length and the Rendering continuous region length when operating the application, in which the larger the number of pieces of data is, the higher the determination accuracy can be increased. FIGS. 33A and 33B show the empirical cumulative distributions of the continuous region length. FIG. 33A is the empirical cumulative distribution of the Scripting continuous region length, and FIG. 33B is the empirical cumulative distribution of the Scripting continuous region length. FIG. 33B is the empirical cumulative distribution of Rendering continuous region length. These distributions are prepared before processing.

In the following, processing of the bottleneck determination unit 2120 of the present embodiment is described. Processing of the reception unit 2110 and the determination result storing/display unit 2130 is similar to that in embodiment 2-1.

The bottleneck determination unit 2120 performs processing as follows.

Figure 34:
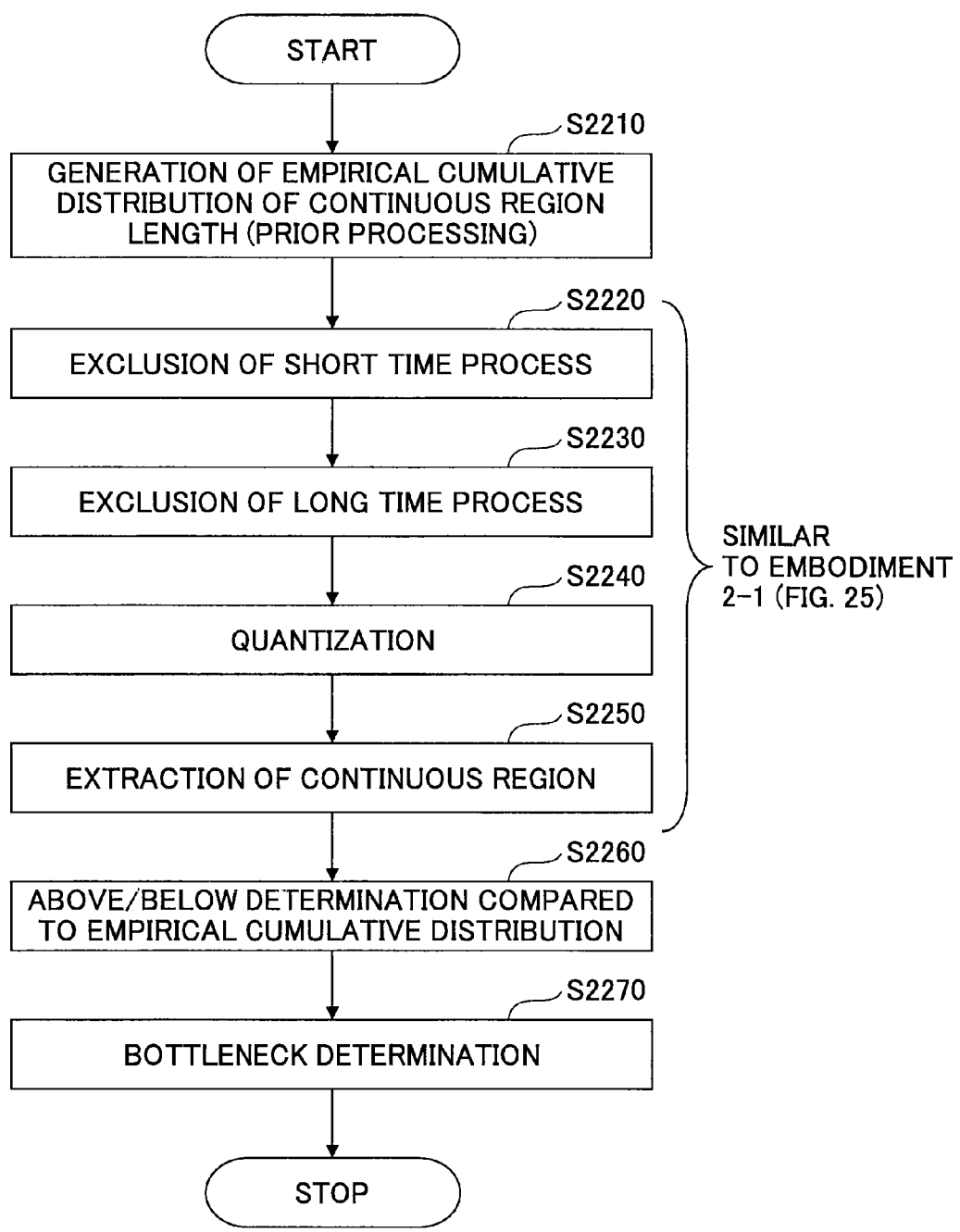
FIG. 34 is a flowchart of non-reference determination in the embodiment 2-2 of the present invention.

FIG. 34 is a flowchart of non-reference determination in the embodiment 2-2 of the present invention.

Step 2210) Beforehand, the continuous region length empirical cumulative distribution DB generation unit 2140 generates the empirical cumulative distributions of the continuous region lengths shown in FIGS. 33A and 33B, and stores the distributions in the continuous region length empirical cumulative distribution DB 2103.

Step 2220) Processing similar to that of step 2110 of the embodiment 2-1 is performed.

Step 2230) Processing similar to that of step 2120 of the embodiment 2-1 is performed.

Step 2240) Processing similar to that of step 2140 of the embodiment 2-1 is performed.

Step 2250) Processing similar to that of step 2150 of the embodiment 2-1 is performed.

Step 2260) The bottleneck determination unit 2120 performs above/below determination for the continuous region length obtained in processing until step 2250 and the empirical cumulative distribution stored in the continuous region length empirical cumulative distribution DB 2103, and the determination result is stored in a memory (not shown in the figure). As to determination methods, there are following two methods.

(1) A method in which it is determined whether each continuous region length included in determination target data obtained by processing until step 2250 is above or below the empirical cumulative distribution of the continuous region length empirical cumulative distribution DB 2103.

(2) A method in which determination is performed by using a method of Anderson-Darling Test.

The methods (1) and (2) are merely examples, and any method, other than these methods, that can perform above/below determination for the empirical cumulative distribution can be used.

Figure 35:
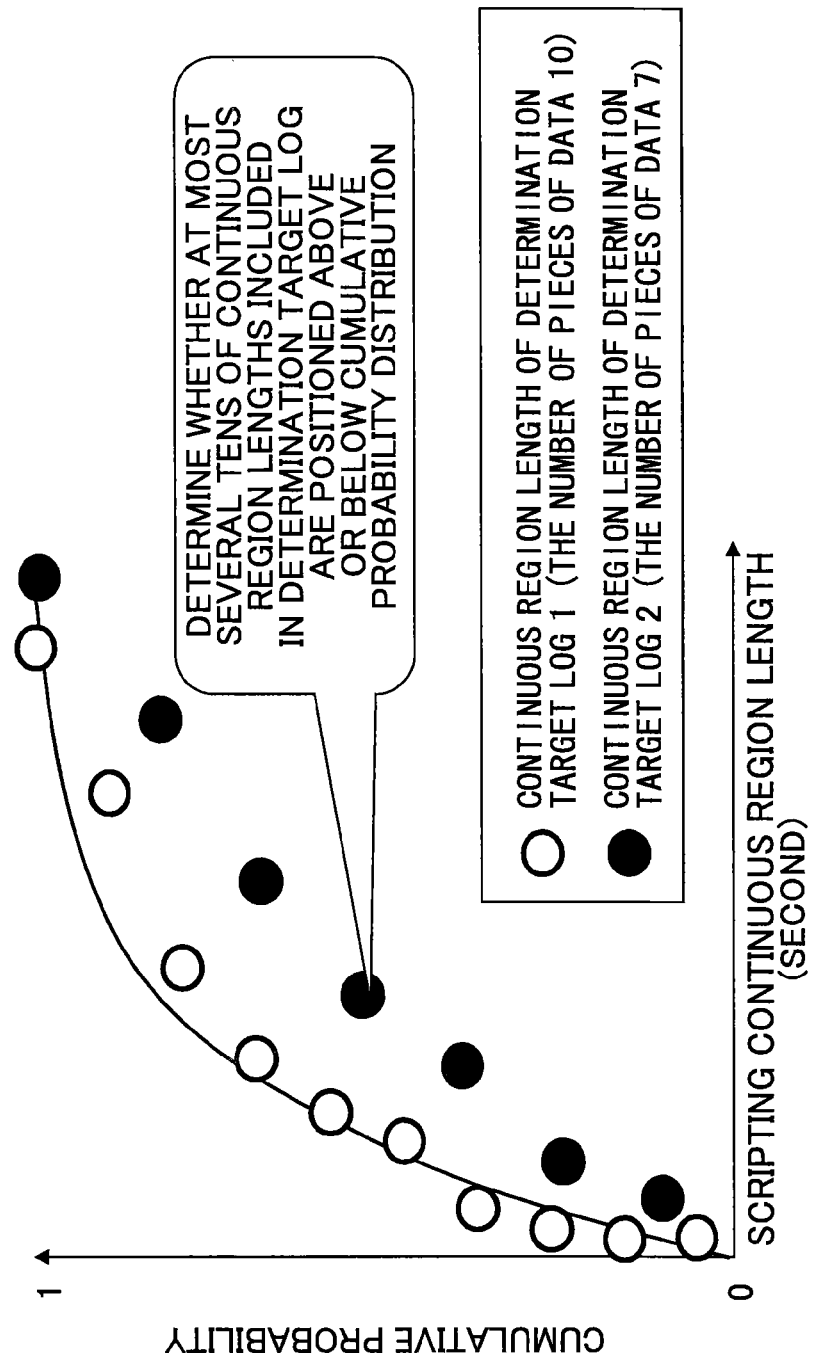
FIG. 35 shows a concrete example of the non-reference determination method in the embodiment 2-2 of the present invention.

FIG. 35 shows an example of the method of determination of (1). In the non-reference determination, determination is performed to determine whether at most several tens of continuous region lengths included in the determination target log are positioned above or below the cumulative probability distribution.

Figure 36:
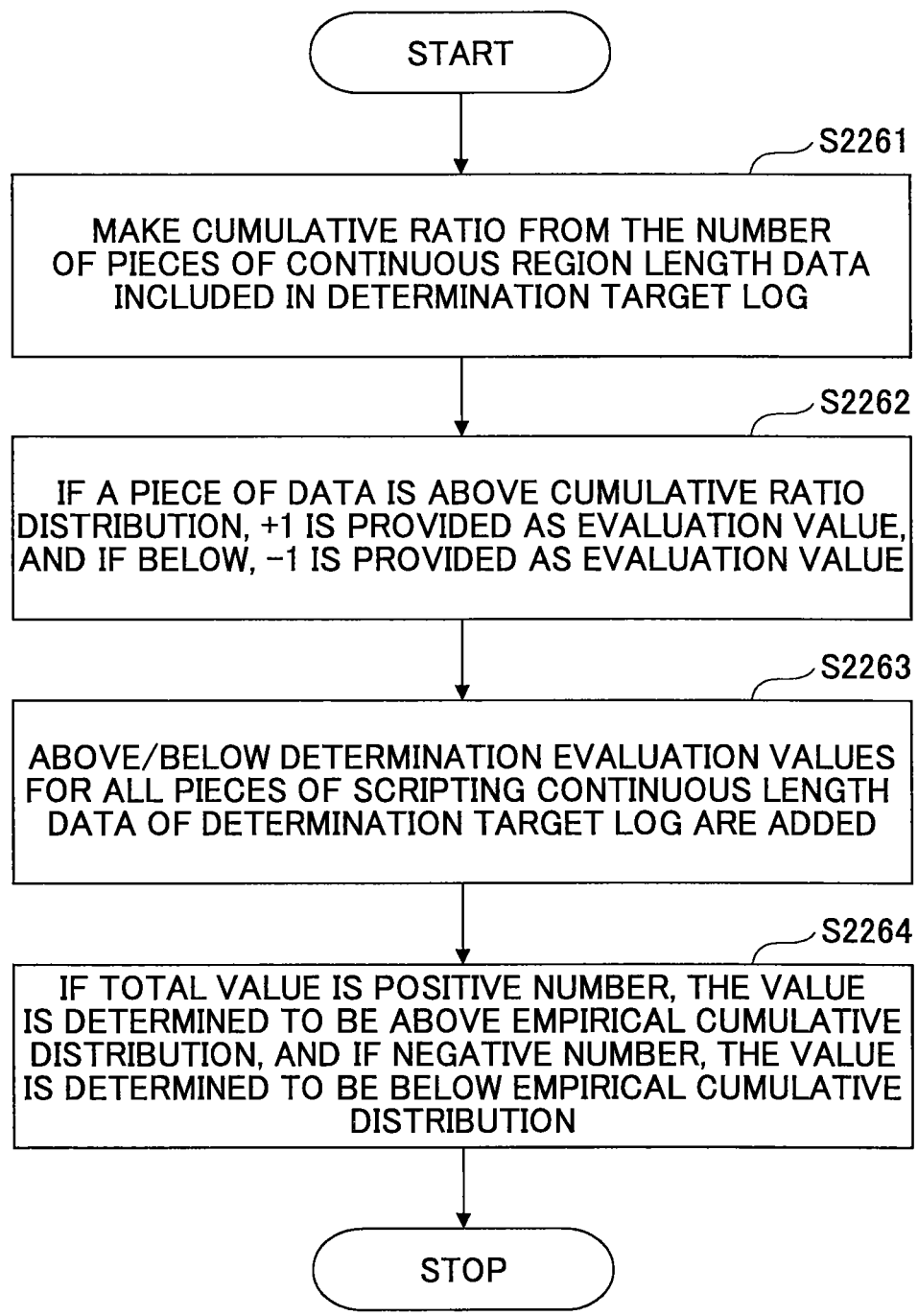
FIG. 36 shows a flowchart of non-reference determination in the embodiment 2-2 of the present invention.

FIG. 36 is a flowchart of non-reference determination in the embodiment 2-2 of the present invention.

Step 2261) Cumulative ratios are calculated from the number of pieces of continuous region length data included in determination target log. That is, it is determined whether respective piece of data is positioned above or below the cumulative probability distribution of the continuous region length empirical cumulative distribution DB 2103, so as to determine whether the whole data is above or below the distribution.

Figure 37:
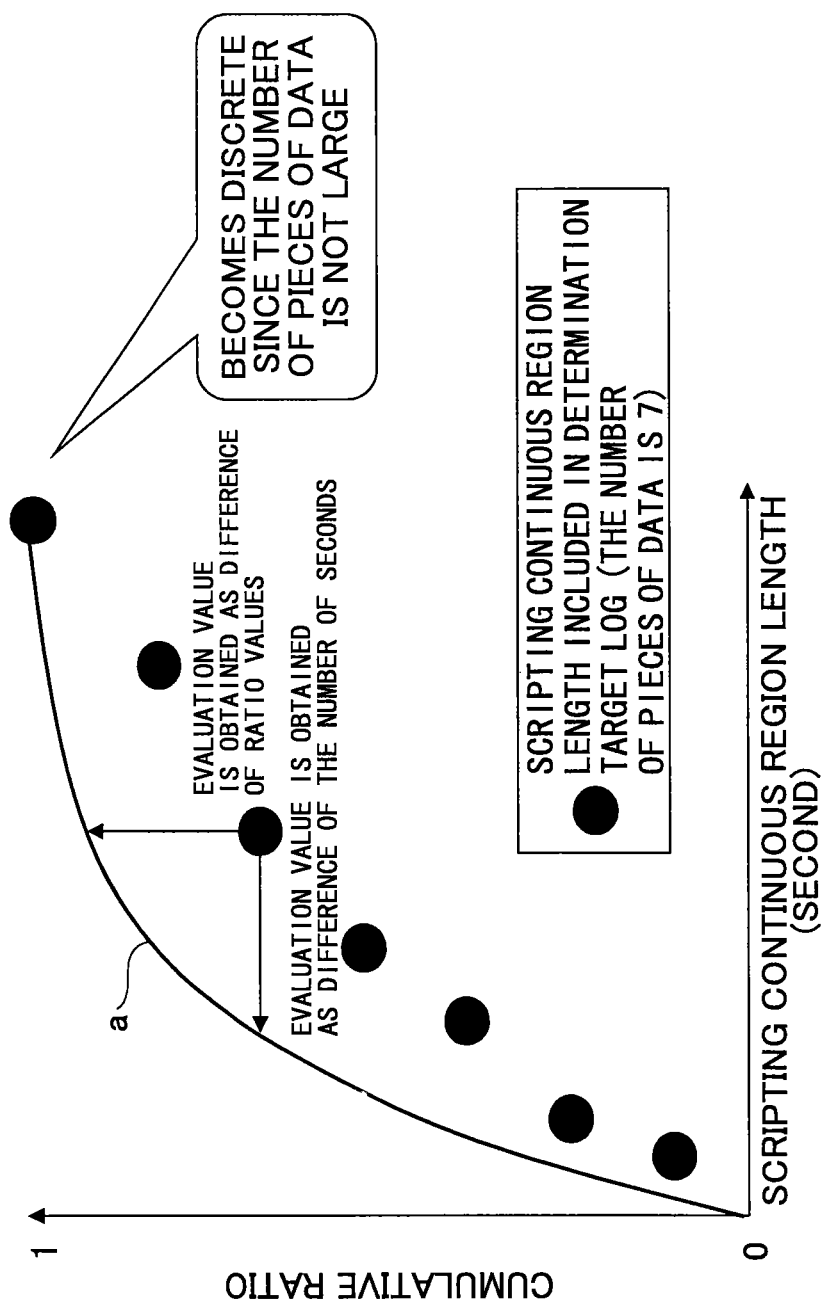
FIG. 37 shows an example of evaluation in the embodiment 2-2 of the present invention.

Step 2262) For each piece of data, if it is positioned above the cumulative ratio distribution, +1 is provided as an evaluation value, and if it is positioned below the cumulative ratio distribution, −1 is provided as an evaluation value. More specifically, as shown in FIG. 37, the evaluation value is obtained based on the distance from the empirical cumulative distribution "a" at the same ratio value, or, difference of ratio to the empirical cumulative distribution "a" at the same second can be used as the evaluation value. Other than the distance, in a case where evaluating the difference of the number of seconds by aligning the cumulative ratio of the vertical axis, an evaluation can be also performed in which, if data is at the right side of the empirical cumulative distribution "a", minus is provided, and if data is at the left side of the empirical cumulative distribution "a", plus is provided.

Step 2263) Evaluation values of above/below determination are added for all pieces of Scripting region length data of the determination target log.

Step 2264) If the total value is a positive number, it is determined that the whole data is above the empirical cumulative distribution, and if the value is a negative value, it is determined that the whole data is below the empirical cumulative distribution.

Next, a method is described for performing above/below determination based on the Anderson-Darling Test. There are following four methods as the evaluation method by Anderson-Darling Test.

A first method is an example using hypothesis test.

Figure 38:
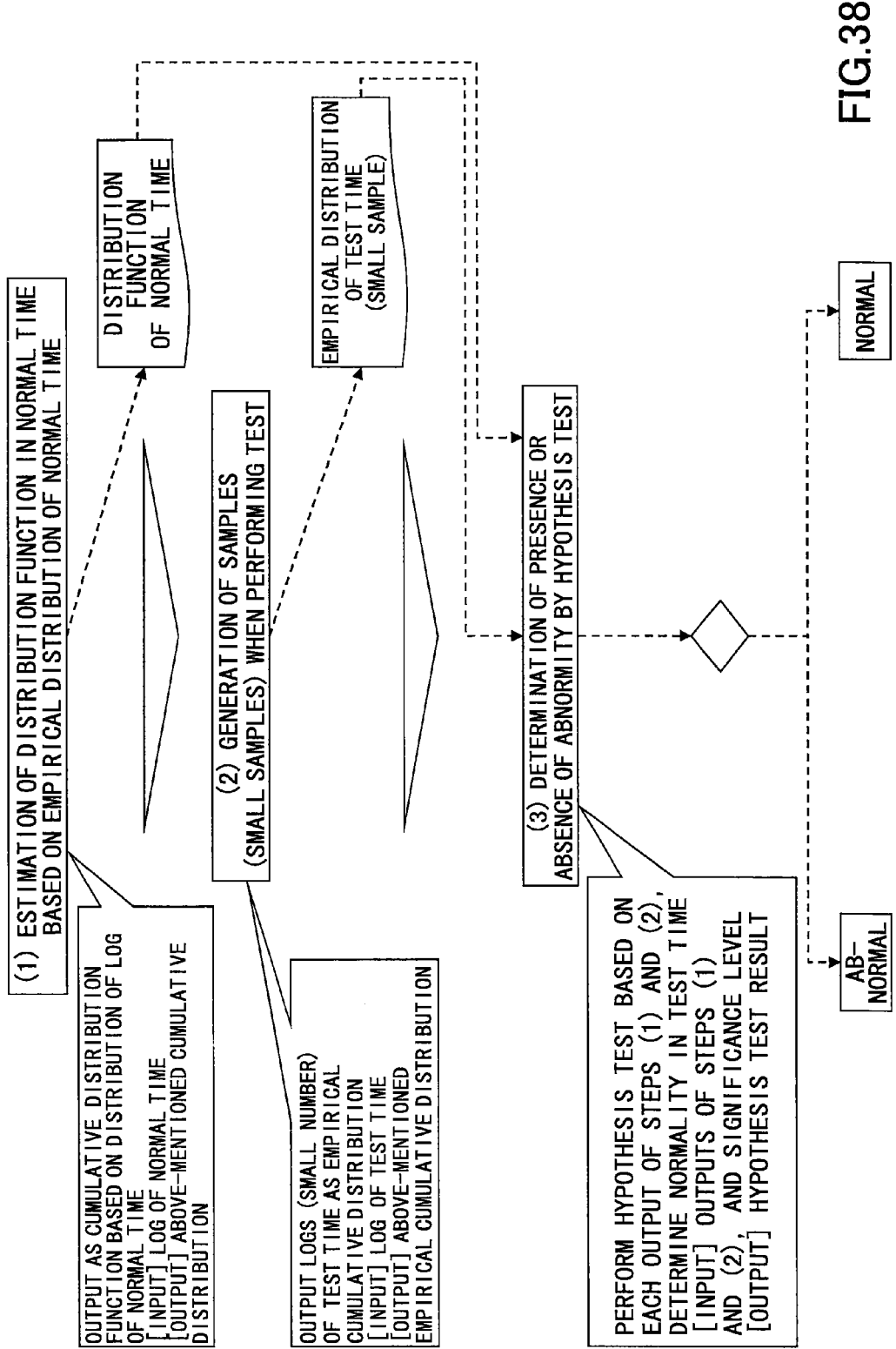
FIG. 38 shows an evaluation method (1) by the Anderson-Darling Test according to the embodiment 2-2 of the present invention.

FIG. 38 shows an evaluation method (1) by the Anderson-Darling Test according to an embodiment of the present invention.

(1) Logs of normal time are input, and a distribution function of normal time based on empirical distribution of normal time is estimated.

(2) Logs of test time are input, so that logs (small number) of test time are output as empirical cumulative distribution.

(3) Normality of test time is determined by performing hypothesis test based on each output of (1) and (2), and a significance level.

A second method is an example of using empirical cumulative distribution of the logs of normal time.

Figure 39:
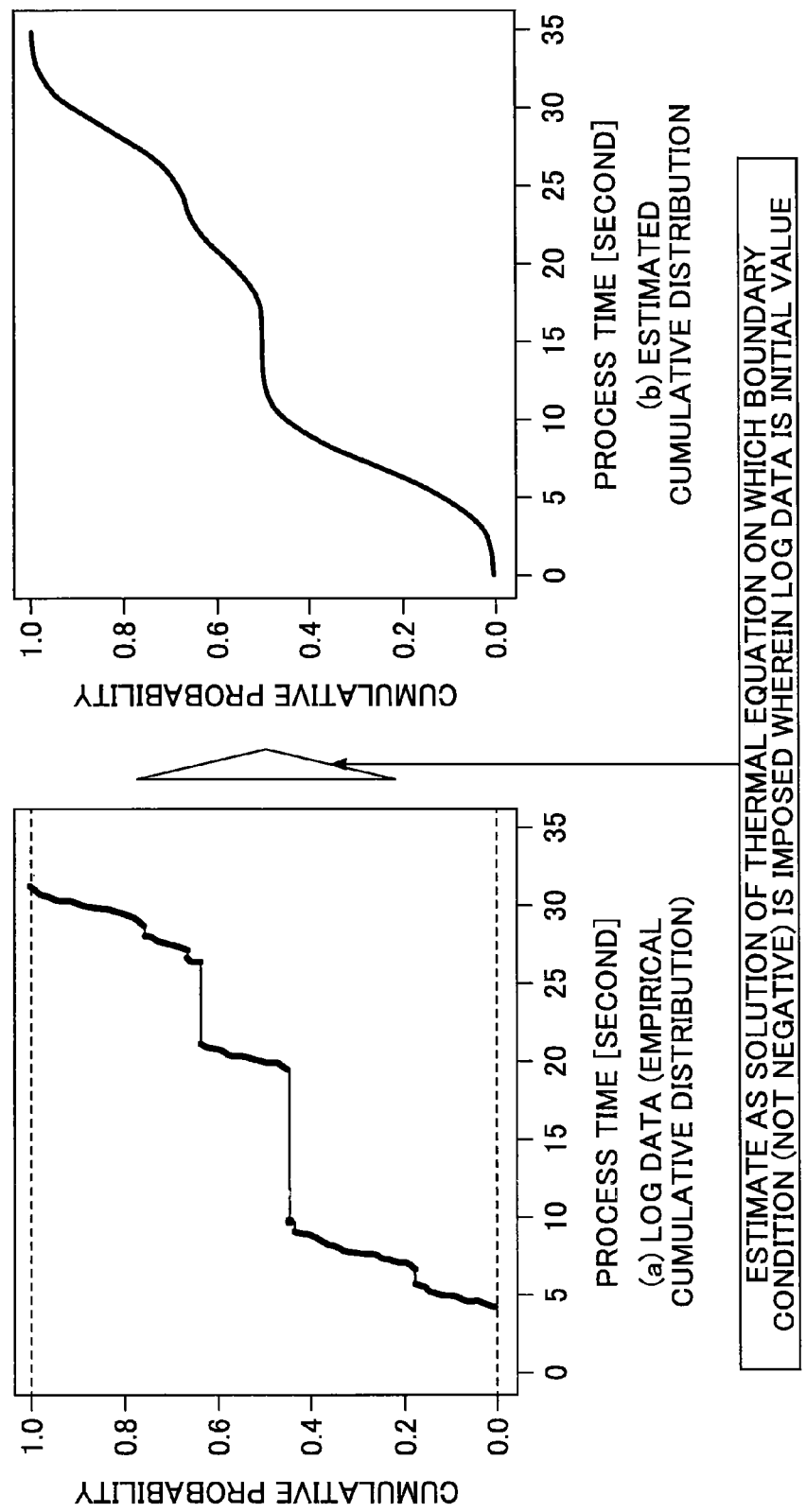
FIG. 39 shows an evaluation method (2) by the Anderson-Darling Test according to the embodiment 2-2 of the present invention.

As shown in FIG. 39, it is also possible to estimate a cumulative distribution function as a smooth function based on the empirical cumulative distribution of the logs of normal time on which processing of the steps 2220-2250 has been performed (it is possible to explicitly calculate a value of the estimated cumulative distribution for each value of processing time). In this estimation method, the log data is used as an initial value, and estimation is performed by calculating a solution of a thermal equation on which boundary condition (not negative) is imposed, so that a smooth function is obtained as shown in FIG. 39 (b).

The third method is an example in which the logs of test time (logs other than logs obtained from the user terminal) are used as the empirical cumulative distribution.

As shown in FIG. 40, although the number is small, the logs of test time are obtained and are output as an empirical analysis distribution.

The fourth method is a method for performing evaluation by null hypothesis.

This method uses null hypothesis that "the sample obtained by using the logs of the test time of (2) of the first method cannot be said to be significantly large/small compared to the distribution function obtained from the empirical distribution at the normal time of (1)." For the null hypothesis, based on each output of (1) and (2) in the first method (distribution function of normal time, empirical distribution of test time), hypothesis test is performed so that normality of test time is determined. For example, Anderson-Darling Test is performed with significance level of 5%. Also, in the first method of (2), since the sample size is small, bootstrap is applied. The bootstrap p value is obtained by applying the following Anderson-Darling statistical amount A.

$$A^2 = -n - \sum_{k=1}^{n} \frac{2k-1}{n}[\ln F(Y_k) + \ln(1 - F(Y_{n+1-k}))]$$

If the obtained bootstrap p value is less than 0.05, null hypothesis is rejected (there is significant difference), and large/small compared to normal time is determined.

If the obtained bootstrap p value is equal to or greater than 0.05, null hypothesis cannot be rejected (it cannot be said that there is significant difference), it is determined that the range is normal.

Here, description is returned to the flow of FIG. 34.

Step 2270) Finally, bottleneck determination shown in FIG. 41 is performed based on the result of above/below determination with respect to the empirical cumulative distribution stored in a memory (not shown in the figure). In step 2260, when above/below determination evaluation is adopted, a threshold is set for a total sum of evaluation values for each of the Scripting process and the Rendering process, and if the total value is equal to or less than the threshold, it is determined that there is terminal bottleneck. For example, when the bottleneck determination threshold is −5, and the evaluation value is 2, it is determined that there is no terminal bottleneck. If a threshold by which terminal bottleneck is strongly suspected is −10, and a threshold by which terminal bottleneck is suspected is −5, and the obtained evaluation value is −12, it is determined that terminal bottleneck is strongly suspected.

On the other hand, in step 2260, when the Anderson-Darling test is adopted, in each of Scripting process and the Rendering process, if it is determined that the evaluation value is below the empirical cumulative distribution, it is determined that there is terminal bottleneck. In other cases, it is determined that there is no terminal bottleneck. Or, in either one of the Scripting process and the Rendering process, if the evaluation value is determined to be below the empirical cumulative distribution, it is determined that there is terminal bottleneck.

Similarly to the embodiment 2-1, the determination result obtained as mentioned above is output to the storage unit or the display unit via the determination result storing/display unit 2130.

It is possible to construct operation of each component of the terminal bottleneck determination apparatus shown in FIGS. 22 and 23 as a program, and it is possible to install the program in a computer used as a terminal bottleneck determination apparatus or to distribute the program via a network.

More specifically, each of the terminal bottleneck determination apparatus shown in FIG. 22 and the terminal bottleneck determination apparatus shown in FIG. 31 can be realized by causing a computer to execute a program coded with process content described in the present embodiment. More specifically, the function of each part of the terminal bottleneck determination apparatus can be realized by executing a program corresponding to processes executed by each unit by using hardware resources such as a CPU, a memory and a hard disk embedded in a computer which form the terminal bottleneck determination apparatus. The program can be saved or distributed by recording the program in a computer readable recording medium, (portable memory and the like). Also, the program, can be provided via a network by the Internet, e-mail and the like.

For example, in the present embodiment, there is provided a quality deterioration cause determination program for causing a computer to function as a quality deterioration cause determination apparatus for determining whether a quality deterioration cause is in a user terminal when a service of an application provided by an application server is used, the program causing the computer to function as:

a data reception unit configured to obtain, as determination target logs, a duration time of each process of data obtaining, script execution and screen rendering that are performed in an estimation target period in the user terminal; and a bottleneck determination unit configured to compare the determination target logs with reference logs obtained by performing operations similar to operations for the application in the user terminal or with data of empirical cumulative distribution data of continuous region lengths of processes of the script execution or the screen rendering so as to obtain evaluation values, and to determine whether there is the quality deterioration cause in the user terminal based on comparison result between a total value of the evaluation values and a preset threshold.

Third Embodiment

Next, a third embodiment is described. The third embodiment is an embodiment corresponding to the third object.

In this embodiment, similarity determination of operation executed by the user when executing an application is performed without monitoring the application in units of methods. For this purpose, with respect to operations by a user provided as inputs (to be referred to as "user input operation" hereinafter), similar operations are extracted by using a feature amount obtained from the logs corresponding to the period of user input operation. The "user input operation" indicates an operation that the user carries out for an application via an external input-output interface such as login to a Web site and click on a link and the like, and the "user input operation" is an operation that is a target of similarity determination with an operation performed in the past by the user, in which operation executed by the user is the target, and a process performed by the application in the background is out of target. The "process" indicates a process executed in the user terminal in association with the user input operation. Normally, a plurality of processes are executed in parallel for a normal user input operation of one time.

FIG. 42 shows a system configuration example in the present embodiment.

The system shown in the figure includes a similar operation extraction apparatus 3100, a user terminal 3200, an AP (application) server 3300.

The similar operation extraction apparatus 3100 includes an experienced waiting time estimation unit 3110, a log cutout unit 3120, a feature amount calculation unit 3130, a similarity degree calculation unit 3140, a similar operation extraction unit 3150, a storing unit 3160, and a memory unit 3170.

The user terminal 3200 includes a transmission unit 3210, a log obtaining unit 3220, and a Web browser 3230.

The AP server 3300 includes an HTTP server 3310, and content 3320.

Figure 43:
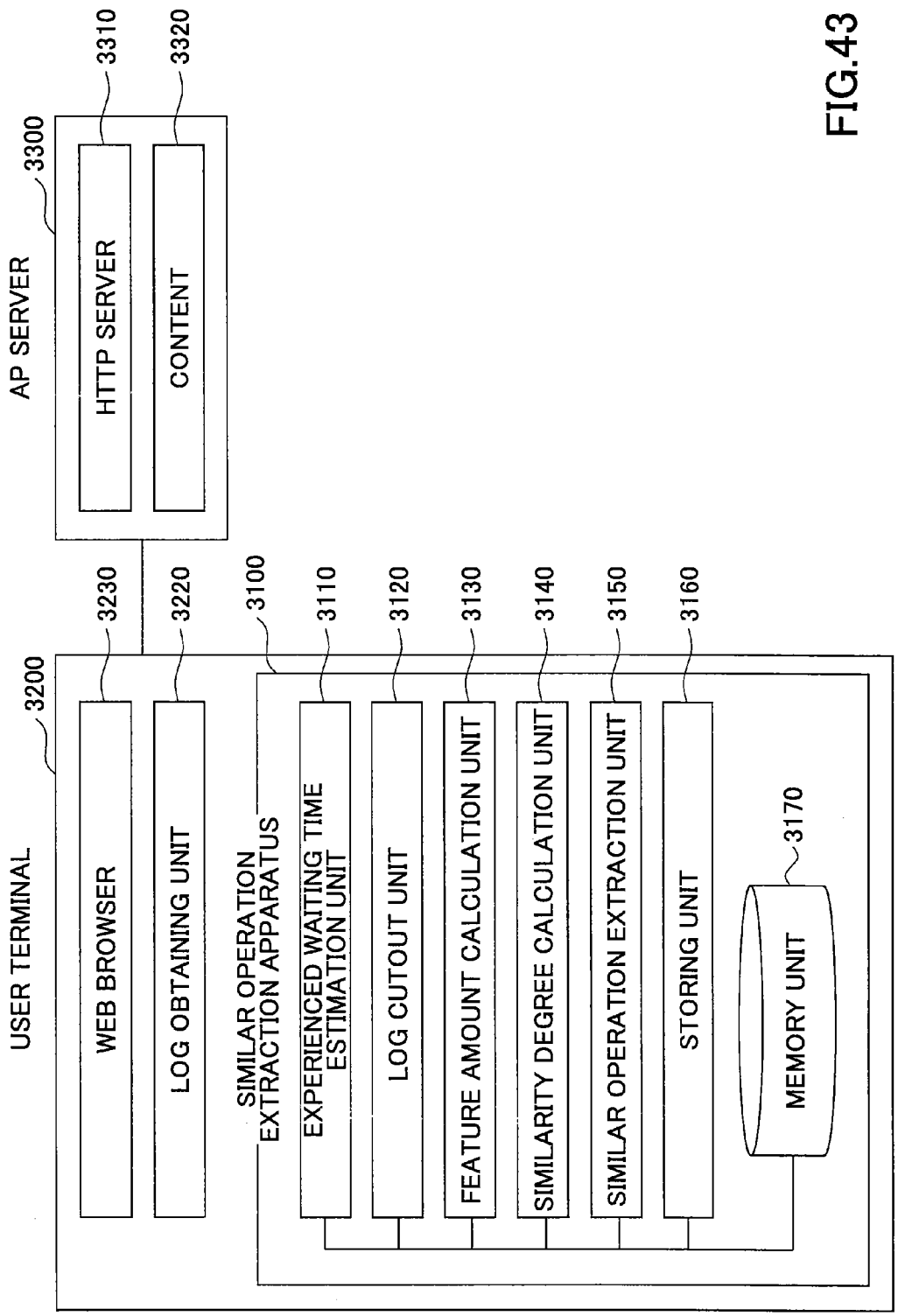
FIG. 43 shows another system configuration example in the third embodiment of the present invention.

In the configuration shown in FIG. 42, the similar operation extraction apparatus 3100 and the user terminal 3200 are independently provided. But, the configuration is not limited to this example. As shown in FIG. 43, a configuration may be adopted in which the similar operation extraction apparatus 3100 is embedded in the user terminal 3200.

Figure 44:
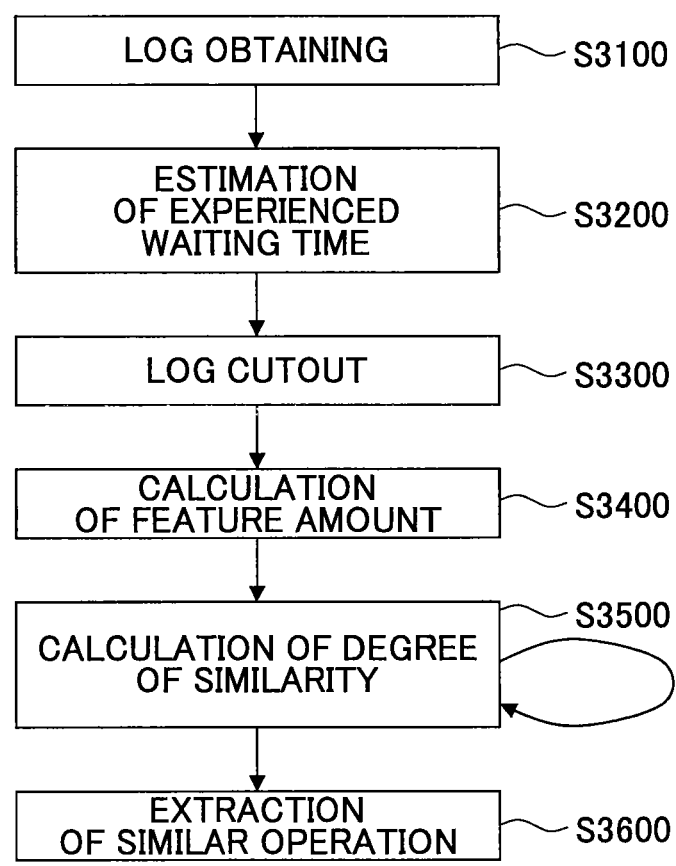
FIG. 44 shows a flowchart of processes from log obtaining to similar operation extraction in the third embodiment of the present invention.

FIG. 44 is a flowchart of processes from log obtaining to similar operation extraction in the present embodiment. In the following, description is given based on the configuration shown in FIG. 42.

Step 3100) The log obtaining unit 3220 of the user terminal 3200 obtains logs, and the logs are transmitted to the similar operation extraction apparatus 3100. Each "log" indicates either one of an application log and a network log, or a combination of them. In the following, a case where both of application logs and network logs are used is described.

Step 3200) The experienced waiting time estimation unit 3110 of the similar operation extraction apparatus 3100 estimates the user experienced waiting time based on the application logs obtained from the user terminal 3200, and stores it in the memory unit 3170.

Step 3300) The log cutout unit 3120 cuts out a part of the application logs and the network logs corresponding to the experienced waiting time estimated by the experienced waiting time estimation unit 3110.

Step 3400) The feature amount calculation unit 3130 obtains at least one of the process multiplicity graph calculated from the cut out application logs and a received data amount calculated from the network logs, and calculates a feature amount.

Step 3500) The similarity degree calculation unit 3140 calculates a degree of similarity between the calculated feature amount and the past feature amount from the feature amount calculated by the feature amount calculation unit 3130, the past feature amount stored in the memory unit 3170, and predetermined similarity degree functions.

Step 3600) The similar operation extraction unit 3150 extracts operations similar to user input operations based on the degree of similarity calculated by the similarity degree calculation unit 3140. The storing unit 3160 provides the feature amount with an identification number, and stores a combination of the identification number and the feature amount in the memory unit 3170.

In the following, each of the above-mentioned processes is described.

The experienced waiting time estimation unit 3110 of the similar operation extraction apparatus 3100 may estimate a synchronous process execution section, as "experienced waiting time", in which multiplicity of processes performed in a Web browser or a client dedicated application or the like when executing the application exceeds a threshold. Alternatively, actual experienced waiting time is measured in the user terminal 3200 separately, so that the actual experienced waiting time may be used by sending the experienced waiting time to the similar operation extraction apparatus 3100. In the following, a concrete example of a method for estimating the experienced waiting time is described.

The log obtaining unit 3220 of the user terminal 3200 obtains logs before and after the user experienced waiting time that becomes the quality deterioration determination target. As the log obtaining unit 3220, a general analysis tool is used. As an application analysis tool, there are Dynatrace (registered trademark), Google Developer tool (registered trademark), SpeedTracer (registered trademark), for example. As a network analysis tool, there is WireShark (registered trademark), for example.

The transmission unit 3210 of the user terminal 3200 transmits the obtained logs to the similar operation extraction apparatus 3100. The transmission unit 3210 of the user terminal 3200 may be replaced with a general apparatus or a program or the like.

The similar operation extraction apparatus 3100 obtains the logs from the transmission unit 3210 of the user terminal 3200.

The experienced waiting time estimation unit 3110 estimates a start time and an end time of the user experienced waiting time from the obtained logs. In the present embodiment, the start time and the end time are represented as elapsed seconds from a time point. More specifically, for example, as described in the first embodiment, the experienced waiting time estimation unit 3110 estimates, as the experienced waiting time, the synchronous process execution section during which multiplicity of processes performed in an application such as the Web browser exceeds a threshold. As experienced waiting time estimation methods other than this method, existing techniques may be used such as a method for obtaining and presenting an index close to the user experienced waiting time such as a response time of an HTTP message exchanged between the user terminal 3200 and the AP server 3300 (CA Application Performance Management http://www.ca.com/jp/products/detail/CA-Application-Performance-Management/overview.aspx, for example), or a method for estimating the user experienced waiting time from a period during which a packet is continuously sent and received between the user terminal 3200 and the AP server 3300 (patent document 1, for example).

The log cutout unit 3120 cuts, out of the obtained logs, a part of the logs corresponding to the experienced waiting time from start to end of the experienced waiting time by the input operation. More specifically, logs of the part of the experienced waiting of the input operation are cut out in the following procedure.

(1) The log cutout unit 3120 obtains a start time and an end time of the experienced waiting time of the user input operation estimated by the experienced waiting time estimation unit 3110.

(2) The log cutout unit 3120 cuts out logs that start after the start time of the experienced waiting time and end before the end time from the logs obtained from the transmission unit 3210 of the user terminal 3200.

The feature amount calculation unit 3130 calculates a feature amount from the logs cut out by the log cutout unit 3120. The feature amount is, for example, a received data amount in the user terminal 3200, or, the number of peaks, height of the peak or the position of the peak of process multiplicity calculated for each process type. The feature amount may include at least one or more of them, or may include all of them. Also, a transmission data amount from the user terminal 3200, the number of processes for each process type, statistical value of process time, or the like may be used as the feature amount.

A concrete procedure in the feature amount calculation unit 3130 is as follows for obtaining the number, the height, the width, and the position of the peak of the process multiplicity.

(1) The application logs are quantized at constant intervals. In the same way as the first and the second embodiments, as to quantization, the application logs are delimited with timeslots of constant time in a time series manner, and for each process of Network (data obtaining), Scripting (script execution), and Rendering (screen drawing) performed in each timeslot, the total number of processes (multiplicity) is calculated as the value of quantization. The timeslot may be determined as a relative time such as "length of experienced waiting time/50", or may be determined as an absolute value such as "0.1 second" for example, or a plurality of timeslots may be defined in which multiplicity value of each process of Network, Scripting and Rendering is quantized for each timeslot.

Figure 45:
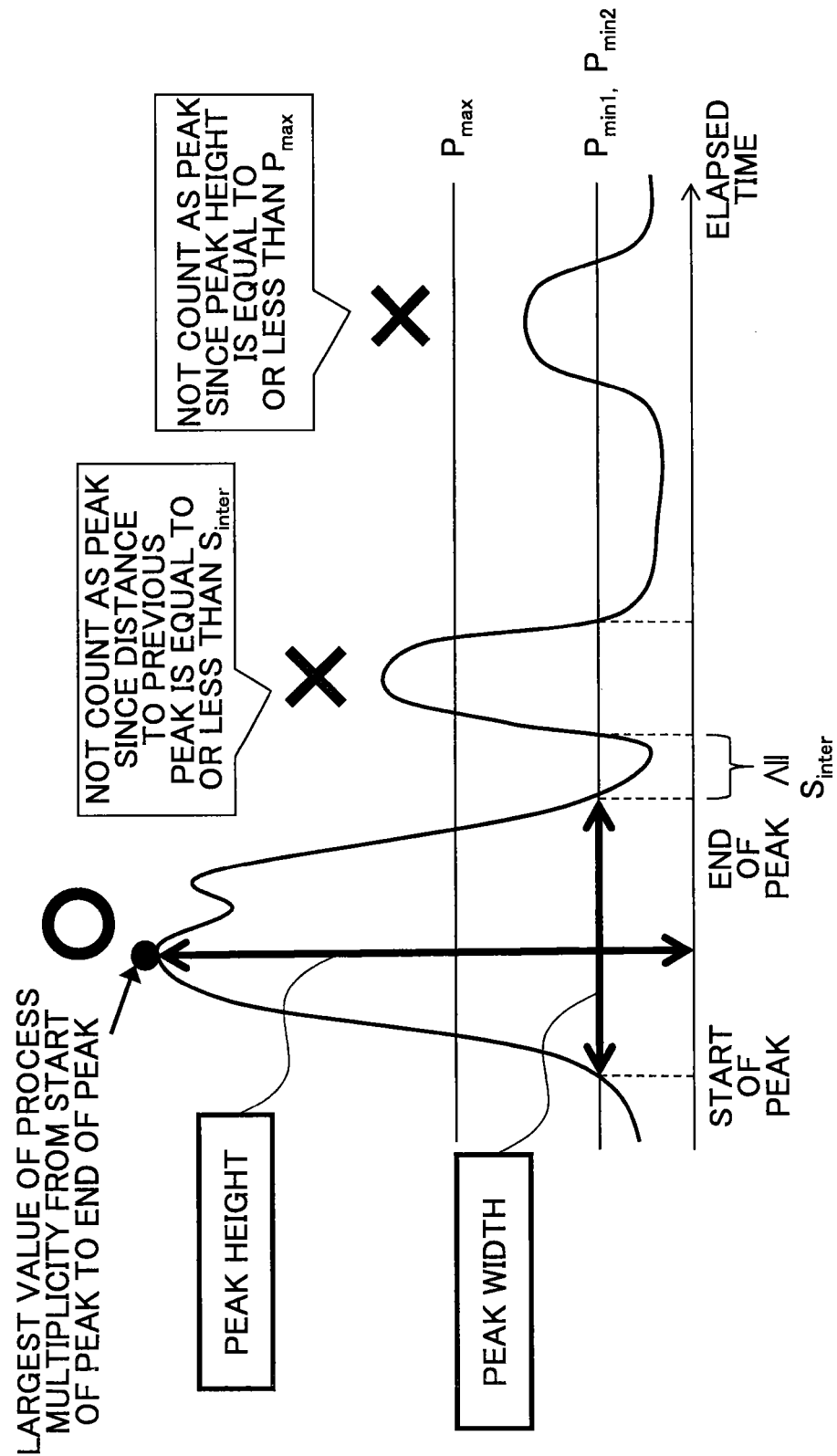
FIG. 45 is a diagram showing how to obtain peak, and definitions of peak height and peak width in the third embodiment of the present invention.

(2) From the result of quantization in (1), a peak of multiplicity of each process of Network, Scripting, and Rendering is obtained as shown in FIG. 45, for example. However, if an interval from the peak end time to the next peak start time is equal to or less than $S_{inter}$ the latter peak is not included in the number of peaks.

In a state where peak has not been started, a time at which the process multiplicity initially becomes equal to or greater than $P_{min1}$ is defined as a peak start time, and a time at which the process multiplicity initially becomes equal to or less than $P_{min2}$ is defined as a peak end time. Also, a peak of which the height is equal to or less than $P_{max}$ is not counted as a peak. The height of the peak is the maximum multiplicity of process in a section from the peak start time to the peak end time. There are some other definitions of the start and end time of peak. For example, there is a method in which a peak is determined to be started when a slope of a quantization graph becomes equal to or greater than a predetermined angle, and a peak is determined to be ended when the slope becomes equal to or less than a predetermined angle, and there is a method in which a point where the graph changes from decrease to increase is considered to be peak start and end.

The values of $P_{min1}$, $P_{min2}$, $P_{max}$, $S_{inter}$ are stored in the memory unit 3170 beforehand, and can be modified as necessary.

(3) Following are the number of peaks which is the number of occurrence times of peaks of multiplicity of each process of Network, Scripting, Rendering obtained in (2), the height of the peak, the width of the peak, and the position of the peak.

(3-1) Number: the number of peaks is calculated.

(3-2) Height: The peak height is calculated as a form of (first peak height, second peak height, . . . ).

(3-3) Width: Peak width is calculated as a form of (first peak width, second peak width, . . . ). The peak width is defined as (end time of peak)-(start time of peak) in each peak.

(3-4) Position: Position of peak is calculated as a form of (first peak position, second peak position, . . . ). In the present embodiment, as an example, it is defined that the peak position of each peak is represented as a relative position compared with an activated section of the Network process. However, it may be also defined that the peak position is represented as an absolute position such as a combination of peak start time and end time, and a time at which the process multiplicity becomes the maximum in an interval from the peak start time to the peak end time.

In the following, a procedure for determining the relative position is described in a case where the peak position is represented as the relative position compared to the activated section of the Network process.

In the present embodiment, the relative position that represents the peak position of each peak is determined as any one of "before activated section", "first part of activated section", "middle part of activated section", "last part of activated section", "whole activated section", "after activated section" compared to the position of activated section of the network process. Here, the "activated section" indicates a time period in which processes equal to or greater than a defined number are performed. In the present embodiment, as an example, the "activated section" is defined as a section between the activation start time and the activation end time.

More specifically, an example is described in which each peak position is determined as the relative position compared to the activated section of the Network process in the following procedure.

Figure 46:
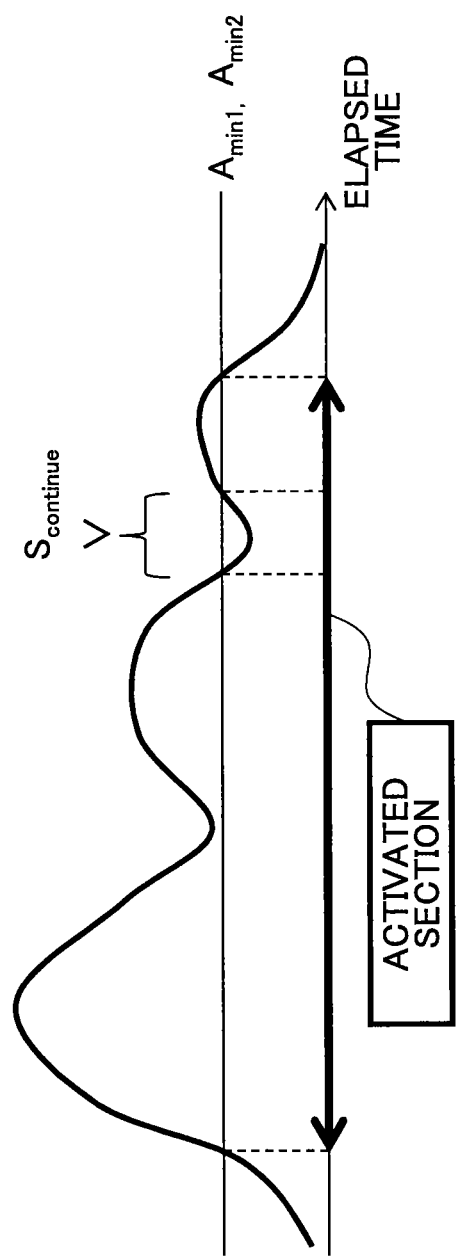
FIG. 46 is a diagram showing how to obtain activated section of processes in the third embodiment of the present invention.

(1) As shown in FIG. 46, the activated section of the Network process is obtained. Here, a time at which the process multiplicity initially becomes equal to or greater than $A_{min1}$ in an non-activated state is defined as an activation start time, and when the process multiplicity initially becomes equal to or less than $A_{min2}$ after activation start, and after that, the process multiplicity is below $A_{min2}$ for equal to or greater than a time period of $S_{continue}$, the time is defined as an activation end time. The values of $A_{min1}$, $A_{min2}$, $S_{continue}$ are registered in the memory unit 17 beforehand, and the values can be modified as necessary.

(2) Position relationship of each peak with respect to the activated section of the Network process is classified into five patterns as shown in FIGS. 47A-48C.

Figure 48A:
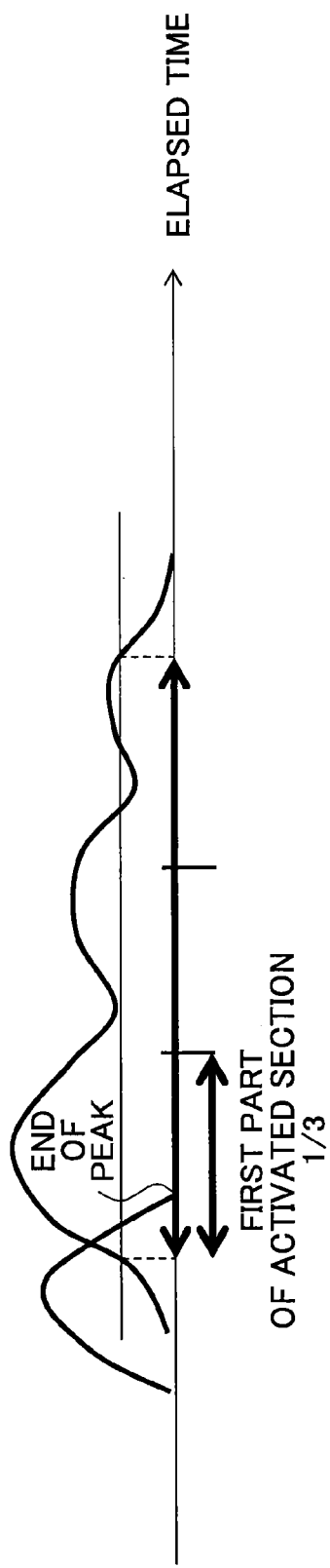
FIG. 48A is a diagram showing classification of peak position in the third embodiment of the present invention.
Figure 48B:
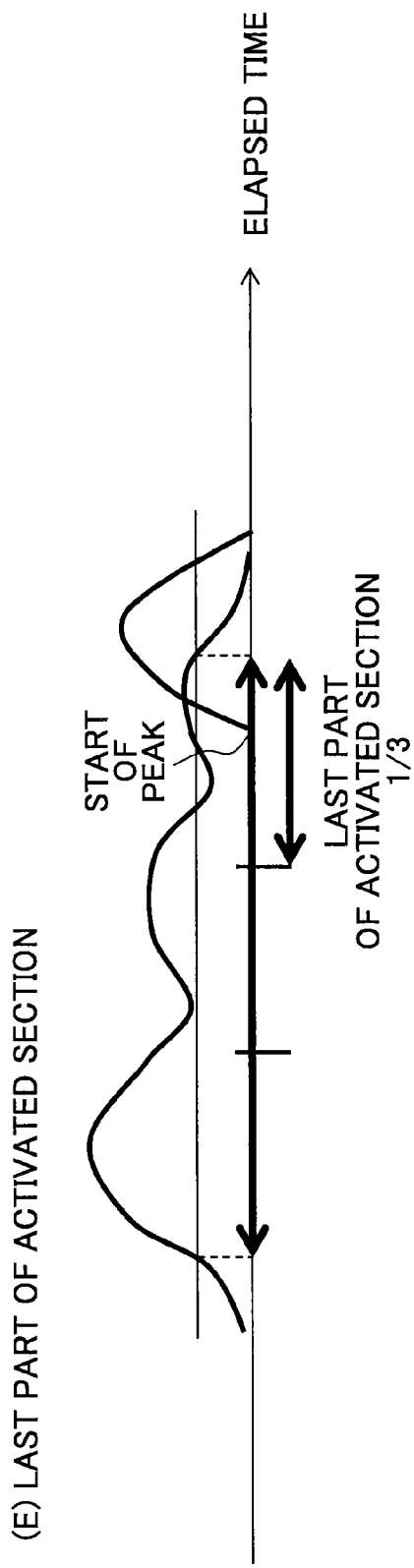
FIG. 48B is a diagram showing classification of peak position in the third embodiment of the present invention.
Figure 48C:
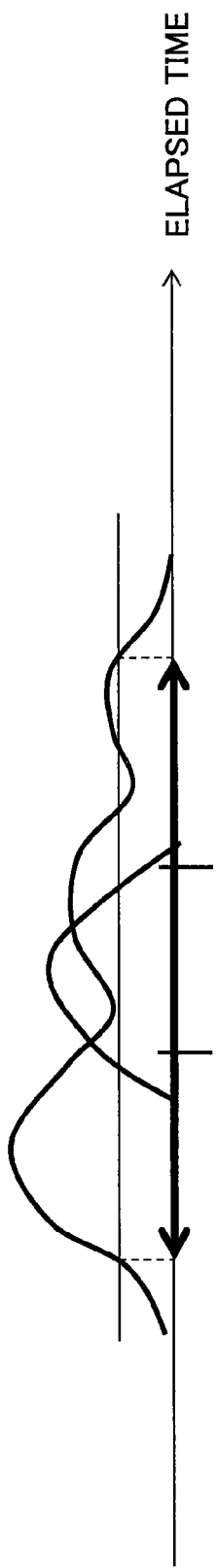
FIG. 48C is a diagram showing classification of peak position in the third embodiment of the present invention.

(A) "Before activated section": when the peak end time is before the activation start time of the network process (FIG. 47A);

(I) "After activated section": when the peak start time is after the activation end time of the network process (FIG. 47B);

(U) "First part of activated section": other than (A) and (I), when the peak end time is before the first part ⅓ of the activated section of the Network process (FIG. 48A);

(E) "Last part of activated section": other than (A) and (I), when the peak start time is after the last part ⅓ of the activated section of the Network process (FIG. 48B);

(O) "middle part of activated section": other than (A)-(E) (FIG. 48C).

(3) The position relationship between each peak and the activated section of the Network process obtained in (2) is calculated in the form of (position relationship of first peak, position relationship of second peak, . . . ). However, in cases corresponding to the following (a)-(c), the position relationship is output as follows.

(a) When there are one or more peaks corresponding to (U)-(O), or when a total sum of the widths of peaks corresponding to (U)-(O) exceeds 80 percent of the activated section width of the Network process;
  position relationships of peaks corresponding to the above-mentioned condition are output as "whole activated section of Network process" as a whole.

(b) Other than (a), when there is one or more peaks corresponding to (U) and (O) respectively:
  position relationships of peaks corresponding to the above-mentioned condition are output as "first part of activated section" as a whole.

(c) Other than (a), when there is one or more peaks corresponding to (E) and (O) respectively:
  position relationships of peaks corresponding to the above-mentioned condition are output as "last part of activated section" as a whole. For example, in a case where peaks are classified in (2) such that the first peak is "before activated section", the second peak is "middle part of activated section", and the third peak is "last part of activated section", (b) and (c) are applied, so that the output becomes ("before activated section", "last part of activated section").

As mentioned above, the feature amount calculation unit 3130 obtains the feature amount only as the value calculated from the multiplicity graph of processes of the user terminal or a received data amount. Thus, the method can be applied to various applications, and user personal information are not accessed.

The similarity degree calculation unit 3140 calculates a degree of similarity of the calculated feature amount for all stored past feature amounts by using the feature amount calculated by the feature amount calculation unit 3130, the past feature amount stored in the memory unit 3170, and a predetermined similarity degree function. More specifically, a calculated feature amount S and a stored past feature amount R are assigned to a similarity degree function SM (S, R) to obtain a value as a degree of similarity. Here, "similarity degree function" is formed by a function representing a degree of similarity between feature amounts and a function for weighting the feature amounts. For example, when a peak of a communication process amount is high, the degree of similarity of the peak of the communication process amount is largely weighted, and when the peak is low, a degree of similarity of other feature amount is largely weighted.

As mentioned above, the similarity degree calculation unit 3140 calculates some feature amounts from the graph, obtains a degree of similarity between feature amounts, and add the feature amounts by assigning weights, so as to calculate a degree of similarity of the whole feature amounts. Accordingly, since it becomes unnecessary to hold information of the whole graph, the amount of stored data can be decreased. Also, instead of comparing graphs in each time, it is only necessary to compare feature amounts, so that calculation amount when calculating the degree of similarity can be also decreased.

The similar operation extraction unit 3150 extracts identification number stored as a combination with a feature amount whose degree of similarity exceeds an extraction threshold in past feature amounts. The extraction threshold may be defined as a relative value which is, for example, "a case where degree of similarity is included in the upper 2% of the whole past feature amounts that are stored" or "a case where degree of similarity is included in the upper 100", or may be defined as an absolute value which is, for example, "a case where the degree of similarity exceeds 80."

The storing unit 3160 provides the calculated feature amount that is not yet stored in the memory unit 3170 with an identification number, and stores the number and the feature amount in the memory unit 3170. The identification number may be defined as a total number of the feature amounts, or may be defined as a start time of the experienced waiting time when performing the operation, for example.

The memory unit 3170 may store not only the identification number and the feature amount but also the cut-out logs, statistical values such as average throughput and average process time and the like obtained from the logs, and the experienced waiting time by associating with corresponding identification number, so as to extract them with the identification number at the same time.

Here, the "identification number" is a unique value. Even when the past stored feature amount and the calculated feature amount that is not yet stored are the same value, a new unique identification number is assigned to the newly stored feature amount.

Also, one or more types of feature amounts are calculated for logs, and each of the feature amounts are represented by a real number. The values of the one or more feature amounts are values of each component of a vector of the feature amount corresponding to the logs from which the feature amounts are calculated. The feature amounts stored in the memory unit 3170 mean the whole vector of the feature amounts formed by the whole components, and an identification number may be uniquely assigned to the whole vector of the feature amounts formed by the values of the feature amounts.

Example

In this example, a Web browser is used as an example for description as an executed application. Following operation is described with reference to a flowchart of FIG. 44. In the following, steps after step 3300 are described.

Step 3300) Log Cutout:

The log cutout unit 3120 receives the logs obtained from the user terminal 3200 and the experienced waiting time that is estimated in the experienced waiting time estimation unit 3110. For example, it is assumed that the log cutout unit 3120 receives the application logs shown in FIG. 49, the network logs shown in FIG. 50 and the estimated experienced waiting time shown in FIG. 51. The log cutout unit 3120 cuts out application logs shown in FIG. 52 and network logs shown in FIG. 53. Based on the experienced waiting time, the logs that are cut out here are logs in which the start time is after 13.7 second and the end time is before 15.8.

Step 3400) Calculation of Feature Amount:

The logs cut out in step 3300 (FIGS. 52 and 53) are supplied to the feature amount calculation unit 3130.

A. Received Data Amount $S_{Thr}$

Based on the network logs, the data amount received by the user terminal 3200 is obtained as:

$$507.97+304.45=812.42(Kbit)=101.55 \text{ (KB)}.$$

B. Calculation of Feature Amount: Number, Height, Width, Position of Peak of Process Multiplicity for Each Process Type In this example, in each of a case in which the timeslot is "experienced waiting time/50" and a case in which the timeslot is "experienced waiting time/10", quantization is performed using the value of the process multiplicity for each process type. In the former case, 6 values are calculated which are the number of peaks of Network process $S_{nw\_n}$, the number of peaks of Rendering process $S_{ren\_n}$, peak height of Network process $S_{nw\_h}$, $S'_{nw\_h}$, peak width of Network process $S_{nw\_w}$, and peak position of Scripting process $S_{scr\_p}$. In the latter case, only the peak height of Network process $S_{nw\_h\_10}$ is calculated. In the above-mentioned example, there is an operation for which determination is difficult only by the multiplicity graph obtained using the timeslot of "experienced waiting time/50", information of the multiplicity graph obtained using the timeslot of "experienced waiting time/10" is supplementary used. In the case of "experienced waiting time/10", all feature amounts are not calculated, and only the peak height of Network process which is the most dominant is calculated.

In this example, the information of the multiplicity graph obtained using the timeslot of the latter "experienced waiting time/10" is used as additional information in determination by the multiplicity graph obtained using the timeslot of "experienced waiting time/50." Thus, in the latter case, only the peak height of Network process which is the most dominant (large effect) is calculated, and used as additional information instead of calculating all feature amounts.

Figure 54:
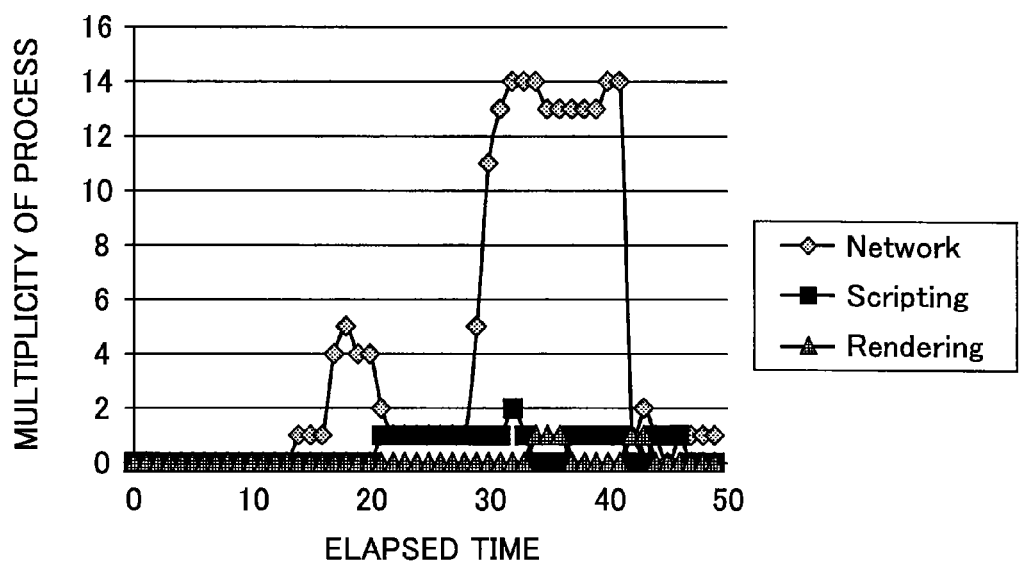
FIG. 54 shows process multiplicity (timeslot="experienced waiting time length/50") for each process type of an example in the third embodiment.
Figure 55:
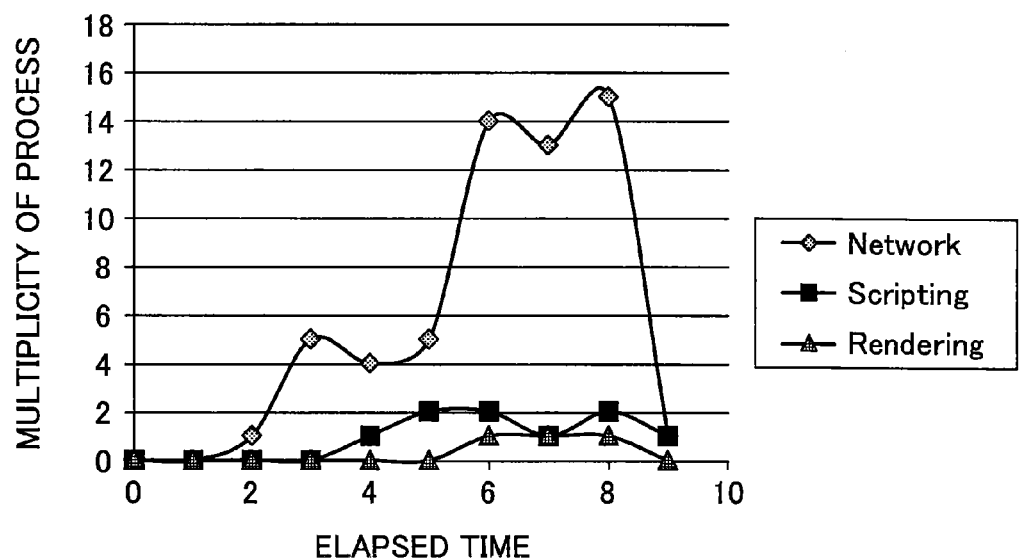
FIG. 55 shows process multiplicity (timeslot="experienced waiting time length/10") for each process type of an example in the third embodiment.

FIG. 54 shows a quantization result in a case where the timeslot is "experienced waiting time/50", and FIG. 55 shows a quantization result in a case where the timeslot is "experienced waiting time/10".

B-1 Peak Number of Network Process $S_{nw\_n}$ and Rendering Process $S_{ren\_n}$ Assuming that $S_{inter}=5$, $P_{min1}=2$, $P_{min2}=2$, $P_{max}=2$ in the Network process, and $S_{inter}=5$, $P_{min1}=0$, $P_{min2}=0$, $P_{max}=1$ in the Rendering process, in the case of FIG. 54, the number of peaks in the Network process $S_{nw\_n}$ is given as 2 and the number of peaks in the Rendering process $S_{ren\_n}$ is given as 0.

B-2: Peak Height of Network Process: $S_{nw\_h}$, $S'_{nw\_h}$, $S_{nw\_h\_10}$

In the case of FIG. 54, when $S_{inter}=5$, $P_{min1}=2$, $P_{min2}=2$, $P_{max}=2$, the peak height of the Network process $S_{nw\_h}$ is (5,14), and when $S_{inter}=5$, $P_{min1}=0$, $P_{min2}=0$, $P_{max}=1$, the peak height of the Network process is (14). In this example, since $P_{min1}=P_{min2}=0$, the peak starts when the multiplicity initially becomes equal to or greater than 0, and the peak ends when the multiplicity initially becomes equal to or greater less 0 after the peak start. Also, since $P_{max}=1$, a peak of less than 1 peak height is neglected. Thus, only the peak that starts at time 13 and ends at time 45 is counted as a peak in FIG. 54, and the height of the peak is 14. In the case of FIG. 55, when $S_{inter}=5$, $P_{min1}=2$, $P_{min2}=2$, $P_{max}=2$, the peak height $S_{nw\_h\_10}$ is given as (15).

B-3: Peak Width $S_{nw\_w}$ of Network Process

In the case of FIG. 54, a combination $S_{nw\_w}$ of peak widths is given as (4,15).

B-4: Peak Position $S_{scr\_p}$ of Scripting Process (0) Peak of Scripting Process:

When $S_{inter}=5$, $P_{min1}=1$, $P_{min2}=0$, $P_{max}=0$, the number of peak of Scripting process in FIG. 54 is one, and the start time is 21, and the end time is 47.

(1) Activated Section of Network

When $S_{continue}=5$, $A_{min1}=1$, $A_{min2}=0$, the activation start time is 14 and the activation end time is 45 in the Network process in FIG. 54.

(2) Position Relationship Between Each Peak of Scripting Process and Activated Section of Network Process The position relationship between each peak of Scripting process obtained in (0) and activated section of Network process obtained in (1) is given as (O) "middle part of activated section".

(3) Peak Position $S_{scr\_p}$ of Scripting Process:

From (2), $S_{scr\_p}$ is given as "middle part of activated section."

Step 3500) Calculation of Degree of Similarity

It is assumed that the similarity degree calculation unit 3140 is supplied with a combination of feature amounts $S=(S_{thr}, S_{nw\_n}, S_{ren\_n}, S_{nw\_h}, S'_{nw\_h}, S_{nw\_h\_10}, S_{nw\_w}, S_{scr\_p})$ obtained in step 3400, a combination of feature amounts $R=(R_{thr}, R_{nw\_n}, R_{ren\_n}, R_{nw\_h}, R'_{nw\_h}, R_{nw\_h\_10}, R_{nw\_w}, R_{scr\_p})$ stored in the memory unit 3170 as shown in FIG. 56, and similarity degree functions shown below.

Similarity degree function SM(S, R)=
$A(S_{nw\_h}, R_{nw\_h}, S'_{nw\_h}, R'_{nw\_h})*$
$\{b(S_{nw\_h})*B(S_{nw\_n}, R_{nw\_n}, S_{nw\_h}, R_{nw\_h})+$
$c(S_{nw\_h})*C(S_{thr}, R_{thr})+$
$d(S_{nw\_h})*D(S_{ren\_n}, R_{ren\_n})+$
$e(S_{nw\_h})*E(S_{scr\_p}, R_{scr\_p})+$
$f(S_{nw\_h})*F(S_{nw\_h\_10}, R_{nw\_h\_10})+$
$g(S_{nw\_h})*G(S_{nw\_w}, R_{nw\_w}, S_{nw\_h}, R_{nw\_h})\}$ In the function, similarity functions A-G of each feature amount and weighting functions b-g are defined as follows.

$A(S_{nw\_h}, R_{nw\_h}, S'_{nw\_h}, R'_{nw\_h})=$
(i) 1 (when $0<s_{nw\_h}<5$, and $r_{nw\_h}*0.8 \leq s_{nw\_h} \leq r_{nw\_h}*1.2$ or $r_{nw\_h}-1 \leq s_{nw\_h} \leq r_{nw\_h}+1$)
(ii) 1 (when $s_{nw\_h}=0$, $s'_{nw\_h}>0$ and $r_{nw\_h}=0$, $r'_{nw\_h}>0$)
1 (when $s_{nw\_h}=s'_{nw\_h}=0$ and $r'_{nw\_h}=r_{nw\_h}=0$)
(iii) 0 (other cases)

Here, $s_{nw\_h}$, $s'_{nw\_h}$, $r_{nw\_h}$, $r'_{nw\_h}$ are the maximum values of $S_{nw\_h}$, $S'_{nw\_h}$, $R_{nw\_h}$, $R'_{nw\_h}$ respectively.

$B(S_{nw\_n}, R_{nw\_n}, S_{nw\_h}, R_{nw\_h})=$
(i) 1 (when $S_{nw\_n}=R_{nw\_n}=1$)
(ii) 1 ($S_{nw\_n}$, $R_{nw\_n}>1$ and $S_{nw\_h2}*0.9 \leq r_{nw\_h2} \leq s_{nw\_h2}*1.1$ or $s_{nw\_h2}-1 \leq r_{nw\_h2} \leq s_{nw\_h2}+1$)
(iii) 0 (other cases)

Here, $S_{nw\_h2}$, $r_{nw\_h2}$ are the second largest value of $S_{nw\_h}$, $R_{nw\_h}$ respectively.

$C(S_{thr}, R_{thr})=$
(i) 1 (when $S_{thr}*0.8 \leq R_{thr} \leq S_{thr}*1.2$)
(ii) 0 (other cases)

$D(S_{ren\_n}, R_{ren\_n})=$
(i) 1 (when $S_{ren\_n}$, $R_{ren\_n} \geq 1$ or $S_{ren\_n}=R_{ren\_n}=0$)
(ii) 0 (other cases)

$E(S_{scr\_p}, R_{scr\_p})=$
(i) 1 (when $S_{scr\_p}=R_{scr\_p}$)
(ii) 1 (when each of $S_{scr\_p}$, $R_{scr\_p}$ includes "before activated section", or when each of them includes "after activated section")
(iii) 0.3 (other than (i), and when either of $S_{scr\_p}$, $R_{scr\_p}$ does not include "before activated section" and "after activated section")
(iv) 0 (other cases)

$F(S_{nw\_h\_10}, R_{nw\_h\_10})=$
(i) 1 (when $s_{nw\_h\_10}*0.9 \leq r_{nw\_h\_10} \leq s_{nw\_h\_10}*1.1$ or $S_{nw\_h\_10}-1 \leq r_{nw\_h\_10} \leq s_{nw\_h\_10}+1$)
(ii) 0 (other cases)

Here, $s_{nw\_h\_10}$, $r_{nw\_h\_10}$ are the maximum values of $S_{nw\_h\_10}$, $R_{nw\_h\_10}$ respectively.

$G(S_{nw\_w}, R_{nw\_w}, S_{nw\_h}, R_{nw\_h})=$
(i) 1 (when $s_{nw\_w}*0.7 \leq r_{nw\_w} \leq s_{nw\_w}*1.3$ or $s_{nw\_w}-1 \leq r_{nw\_w} \leq s_{nw\_w}+1$)
(ii) 0 (other cases)

Here, $s_{nw\_w}$, $r_{nw\_w}$ are peak widths when the peak height becomes the highest in $S_{nw\_w}$, $R_{nw\_w}$ respectively.

$b(S_{nw\_h})=$
(i) 30 (when $s_{nw\_h} \geq 5$)
(ii) 20 (when $0<s_{nw\_n}<5$)
(iii) 0 (when $s_{nw\_h}=0$)

$c(S_{nw\_h})=$
(i) 20 (when $s_{nw\_h}>5$)
(ii) 20 (when $0<s_{nw\_n}<5$)
(iii) 40 (when $s_{nw\_h}=0$)

$d(S_{nw\_h})=$
(i) 10 (when $s_{nw\_h} \geq 5$)
(ii) 10 (when $0<s_{nw\_h}<5$)
(iii) 30 (when $s_{nw\_h}=0$)

$e(S_{nw\_h})=$
(i) 10 (when $s_{nw\_h} \geq 5$)
(ii) 20 (when $0<s_{nw\_h}<5$)
(iii) 30 (when $s_{nw\_h}=0$)

$f(S_{nw\_h})=$
(i) 20 (when $s_{nw\_h} \geq 5$)
(ii) 20 (when $0<s_{nw\_h}<5$)
(iii) 0 (when $s_{nw\_h}=0$)

$g(S_{nw\_h})=$
(i) 10 (when $s_{nw\_h} \geq 5$)
(ii) 10 (when $0<s_{nw\_h}<5$)
(iii) 0 (when $s_{nw\_h}=0$)

In this case, for example, a degree of similarity between the feature amount obtained in step 3400 and the feature amount of No. 1 in FIG. 56 is given as $1*\{30*1+20*1+10*1+10*0+20*1+10*1\}=90$.

Step 3600) Extraction of Similar Operation

The similar operation extraction unit 3150 arranges degrees of similarity of feature amounts obtained in step 3400 with respect to every feature amount stored in the memory unit 3170 in descending order. This result is shown in FIG. 57. In FIG. 57, since 275 feature amounts are stored in the memory unit 3170, feature amounts for which degree of similarity is included in the upper 2% are five which are No. 1, 148, 264, 164, and 56. Therefore, five of these are extracted as similar operations.

Evaluation of the Present Embodiment

Following is an evaluation result of validity for the result of specifying similar operations using the technique of the present embodiment.

Evaluation targets of validity of the result of specifying similar operations are 276 operations and the feature amounts performed under the condition shown in FIG. 58. For two operations which are arbitrarily selected from the 276 operations which are the evaluation targets, it is determined whether the operations are similar operations by using the technique of the present embodiment, and, for every combination of operations ($_{276}C_2=37950$), a ratio by which a correct specifying result of similar operation is obtained is calculated as a correct ratio for each threshold.

In this evaluation, the arbitrary two operations are two operations selected at random from 276 operations irrespective of types of operation and measurement condition. For example, there is a case to select an operation of "type of operation: A, network load: none, terminal load: none, number of times of measurement: first time" and an operation of "type of operation: B, network load: yes, terminal load: yes, number of times of measurement: third time". Also, there is a case to select an operation of "type of operation: A, network load: none, terminal load: none, number of times of measurement: first time" and an operation of "type of operation: A, network load: yes, terminal load: yes, number of times of measurement: third time". In the former case, since the types of operations are different, if a result that they are not similar operations is derived, this result is correct. In the latter case, since the types of operations are the same although measurement conditions are different, if a result that they are similar operations is derived, this result is correct. The threshold of the degree of similarity is set at 20 intervals between 50 and 150.

FIG. 59 shows a result of checking, for each threshold, a probability that the result is correct in determining, using the technique of the present embodiment, whether the two operations are similar operations by extracting two operations arbitrarily from the whole operations that are evaluation targets. As shown in FIG. 59, the correct ratio exceeds 80% for every threshold and similar operation. Thus, it can be confirmed that similar operations can be specified accurately by the technique of the present embodiment.

It is possible to construct operation of each component of the similar operation extraction apparatus shown in FIG. 42 or 43 as a program, and it is possible to install the program in a computer used as a similar operation extraction apparatus or to distribute the program via a network.

More specifically, each of the similar operation extraction apparatus shown in FIG. 42 and the similar operation extraction apparatus shown in FIG. 43 can be realized by causing a computer to execute a program coded with process content described in the present embodiment. More specifically, the function of each part of the similar operation extraction apparatus can be realized by executing a program corresponding to processes executed by each unit by using hardware resources such as a CPU, a memory and a hard disk embedded in a computer which form the similar operation extraction apparatus. The program can be saved or distributed by recording the program in a computer readable recording medium, (portable memory and the like). Also, the program, can be provided via a network by the Internet, e-mail and the like.

For example, in the present embodiment, there is provided a similar operation extraction program for causing a computer to function as a similar operation extraction apparatus for extracting operations similar to input operations that are provided as inputs when executing an application, the program causing the computer to function as:

a feature amount calculation unit configured to calculate a feature amount based on logs corresponding to a user experienced waiting time cut out from either one of an application log and a network log or from a combination of both; and a similarity degree calculation unit configured to calculate a degree of similarity between the calculated feature amount and a feature amount stored in a storage unit in the past based on the calculated feature amount, the stored feature amount and a predetermined similarity degree function.

The present invention is not limited to the first-third embodiments, and variations and modifications may be made without departing from the scope of the claims.

The present international application claims priority based on Japanese patent application No. 2012-82802 filed on Mar. 30, 2012, Japanese patent application No. 2012-82803 filed on Mar. 30, 2012 and Japanese patent application No. 2012-234727 filed on Oct. 24, 2012, and the entire contents of the Japanese patent applications No. 2012-82802, No. 2012-82803 and No. 2012-234727 are incorporated herein by reference.

DESCRIPTION OF REFERENCE SIGNS 1100 quality estimation apparatus
1101 received log storage unit
1110 reception unit
1120 waiting time estimation unit
1130 estimation result storing/display unit
1200 user terminal
1210 Web browser
1220 browser log obtaining unit
1230 transmission unit
1300 browser application server
1310 HTTP server
1320 content
2100 terminal bottleneck determination apparatus
2101 received log storage unit
2102 reference log storage unit
2103 continuous region length empirical cumulative distribution DB
2110 reception unit
2120 bottleneck determination unit
2130 determination result storing/display unit
2140 continuous region length empirical cumulative distribution DB generation unit
2200 user terminal
2210 Web browser
2220 browser log obtaining unit
2230 transmission unit
2300 browser application server
2310 HTTP server
2320 content 3100 similar operation extraction apparatus
3110 experienced waiting time estimation unit
3120 log cutout unit
3130 feature amount calculation unit
3140 similarity degree calculation unit
3150 similar operation extraction unit
3160 storing unit
3170 memory unit
3200 user terminal
3210 transmission unit
3220 log obtaining unit
3230 Web browser
3300 AP server
3310 HTTP server
3320 content

The invention claimed is:

1. A user experienced quality estimation apparatus for estimating a user experienced waiting time of an application in an user terminal, comprising:
a computer:
configured to obtain, as estimation target logs, a duration time of each process of data obtaining, script execution and screen rendering performed in an estimation target period in the user terminal, and to store the estimation target logs in a received log storage unit;
configured to read out the estimation target logs from the received log storage unit, and output logs from which logs having data duration time shorter than a predetermined short time process threshold or longer than a predetermined long time process threshold are excluded;
configured to calculate, as multiplicity, the number of processes in a timeslot of a constant time length for the logs output from the computer; and
configured to extract a continuous region from data quantized by the computer, wherein the continuous region is a time length formed by continuous time slots, including:
configured to extract the continuous region without distinguishing between processes of the data obtaining, the script execution and the screen rendering, or
configured to extract the continuous region by distinguishing between processes of the data obtaining, the script execution and the screen rendering;
shaping the extracted continuous regions as an estimated waiting time and displaying the estimated waiting time to a user.

2. The user experienced quality estimation apparatus as claimed in claim 1, wherein the computer is further:
configured to perform a process of determining to be within a continuous region if there are processes equal to or greater than a detection threshold in at least one timeslot of timeslots in a sliding window, and to determine a section in which sliding windows that are determined to be within a continuous region continue to be a continuous region, or
configured to perform, for each timeslot as a start point, a process of determining that a timeslot is within a continuous region if an existing ratio of the number of timeslots that exceed the detection threshold exceeds a predetermined continuous determination threshold in a section of a sliding window length having the timeslot as a start point, and to determine a region in which timeslots of the start points that are determined to be within a continuous region to be a continuous region.

3. The user experienced quality estimation apparatus as claimed in claim 1, wherein the computer is further:
configured to extract a continuous region for each process of the data obtaining, the script execution and the screen rendering, and to determine a sum set of the continuous region of each process to be a continuous region, or
configured to extract a continuous region for each process of the data obtaining, the script execution and the screen rendering, and to extract a continuous region of the data obtaining process, a continuous region, of the script execution process, adjacent to the continuous region of the data obtaining process, and a continuous region, of the screen rendering process, adjacent to the continuous region of the script execution process, or
configured to extract a continuous region for each process of the data obtaining, the script execution and the screen rendering, and to extract a continuous region of the data obtaining process, and a continuous region, of the screen rendering process, adjacent to the continuous region of the data obtaining process, and to extract a continuous region of the script execution process, and a continuous region, of the screen rendering process, adjacent to the continuous region of the script execution process.

4. The user experienced quality estimation apparatus as claimed in claim 1, wherein the computer is further configured to perform shaping of a continuous region by, if the last extracted slot of the continuous region continues to a first slot of a next continuous region, determining the continuous regions to be one continuous region, wherein
if the one continuous region is equal to or less than a predetermined threshold, the one continuous region is deleted, or
if the one continuous region is equal to or greater than a predetermined threshold, the one continuous region is deleted.

5. A user experienced quality estimation method for estimating a user experienced waiting time of an application in an user terminal, comprising:
a data reception in which a data reception unit obtains, as estimation target logs, a duration time of each process of data obtaining, script execution and screen rendering performed in an estimation target period in the user terminal, and stores the estimation target logs in a received log storage unit;
a log exclusion in which a log exclusion unit reads out the estimation target logs from the received log storage unit, and outputs logs from which logs having data duration time shorter than a predetermined short time process threshold or longer than a predetermined long time process threshold are excluded;
a quantization in which a quantization unit calculates, as multiplicity, the number of processes in a timeslot of a constant time length for the logs output from the log exclusion; and
a continuous region extraction in which a continuous region extraction unit extracts a continuous region from data quantized by the quantization, wherein the continuous region is a time length formed by continuous time slots,
wherein the continuous region extraction includes:
a first continuous region extraction of extracting the continuous region without distinguishing between processes of the data obtaining, the script execution and the screen rendering, or a second continuous region extraction of extracting the continuous region by distinguishing between processes of the data obtaining, the script execution and the screen rendering.

6. The user experienced quality estimation method as claimed in claim 5, wherein the first continuous region extraction includes:
   a first evaluation A of performing a process of determining to be within a continuous region if there are processes equal to or greater than a detection threshold in at least one timeslot of timeslots in a sliding window, and determining a section in which sliding windows that are determined to be within a continuous region continue to be a continuous region, or
   a second evaluation A of performing, for each timeslot as a start point, a process of determining that a timeslot is within a continuous region if an existing ratio of the number of timeslots that exceed the detection threshold exceeds a predetermined continuous determination threshold in a section of a sliding window length having the timeslot as a start point, and determining a region in which timeslots of the start points that are determined to be within a continuous region to be a continuous region.

7. The user experienced quality estimation method as claimed in claim 5, wherein the second continuous region extraction includes:
   a first evaluation B of extracting a continuous region for each process of the data obtaining, the script execution and the screen rendering, and determining a sum set of the continuous region of each process to be a continuous region, or
   a second evaluation B of extracting a continuous region for each process of the data obtaining, the script execution and the screen rendering, and extracting a continuous region of the data obtaining process, a continuous region, of the script execution process, adjacent to the continuous region of the data obtaining process, and a continuous region, of the screen rendering process, adjacent to the continuous region of the script execution process, or
   a third evaluation B of extracting a continuous region for each process of the data obtaining, the script execution and the screen rendering, and extracting a continuous region of the data obtaining process, and a continuous region, of the screen rendering process, adjacent to the continuous region of the data obtaining process, and extracting a continuous region of the script execution process, and a continuous region, of the screen rendering process, adjacent to the continuous region of the script execution process.

8. The user experienced quality estimation method as claimed in claim 5, further comprising a continuous region shaping of shaping a continuous region for output by, if the last slot of the continuous region extracted by the continuous region extraction continues to a first slot of a next continuous region, determining the continuous regions to be one continuous region, wherein
   if the one continuous region is equal to or less than a predetermined threshold, the one continuous region is deleted, or
   if the one continuous region is equal to or greater than a predetermined threshold, the one continuous region is deleted.

9. A non-transitory computer readable recording medium storing a user experienced quality estimation program for causing a computer to function as each unit of the user experienced quality estimation apparatus as claimed in claim 1.

* * * * *